(12) United States Patent
Matsukawa et al.

(10) Patent No.: US 6,962,890 B2
(45) Date of Patent: Nov. 8, 2005

(54) OLEFIN POLYMERIZATION CATALYST AND PROCESS FOR OLEFIN POLYMERIZATION USING THE OLEFIN POLYMERIZATION CATALYST

(75) Inventors: Naoto Matsukawa, Yamaguchi (JP); Kazutaka Tsuru, Yamaguchi (JP); Masatoshi Nitabaru, Yamaguchi (JP); Junji Saito, Yamaguchi (JP); Tetsuhiro Matsumoto, Yamaguchi (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/127,720

(22) Filed: Apr. 23, 2002

(65) Prior Publication Data

US 2003/0004290 A1 Jan. 2, 2003

Related U.S. Application Data

(63) Continuation of application No. 09/471,170, filed on Dec. 23, 1999, now abandoned.

(30) Foreign Application Priority Data

Dec. 25, 1998 (JP) ............................................. 10-370814

(51) Int. Cl.[7] .............................. B01J 31/38; C08F 4/72
(52) U.S. Cl. ....................... 502/155; 502/167; 526/161; 526/171; 526/348
(58) Field of Search ................................. 526/161, 171, 526/348; 502/155, 167, 152, 195

(56) References Cited

U.S. PATENT DOCUMENTS 3,965,078 A 6/1976 Priola et al.
4,990,640 A 2/1991 Tsutsui et al.

(Continued)

FOREIGN PATENT DOCUMENTS

EP 0426638 5/1991
EP 0427697 5/1991

(Continued)

OTHER PUBLICATIONS

Milani, F. et al., "Catalytic Activity of Vanadium (III) and Oxovanadium (IV) Complexes in the Ziegler–Natta Synthesis of Ethylene–Propylene Elastomers", Inorganica Chimica Acta, 103 (1985) pp. 15–18.

(Continued)

*Primary Examiner*—Robert D. Harlan
(74) *Attorney, Agent, or Firm*—Birch, Stewart, Kolasch & Birch, LLP

(57) ABSTRACT

An olefin polymerization catalyst having a high polymerization activity at high temperatures and a process for olefin polymerization using the catalyst are disclosed. The olefin polymerization catalyst comprises a transition metal compound which is represented by the following formula (I) and in which the net charge parameter of the central metal is not more than 2.00:

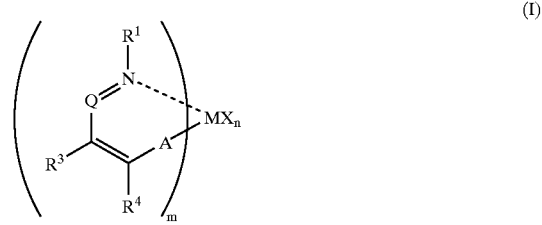

(I)

wherein M is a transition metal atom of Group 4 to Group 5 of the periodic table, m is an integer of 1 to 5, Q is —N═ or —C($R^2$)═, A is —O—, —S—, —Se— or —N($R^5$)—, $R^1$ is an aliphatic hydrocarbon group or an alicyclic hydrocarbon group, $R^2$ to $R^5$ are each a hydrogen atom, a hydrocarbon group, an oxygen-containing group or the like, n is a number satisfying a valence of M, and X is a hydrogen atom, a halogen atom, a hydrocarbon group or the like.

14 Claims, 1 Drawing Sheet

U.S. PATENT DOCUMENTS

| | | |
|---|---|---|
| 5,155,080 A | 10/1992 | Elder et al. |
| 5,321,106 A | 6/1994 | LaPointe |
| 5,387,568 A | 2/1995 | Ewen et al. |
| 5,502,125 A | 3/1996 | Bordeianu et al. |
| 5,714,556 A | 2/1998 | Johnson et al. |

FOREIGN PATENT DOCUMENTS

| | | | |
|---|---|---|---|
| EP | 0667357 | | 8/1995 |
| EP | 0680976 | | 11/1995 |
| EP | 0 874 005 | * | 10/1998 |
| EP | 0 953 571 | | 11/1999 |
| GB | 1390530 | | 4/1975 |
| JP | 5819309 | | 2/1983 |
| JP | 61130314 | | 6/1986 |
| JP | 1501633 | | 6/1989 |
| WO | 8805792 | | 8/1988 |
| WO | 8805793 | | 8/1988 |
| WO | 9300383 | | 1/1993 |
| WO | 9623010 | | 8/1996 |
| WO | 9628402 | | 9/1996 |
| WO | 9702298 | | 1/1997 |
| WO | 9830609 | | 7/1998 |
| WO | 9842664 | | 10/1998 |

OTHER PUBLICATIONS

Galimberti, Maurizio et al., "C NMR analysis of x–olefins copolymers with 1,3–butadiene obtained with zirconocenes/methylalumoxane catalysts", Makromol.Chem. 192, pp. 2591–2601 (1991).

Chemical Abstracts, vol. 126, Jan. 29, 1997, No. 5.

Herrmann, Wolfgang, "Multiple bonds between main group elements and transition metals, 154 methylrhenium (V) oxo complexes: derivatives of di (4–t–butylpyridine) dichloromethyloxorhenium (V)", Journal of Organo Metallic Chemistry, vol. 511, pp. 299–302 (1996).

Repo, Timo et al., "Ethylenebis (salicylideneiminato) zirconium Dichloride: Cyrstal Structure and Use as a Heterogeneous Catalyst in the Polymerization of Ethylene", Macromolecules, 1997, 30, pp. 171–175.

Schmidt H. et al., Inorganica Chimica Acta, vol. 267, No. 2, Jan. 10, 1998 pp. 229–238.

Chen et al., Organometallics, vol. 17, No. 24, Nov. 23, 1998, pp. 5358–5366.

* cited by examiner

Fig.1

Transition metal component

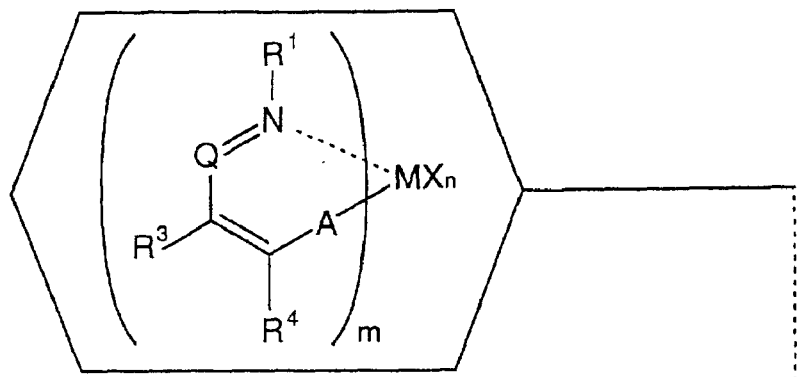

M : transition metal atom of Group 4 to Group 5 of the periodic table
m : 1 - 5
Q : $-N=$, $-C(R^2)=$
A : $-O-$, $-S-$, $-Se-$, $-N(R^5)-$
$R^1$ : aliphatic or alicyclic hydrocarbon group
$R^2 - R^5$ : hydrogen atom, hydrocarbon group or the like
n : number satisfying a valence of M
X : hydrogen atom, hydrocarbon group or the like Organometallic component

- Organometallic compound
- Organoaluminum oxy-compound
- Ionizing ionic compound Third component

- ( Carrier )
- ( Organic compound component )

→ Olefin

OLEFIN POLYMERIZATION CATALYST AND PROCESS FOR OLEFIN POLYMERIZATION USING THE OLEFIN POLYMERIZATION CATALYST

This application is a continuation of application Ser. No. 09/471,170, filed on Dec. 23, 1999 now abandoned, the entire contents of which are hereby incorporated by reference and for which priority is claimed under 35 U.S.C. §120; and this application claims priority of Application No. 370814 filed in Japan on Dec. 25, 1998 under 35 U.S.C. §119.

FIELD OF THE INVENTION

The present invention relates to a novel olefin polymerization catalyst and a process for olefin polymerization using the olefin polymerization catalyst.

BACKGROUND OF THE INVENTION

Polyolefins generally have excellent mechanical properties, so that they are used in many fields such as fields of various molded products. With the diversification of property requirements for the polyolefins, polyolefins of various properties have been desired in recent years, and besides increase of productivity of the polyolefins has been also desired.

As catalysts for producing polyolefins, titanium catalysts comprising a titanium compound and an organoaluminum compound and vanadium catalysts comprising a vanadium compound and an organoaluminum compound have been hitherto known.

In addition, Ziegler catalysts comprising a metallocene compound such as zirconocene and an organoaluminum oxy-compound (aluminoxane) are known as catalysts capable of producing polyolefins with a high polymerization activity.

Recently, a transition metal compound having a ligand of diimine structure has been proposed as a novel olefin polymerization catalyst (see International Patent Publication No. 9623010).

As a novel olefin polymerization catalyst, further, a transition metal compound having a salicylaldoimine ligand has been recently proposed by the present applicant in Japanese Patent Application No. 132706/1998. This catalyst exhibits high olefin polymerization activity at a temperature of about 25° C. In the production of polyolefins using an industrial process, however, a polymerization catalyst exhibiting higher polymerization activity at high temperatures is desired because higher temperatures are advantageous in that the reaction heat can be easily removed and the viscosity of the reaction solution can be lowered to thereby enhance productivity.

OBJECT OF THE INVENTION

The present invention has been made under such circumstances as mentioned above, and it is an object of the invention to provide an olefin polymerization catalyst which exhibits a high polymerization activity at high temperatures. It is another object of the invention to provide a process for olefin polymerization using the catalyst having such excellent properties.

SUMMARY OF THE INVENTION

The olefin polymerization catalyst according to the present invention comprises a transition metal compound which is represented by the following formula (I) and in which the net charge parameter of the central metal M is not more than 2.00:

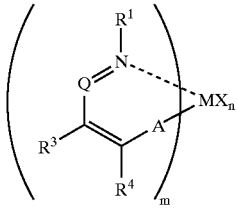

(I)

wherein M is a transition metal atom of Group 4 to Group 5 of the periodic table, m is an integer of 1 to 5, Q is a nitrogen atom or a carbon atom having a substituent group $R^2$, A is an oxygen atom, a sulfur atom, a selenium atom or a nitrogen atom having a substituent group $R^5$, $R^1$ is an aliphatic hydrocarbon group which may be substituted with an aromatic hydrocarbon group or an alicyclic hydrocarbon group, or an alicyclic hydrocarbon group which may be substituted with an aromatic hydrocarbon group or an aliphatic hydrocarbon group, $R^2$ to $R^5$ may be the same or different, they are each a hydrogen atom, a hydrocarbon group, an oxygen-containing group, a nitrogen-containing group, a sulfur-containing group, a boron-containing group, an aluminum-containing group, a phosphorus-containing group, a halogen-containing group, a heterocyclic compound residual group, a silicon-containing group, a germanium-containing group or a tin-containing group, two or more of them may be bonded to each other to form a ring, and when m is 2 or greater, at least one of groups indicated by $R^2$ to $R^5$ contained in one ligand and at least one of groups indicated by $R^2$ to $R^5$ contained in another ligand may be bonded to each other, when m is 2 or greater, $R^1$s, $R^2$s, $R^3$s, $R^4$S, or $R^5$s may be the same or different, n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, plural groups indicated by X may be the same or different and plural groups indicated by X may be bonded to each other to form a ring.

The transition metal compound represented by the above formula (I) includes a transition metal compound which is represented by the following formula (I-a) and in which the net charge parameter of the central metal M is in the range of 1.70 to 2.00:

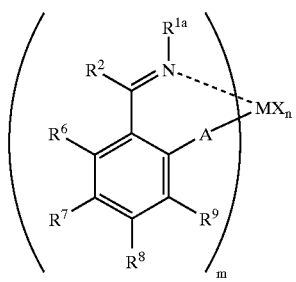

wherein M, m, A, n and X have the same meanings as those of M, m, A, n and X in the formula (I), $R^{1a}$ is an aliphatic hydrocarbon group which may be substituted with an aromatic hydrocarbon group or an alicyclic hydrocarbon group, $R^2$ and $R^5$ to $R^9$ may be the same or different, they are each a hydrogen atom, a hydrocarbon group, an oxygen-containing group, a nitrogen-containing group, a sulfur-containing group, a boron-containing group, an aluminum-containing group, a phosphorus-containing group, a halogen-containing group, a heterocyclic compound residual group, a silicon-containing group, a germanium-containing group or a tin-containing group, two or more of them may be bonded to each other to form a ring, and when m is 2 or greater, at least one of groups indicated by $R^2$ and $R^5$ to $R^9$ contained in one ligand and at least one of groups indicated by $R^2$ and $R^5$ to $R^9$ contained in another ligand may be bonded to each other, and when m is 2 or greater, $R^{1a}$s, $R^2$s, $R^5$s, $R^6$s, $R^7$s, $R^8$s, or $R^9$s may be the same or different.

The transition metal compound represented by the formula (I) also includes a transition metal compound which is represented by the following formula (I-b) and in which the net charge parameter of the central metal M is in the range of 1.50 to 1.89:

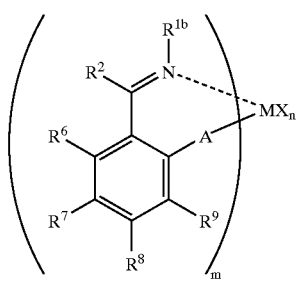

wherein M, m, A, n and X have the same meanings as those of M, m, A, n and X in the formula (I), $R^{1b}$ is an alicyclic hydrocarbon group which may be substituted with an aromatic hydrocarbon group or an aliphatic hydrocarbon group, $R^2$ and $R^5$ to $R^9$ may be the same or different, they are each a hydrogen atom, a hydrocarbon group, an oxygen-containing group, a nitrogen-containing group, a sulfur-containing group, a boron-containing group, an aluminum-containing group, a phosphorus-containing group, a halogen-containing group, a heterocyclic compound residual group, a silicon-containing group, a germanium-containing group or a tin-containing group, two or more of them may be bonded to each other to form a ring, and when m is 2 or greater, at least one of groups indicated by $R^2$ and $R^5$ to $R^9$ contained in one ligand and at least one of groups indicated by $R^2$ and $R^5$ to $R^9$ contained in another ligand may be bonded to each other, and when m is 2 or greater, $R^{1b}$s, $R^2$s, $R^5$s, $R^6$s, $R^7$s, $R^8$s, or $R^9$s may be the same or different.

The transition metal compound represented by the formula (I-b) is preferably a compound wherein A is —O—.

The transition metal compound (A-1) represented by the formula (I), (I-a) or (I-b) may be used as an olefin polymerization catalyst in combination with at least one compound (B) selected from:

(B-1) an organometallic compound,
(B-2) an organoaluminum oxy-compound, and
(B-3) a compound which reacts with the transition metal compound to form an ion pair.

Another embodiment of the present invention is an olefin polymerization catalyst comprising a transition metal compound represented by the following formula (II):

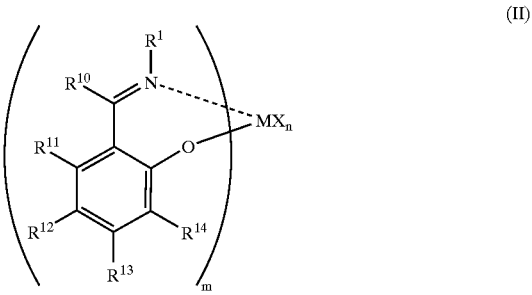

wherein M, $R^1$, n and X have the same meanings as those of M, $R^1$, n and X in the formula (I), m is 1 or 2, $R^{10}$ and $R^{11}$ to $R^{13}$ may be the same or different and are each a hydrogen atom, a hydrocarbon group, a hydrocarbon-substituted silyl group, an oxygen-containing group, a nitrogen-containing group or a sulfur-containing group, $R^{14}$ is a hydrocarbon group or a hydrocarbon-substituted silyl group, when m is 2, at least one of groups indicated by $R^{10}$ to $R^{14}$ contained in one ligand and at least one of groups indicated by $R^{10}$ to $R^{14}$ contained in another ligand may be bonded to each other, and when m is 2, $R^1$s, $R^{10}$s, $R^{11}$s, $R^{12}$s, $R^{13}$s, or $R^{14}$s may be the same or different.

A preferred embodiment of the transition metal compound represented by the formula (II) is a compound wherein $R^1$ is an aliphatic hydrocarbon group which may be substituted with an aromatic hydrocarbon group or an alicyclic hydrocarbon group and has not less than total 5 carbon atoms, or a compound wherein $R^1$ is an alicyclic hydrocarbon group which may be substituted with an aromatic hydrocarbon group or an aliphatic hydrocarbon group and has not less than total 7 carbon atoms.

In the formula (II), $R^{12}$ is preferably an oxygen-containing group, a nitrogen-containing group or a sulfur-containing group.

The transition metal compound (A-2) represented by the formula (II) may be used as an olefin polymerization catalyst in combination with at least one compound (B) selected from:

(B-1) an organometallic compound,
(B-2) an organoaluminum oxy-compound, and
(B-3) a compound which reacts with the transition metal compound to form an ion pair.

The process for olefin polymerization according to the present invention comprises polymerizing an olefin in the presence of the olefin polymerization catalyst mentioned above.

BRIEF DESCRIPTION OF THE DRAWING

FIG. 1 is an explanatory view showing steps for preparing the olefin polymerization catalyst according to the present invention.

DETAILED DESCRIPTION OF THE INVENTION

The olefin polymerization catalyst according to the invention and the process for olefin polymerization using the catalyst are described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

The olefin polymerization catalyst according to the invention comprises a transition metal compound represented by the formula (I) described below.

(A-1) Transition Metal Compound

The transition metal compound (A-1) is represented by the following formula (I):

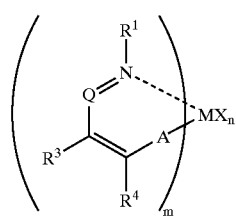

(I)

N—M generally indicates coordination, but in the invention, it sometimes indicates no coordination.

In the formula (I), M is a transition metal atom of Group 4 to Group 5 of the periodic table, specifically titanium, zirconium, hafnium, vanadium, niobium, tantalum or the like, preferably titanium, zirconium or hafnium, particularly preferably zirconium.

m is an integer of 1 to 5, preferably an integer of 1 to 3, more preferably 1 or 2.

Q is a nitrogen atom (—N=) or a carbon atom having a substituent group $R^2$ (—C($R^2$)=), preferably a carbon atom having a substituent group $R^2$.

A is an oxygen atom (—O—), a sulfur atom (—S—), a selenium atom (—Se—) or a nitrogen atom having a substituent group $R^5$ (—N($R^5$)—), more preferably an oxygen atom.

The carbon atom directly bonded to the nitrogen atom forms a part of an alicyclic structure.

$R^1$ is an aliphatic hydrocarbon group which may be substituted with an aromatic hydrocarbon group or an alicyclic hydrocarbon group, or an alicyclic hydrocarbon group which may be substituted with an aromatic hydrocarbon group or an aliphatic hydrocarbon group.

The term "aliphatic hydrocarbon group" used in the definition of $R^1$ means that a carbon atom which is directly bonded to the nitrogen atom in the formula (I) is an aliphatic skeleton moiety even when the aliphatic hydrocarbon group is substituted with an aromatic hydrocarbon group or an alicyclic hydrocarbon group. Likewise, the term "alicyclic hydrocarbon group" used in the definition of $R^1$ means that a carbon atom which is directly bonded to the nitrogen atom in the formula (I) is an alicyclic skeleton moiety even when the alicyclic hydrocarbon group is substituted with an aromatic hydrocarbon group or an aliphatic hydrocarbon group.

Examples of the groups indicated by $R^1$ include aliphatic hydrocarbon groups of 1 to 30 carbon atoms, such as methyl, ethyl, n-propyl, isopropyl, n-butyl, isobutyl, sec-butyl, tert-butyl, n-pentyl, tert-amyl, 1,2-dimethylpropyl, 1-ethylpropyl, isoamyl, 1-methylbutyl, 2-methylbutyl, neopentyl, n-hexyl, 1,3-dimethylbutyl, 3,3-dimethylbutyl, n-heptyl, 1-ethylpentyl, 1-methylhexyl, n-octyl, 1,5-dimethylhexyl, 2-ethylhexyl, 1-methylheptyl, tert-octyl, n-nonyl, n-decyl, n-undecyl, n-dodecyl, n-tridecyl, n-tetradecyl, n-pentadecyl, n-hexadecyl, n-heptadecyl and n-octadecyl; alicyclic hydrocarbon groups which may be substituted with aliphatic hydrocarbon groups and have 3 to 30 carbon atoms, such as cyclopropyl, cyclobutyl, cyclopentyl, cyclohexyl, 2-methylcyclohexyl, 2,2-dimethylcyclohexyl, 2,3-dimethylcyclohexyl, 2,6-dimethylcyclohexyl, 2,2,6,6-tetramethylcyclohexyl and adamantyl; aliphatic hydrocarbon groups substituted with alicyclic hydrocarbon groups and having 6 to 30 carbon atoms, such as cyclopropylmethyl, cyclobutylmethyl, cyclopentylmethyl and cyclohexylmethyl; and aliphatic hydrocarbon groups substituted with aromatic hydrocarbon groups and having 4 to 30 carbon atoms, such as benzyl.

$R^1$ is desirably an aliphatic hydrocarbon group which may be substituted with an aromatic hydrocarbon group or an alicyclic hydrocarbon group and has 1 to 30 carbon atoms, preferably 5 to 30 carbon atoms, more preferably 5 to 20 carbon atoms, or an alicyclic hydrocarbon group which may be substituted with an aromatic hydrocarbon group or an aliphatic hydrocarbon group and has 3 to 30 carbon atoms, preferably 5 to 30 carbon atoms, more preferably 5 to 20 carbon atoms.

$R^2$ to $R^5$ may be the same or different and are each a hydrogen atom, a hydrocarbon group, an oxygen-containing group, a nitrogen-containing group, a sulfur-containing group, a boron-containing group, an aluminum-containing group, a phosphorus-containing group, a halogen-containing group, a heterocyclic compound residual group, a silicon-containing group, a germanium-containing group or a tin-containing group.

Examples of the hydrocarbon groups include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; straight-chain or branched alkenyl groups of 2 to 30 carbon atoms, preferably 2 to 20 carbon atoms, such as vinyl, allyl and isopropenyl; straight-chain or branched alkynyl groups of 2 to 30 carbon atoms, preferably 2 to 20 carbon atoms, such as ethynyl and propargyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; cyclic unsaturated hydrocarbon groups of 5 to 30 carbon atoms, such as cyclopentadienyl, indenyl and fluorenyl; aryl groups of 6 to 30 carbon atoms, preferably 6 to 20 carbon atoms, such as phenyl, benzyl, naphthyl, biphenylyl, terphenylyl, phenanthryl and anthryl; and alkyl-substituted aryl groups, such as tolyl, isopropylphenyl, t-butylphenyl, dimethylphenyl and di-t-butylphenyl.

In the above hydrocarbon groups, a halogen atom may be substituted for the hydrogen atom. Examples of the hydrocarbon groups wherein a halogen atom is substituted for the hydrogen atom include halogenated hydrocarbon groups of 1 to 30 carbon atoms, preferably 1 to 20 carbon atoms, such as trifluoromethyl, pentafluorophenyl and chlorophenyl.

The above hydrocarbon groups may be substituted with other hydrocarbon groups. Examples of the hydrocarbon groups substituted with other hydrocarbon groups include aryl group-substituted alkyl groups, such as benzyl and cumyl.

Of the above groups, preferable are straight-chain or branched alkyl groups of 1 to 30 carbon atoms, preferably 1 to 20 carbon atoms, such as methyl, ethyl, n-propyl, isopropyl, n-butyl, isobutyl, sec-butyl, t-butyl, neopentyl and n-hexyl; aryl groups of 6 to 30 carbon atoms, preferably 6 to 20 carbon atoms, such as phenyl, naphthyl, biphenylyl, terphenylyl, phenanthryl and anthryl; and substituted aryl groups wherein the above aryl groups are substituted with 1 to 5 substituent groups such as halogen atoms, alkyl groups of 1 to 30 carbon atoms, preferably 1 to 20 carbon atoms, alkoxy groups of 1 to 30 carbon atoms, preferably 1 to 20 carbon atoms, aryl groups of 6 to 30 carbon atom, preferably 6 to 20 carbon atoms, and aryloxy groups of 6 to 30 carbon atoms, preferably 6 to 20 carbon atoms.

The oxygen-containing group is a group containing 1 to 5 oxygen atoms therein. In the oxygen-containing groups, the later-described heterocyclic compound residual group is not included, and a group containing a nitrogen atom, a sulfur atom, a phosphorus atom, a halogen atom or a silicon atom each of which is directly bonded to the oxygen atom is not included either. Examples of the oxygen-containing groups include a hydroxyl group, an alkoxy group, an aryloxy group, an arylalkoxy group, an acetoxy group, a carbonyl group, an ester group, an ether group, an acyl group, a carboxyl group, a carbonato group, a peroxy group and a carboxylic anhydride group. Of these, preferable are a hydroxyl group, an alkoxy group, an aryloxy group, an arylalkoxy group, an acetoxy group, a carbonyl group and the like. Specific examples of the preferred oxygen-containing groups include a hydroxyl group; alkoxy groups, such as methoxy, ethoxy, n-propoxy, isopropoxy, n-butoxy, isobutoxy and tert-butoxy; aryloxy groups, such as phenoxy, methylphenoxy, 2,6-dimethylphenoxy, 2,4,6-trimethylphenoxy and naphthoxy; arylalkoxy groups, such as phenylmethoxy and phenylethoxy; an acetoxy group; and a carbonyl group. When the oxygen-containing group contains carbon atom, the number of carbon atoms is desired to be in the range of 1 to 30, preferably 1 to 20.

The nitrogen-containing group is a group containing 1 to 5 nitrogen atoms therein, and the later-described heterocyclic compound residual group is not included in the nitrogen-containing groups. Examples of the nitrogen-containing groups include an amino group, an imino group, an amido group, an imido group, a nitro group, a hydrazino group, a hydrazono group, a nitroso group, a cyano group, an isocyano group, a cyanic ester group, an amidino group, a diazo group and an ammonium salt group derived from an amino group. Of these, preferable are an amino group, an imino group; an amido group, an imido group, a nitro group and the like. Specific examples of the preferred nitrogen-containing groups include amino groups, such as methylamino, dimethylamino, diethylamino, dipropylamino, dibutylamino, dicyclohexylamino, phenylamino, diphenylamino, ditolylamino, dinaphthylamino and methylphenylamino; imino groups, such as methylimino, ethylimino, propylimino, butylimino and phenylimino; amido groups, such as acetamido, N-methylacetamido and N-methylbenzamido; imido groups, such as acetimido and benzimido; and a nitro group. When the nitrogen-containing group contains carbon atom, the number of carbon atoms is desired to be in the range of 1 to 30, preferably 1 to 20.

The sulfur-containing group is a group containing 1 to 5 sulfur atoms therein, and the later-described heterocyclic compound residual group is not included in the sulfur-containing groups. Examples of the sulfur-containing groups include a sulfonato group, a sulfinato group, an alkylthio group, an arylthio group, a mercapto group, a thioester group, a dithioester group, a thioacyl group, a thioether group, a thiocyanic ester group, an isothiocyanic ester group, a sulfonic ester group, a sulfonamido group, a thiocarboxyl group, a dithiocarboxyl group, a sulfo group, a sulfonyl group, a sulfinyl group and a sulfenyl group. Of these, preferable are a sulfonato group, a sulfinato group, an alkylthio group, an arylthio group and the like. Specific examples of the preferred sulfur-containing groups include sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; sulfinato groups, such as methylsulfinato, phenylsulfinato, benzylsulfinato, p-toluenesulfinato, trimethylbenzenesulfinato and pentafluorobenzenesulfinato; alkylthio groups, such as methylthio and ethylthio; and arylthio groups, such as phenylthio, methylphenylthio and naphthylthio. When the sulfur-containing group contains carbon atom, the number of carbon atoms is desired to be in the range of 1 to 30, preferably 1 to 20.

The boron-containing group is a group containing 1 to 5 boron atoms therein, and the later-described heterocyclic compound residual group is not included in the boron-containing groups. Examples of the boron-containing groups include a boranediyl group, a boranetriyl group, a diboranyl group and a group represented by $BR_4$ (R is hydrogen, an alkyl group, an aryl group which may have a substituent group, a halogen atom or the like).

The aluminum-containing group is a group containing 1 to 5 aluminum atoms therein. Examples of the aluminum-containing groups include those having 1 or 2 hydrocarbon groups of 1 to 30 carbon atoms, preferably 1 to 20 carbon atoms, as substituent groups, and those represented by $AlR_4$ (R is a hydrogen atom, an alkyl group, an aryl group which may have a substituent group, a halogen atom or the like).

The phosphorus-containing group is a group containing 1 to 5 phosphorus atoms therein, and the later-described heterocyclic compound residual group is not included in the phosphorus-containing groups. Examples of the phosphorus-containing groups include a phosphoryl group, a thiophosphoryl group, a phosphine group, a phosphite group, a phosphonic acid group and a phosphinic acid group. Of these, preferable are a phosphine group, a phosphite group, a phosphonic acid group, a phosphinic acid group and the like. Specific examples of the preferred phosphorus-containing groups include trialkylphosphine groups, such as trimethylphosphine, tributylphosphine and tricyclohexylphosphine; triarylphosphine groups, such as triphenylphosphine and tritolylphosphine; phosphite group (phosphido groups), such as methylphosphite, ethylphosphite and phenylphosphite; a phosphonic acid group; and a phosphinic acid group.

The halogen-containing group is, for example, a group containing at least one atom selected from fluorine, chlorine, bromine and iodine. Specific examples of the halogen-containing groups include fluorine-containing groups, such as $PF_6$ and $BF_4$; chlorine-containing groups, such as $ClO_4$ and $SbCl_6$; and iodine-containing groups, such as $IO_4$.

The heterocyclic compound residual group is a group having a ring structure containing at least one hetero atom.

The hetero atom is, for example, oxygen, nitrogen, sulfur, phosphorus or boron. The ring structure is, for example, a ring of 3 to 18 members, preferably a ring of 4 to 7 members, more preferably a ring of 5 or 6 members. Examples of the heterocyclic compound residual groups include residual groups of nitrogen-containing compounds such as pyrrole, pyridine, pyrimidine, quinoline and triazine; residual groups of oxygen-containing compounds such as furan and pyran; residual groups of sulfur-containing compounds such as thiophene; and groups wherein these heterocyclic compound residual groups are further substituted with substituent groups such as alkyl groups of 1 to 30 carbon atoms, preferably 1 to 20 carbon atoms, and alkoxy groups of 1 to 30 carbon atoms, preferably 1 to 20 carbon atoms.

The silicon-containing group is a group containing 1 to 5 silicon atoms therein. Examples of the silicon-containing groups include a silyl group, a siloxy group, a hydrocarbon-substituted silyl group, a hydrocarbon-substituted siloxy group, a hydrocarbon-substituted silyl ether group, a silicon-substituted alkyl group and a silicon-substituted aryl group. Of these, preferable are a hydrocarbon-substituted silyl group, a hydrocarbon-substituted silyl ether group, a silicon-substituted alkyl group, a silicon-substituted aryl group and the like. Specific examples of the preferred silicon-containing groups include hydrocarbon-substituted silyl groups, such as methylsilyl, dimethylsilyl, trimethylsilyl, ethylsilyl, diethylsilyl, triethylsilyl, tripropylsilyl, tricyclohexylsilyl, phenylsilyl, diphenylsilyl, triphenylsilyl, dimethyl-t-butylsilyl, dimethylphenylsilyl, methyldiphenylsilyl, tritolylsilyl, trinaphthylsilyl and dimethyl(pentafluorophenyl)silyl; hydrocarbon-substituted silyl ether groups, such as trimethylsilyl ether; silicon-substituted alkyl groups, such as trimethylsilylmethyl; and silicon-substituted aryl groups, such as trimethylsilylphenyl. Of these, hydrocarbon-substituted silyl groups are particularly preferable. Of the hydrocarbon-substituted silyl groups, preferable are methylsilyl, dimethylsilyl, trimethylsilyl, ethylsilyl, diethylsilyl, triethylsilyl, dimethylphenylsilyl and triphenylsilyl, and particularly preferable are trimethylsilyl, triethylsilyl, triphenylsilyl and dimethylphenylsilyl. When the silicon-containing group contains carbon atom, the number of carbon atoms is desired to be in the range of 1 to 30, preferably 1 to 20.

Examples of the germanium-containing groups include groups wherein silicon is replaced with germanium in the above-mentioned silicon-containing groups.

Examples of the tin-containing groups include groups wherein silicon is replaced with tin in the above-mentioned silicon-containing groups.

$R^4$ is preferably an oxygen-containing group, such as an alkoxy group, an aryloxy group or a hydroxyl group, a nitrogen-containing group, such as an amino group, an imino group, an amido group, an imido group or a nitro group, or a sulfur-containing group, such as an alkylthio group or an arylthio group; it is more preferably an alkoxy group, an aryloxy group or an amino group; and it is particularly preferably an alkoxy group.

The oxygen-containing group, nitrogen-containing group, sulfur-containing group, boron-containing group, aluminum-containing group and phosphorus-containing group mentioned above are each preferably a group whose characteristic atomic group is directly bonded to a nitrogen atom or a carbon atom.

Two or more groups of $R^1$ to $R^5$, preferably neighboring groups, may be bonded to each other to form an aliphatic ring, an aromatic ring or a hydrocarbon ring containing a hetero atom such as a nitrogen atom. These rings may further have a substituent group. In the present invention, it is particularly preferable that the substituent groups $R^3$ and $R^4$ are bonded to form an aromatic ring.

When m is 2 or greater in the formula (I), one group of $R^2$ to $R^5$ contained in one ligand and one group of $R^2$ to $R^5$ contained in another ligand may be bonded to each other.

When m is 2 or greater, $R^1$s, $R^2$s, $R^3$s, $R^4$s, or $R^5$s may be the same or different.

n is a number satisfying a valence of M, specifically, an integer of 2 to 4, preferably 2.

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group.

Examples of the hydrocarbon groups, the oxygen-containing group, the sulfur-containing group, the boron-containing groups, the aluminum-containing groups, the phosphorus-containing groups, the halogen-containing groups, the heterocyclic compound residual groups, the silicon-containing groups, the germanium-containing groups and the tin-containing groups include the same groups as previously described with respect to $R^2$ to $R^5$ in the formula (I).

The halogen atom is fluorine, chlorine, bromine or iodine.

Examples of the nitrogen-containing groups include an amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Of the above groups, a hydrogen atom, a halogen atom, a hydrocarbon group, an oxygen-containing group or a nitrogen-containing group is preferable as X, and a hydrogen atom, a halogen atom or a hydrocarbon group is more preferable as X.

When n is 2 or greater, plural groups indicated by X may be the same or different, and plural groups indicated by X may be bonded to each other to form a ring.

In the transition metal compound represented by the formula (I), the net charge parameter of the central metal M is not more than 2.00, preferably in the range of 1.40 to 2.00.

The "net charge parameter" (sometimes abbreviated to "NC" hereinafter) of the central metal M referred to herein is a value of a Mulliken charge. The Mulliken charge is an electric charge of the central metal and is obtained in the following manner. The substituent groups indicated by X in the formula (I) are all replaced with methyl groups to give a complex, and the structure of the complex is optimized using the semiempirical molecular orbital method PM3 (tm). From the thus optimized structure, one methyl group is removed to obtain a structure (I'). The program used herein is SPARTANre1.5.0.3. Using the structure (I'), an RHF wave function is found out by the nonemprical molecular orbital method program Gaussian98, to obtain a Mulliken charge as an electric charge of the central metal. For the inner shell of the central metal, an effective inner shell potential of Hay and Wadt was used as the basis function, for the valence shell of the central metal, their double zeta basis function was used, and for other atoms, 3-21G was used. The thus obtained Mulliken charge value is defined as a net charge parameter. Also in case of the compound represented by the formula (I-a), (I-b) or (II) described below, the net charge parameter is obtained in the same manner as described above.

The NC is not more than 2.0. When $R^1$ is an aliphatic hydrocarbon group which may be substituted with an aromatic hydrocarbon group or an alicyclic hydrocarbon group, the NC is preferably in the range of 1.70 to 2.0. When $R^1$ is an alicyclic hydrocarbon group which may be substituted with an aromatic hydrocarbon group or an aliphatic hydrocarbon group, the NC is preferably in the range of 1.50 to 1.89.

When the NC of the central metal M is not more than 2.0, the transition metal compound used as an olefin polymerization catalyst exhibits excellent polymerization activity, especially at high temperatures.

The transition metal compound represented by the formula (I) includes a transition metal compound represented by the following formula or (I-b).

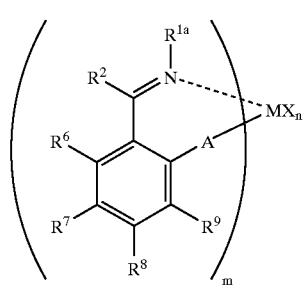

(I-a)

In the above formula, M, m, A, n and X have the same meanings as those of M, m, A, n and X in the formula (I).

$R^{1a}$ is an aliphatic hydrocarbon group which may be substituted with an aromatic hydrocarbon group or an alicyclic hydrocarbon group. Examples of such groups include aliphatic hydrocarbon groups of 1 to 30 carbon atoms, such as methyl, ethyl, n-propyl, isopropyl, n-butyl, isobutyl, sec-butyl, tert-butyl, n-pentyl, tert-amyl, 1,2-dimethylpropyl, 1-ethylpropyl, isoamyl, 1-methylbutyl, 2-methylbutyl, neopentyl, n-hexyl, 1,3-dimethylbutyl, 3,3-dimethylbutyl, n-heptyl, 1-ethylpentyl, 1-methylhexyl, n-octyl, 1,5-dimethylhexyl, 2-ethylhexyl, 1-methylheptyl, tert-octyl, n-nonyl, n-decyl, n-undecyl, n-dodecyl, n-tridecyl, n-tetradecyl, n-pentadecyl, n-hexadecyl, n-heptadecyl and n-octadecyl; aliphatic hydrocarbon groups substituted with aromatic hydrocarbon groups and having 6 to 30 carbon atoms, such as benzyl; and aliphatic hydrocarbon groups substituted with alicyclic hydrocarbon groups and having of 4 to 30 carbon atoms, such as cyclopropylmethyl, cyclobutylmethyl, cyclopentylmethyl and cyclohexylmethyl.

$R^{1a}$ desirably is a group having 1 to 30 carbon atoms, preferably 5 to 30 carbon atoms, more preferably 5 to 20 carbon atoms.

$R^2$ and $R^5$ to $R^9$ may be the same or different and are each a hydrogen atom, a hydrocarbon group, an oxygen-containing group, a nitrogen-containing group, a sulfur-containing group, a boron-containing group, an aluminum-containing group, a phosphorus-containing group, a halogen-containing group, a heterocyclic compound residual group, a silicon-containing group, a germanium-containing group or a tin-containing group. Examples of such groups include the same groups as previously described with respect to $R^2$ to $R^5$ in the formula (I).

Two or more groups of $R^2$ and $R^5$ to $R^9$, preferably neighboring groups, may be bonded to each other to form an aliphatic ring, an aromatic ring or a hydrocarbon ring containing a hetero atom such as a nitrogen atom. These rings may further have a substituent group.

When m is 2 or greater in the formula (I-a), at least one of groups indicated by $R^2$ and $R^5$ to $R^9$ contained in one ligand and at least one of groups indicated by $R^2$ and $R^5$ to $R^9$ contained in another ligand may be bonded to each other.

When m is 2 or greater, $R^{1a}$s, $R^2$s, $R^5$s, $R^6$s, $R^7$s, $R^8$s, or $R^9$s may be the same or different.

In the transition metal compound represented by the formula (I-a), the net charge parameter of the central metal M is in the range of 1.70 to 2.00, preferably 1.895 to 1.912.

When the NC of the central metal M is in the above range, the transition metal compound used as an olefin polymerization catalyst exhibits excellent polymerization activity, especially at high temperatures.

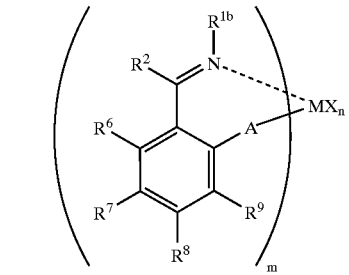

(I-b)

In the above formula, M, m, A, n and X have the same meanings as those of M, m, A, n and X in the formula (I).

$R^{1b}$ is an alicyclic hydrocarbon group which may be substituted with an aromatic hydrocarbon group or an aliphatic hydrocarbon group. Examples of such groups include alicyclic hydrocarbon groups which may be substituted with aliphatic hydrocarbon groups and have 3 to 30 carbon atoms, preferably 5 to 30 carbon atoms, more preferably 5 to 20 carbon atoms, such as cyclopropyl, cyclobutyl, cyclopentyl, cyclohexyl, 2-methylcyclohexyl, 2,2-dimethylcyclohexyl, 2,6-dimethylcyclohexyl, 2,2,6,6-tetramethylcyclohexyl, adamantyl, cyclopropylmethyl, cyclobutylmethyl, cyclopentylmetyl and cyclohexylmethyl.

$R^2$ and $R^5$ to $R^9$ may be the same or different and are each a hydrogen atom, a hydrocarbon group, an oxygen-containing group, a nitrogen-containing group, a sulfur-containing group, a boron-containing group, an aluminum-containing group, a phosphorus-containing group, a halogen-containing group, a heterocyclic compound residual group, a silicon-containing group, a germanium-containing group or a tin-containing group. Examples of such groups include the same groups as previously described with respect to $R^2$ to $R^5$ in the formula (I).

Two or more groups of $R^2$ and $R^5$ to $R^9$, preferably neighboring groups, may be bonded to each other to form an aliphatic ring, an aromatic ring or a hydrocarbon ring containing a hetero atom such as a nitrogen atom. These rings may further have a substituent group.

When m is 2 or greater in the formula (I-b), at least one of groups indicated by $R^2$ and $R^5$ to $R^9$ contained in one ligand and at least one of groups indicated by $R^2$ and $R^5$ to $R^9$ contained in another ligand may be bonded to each other.

When m is 2 or greater, $R^{1b}$s, $R^2$s, $R^5$s, $R^6$s, $R^7$s, $R^8$s, or $R^9$s may be the same or different.

In the transition metal compound represented by the formula (I-b), the net charge parameter of the central metal M is preferably in the range of 1.50 to 1.89, more preferably in the range of 1.80 to 1.89.

When the NC of the central metal M is in the above range, the transition metal compound used as an olefin polymerization catalyst exhibits excellent polymerization activity, especially at high temperatures.

Examples of the transition metal compounds represented by the formula (I) are given below, but the compounds of the formula (I) are not limited to those examples. In the following examples, the compounds represented by the formula (I-a) or (I-b) are included. Of the following examples, the compounds wherein, in the formula (I), Q is a carbon atom having a substituent group $R^2$, A is an oxygen atom, and $R^3$ and $R^4$ are bonded to each other to form an aromatic ring include the compounds represented by the formula (II) described later.

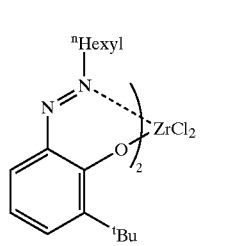
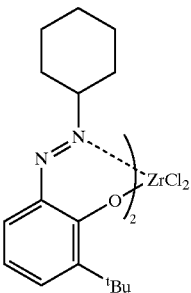
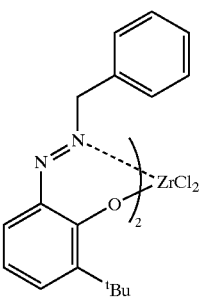
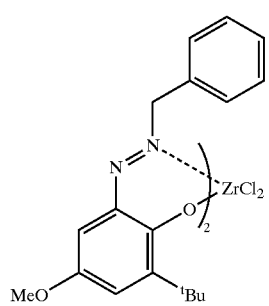
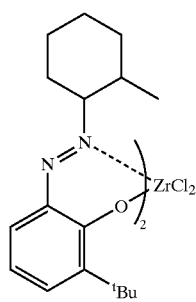
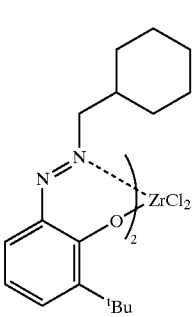
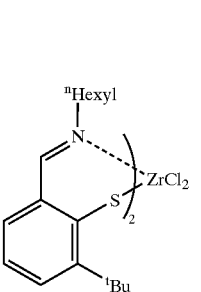
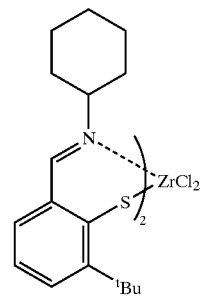
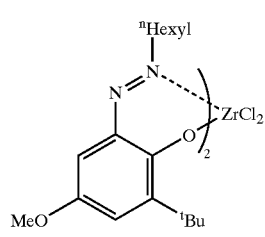
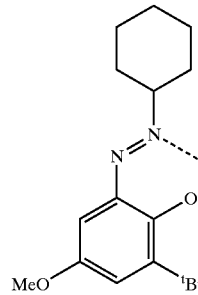
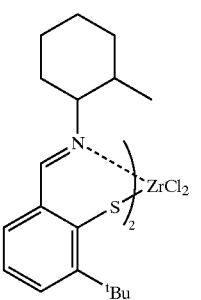
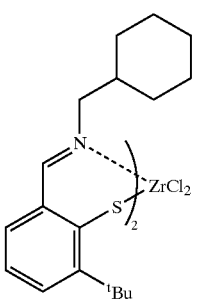
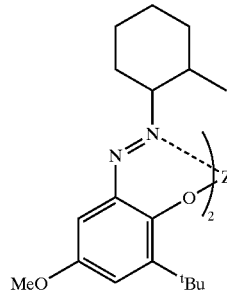
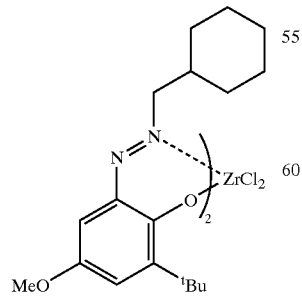
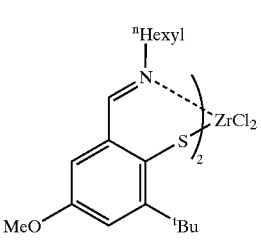
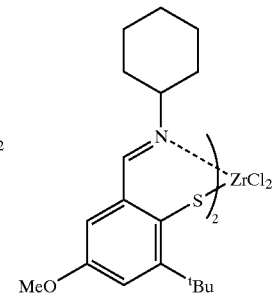
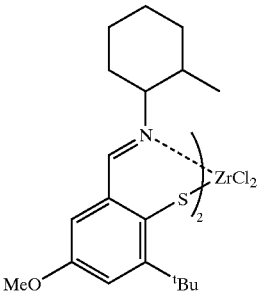
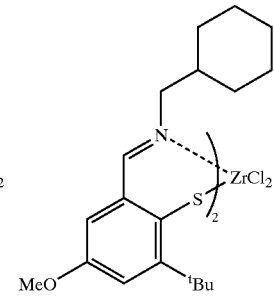

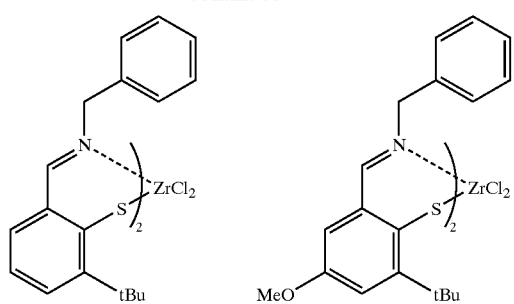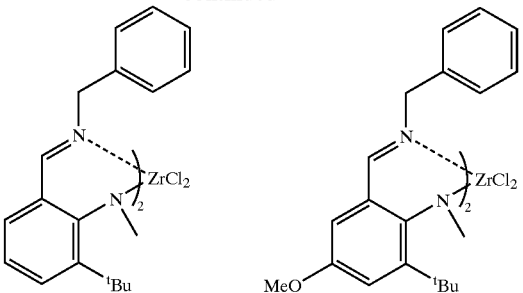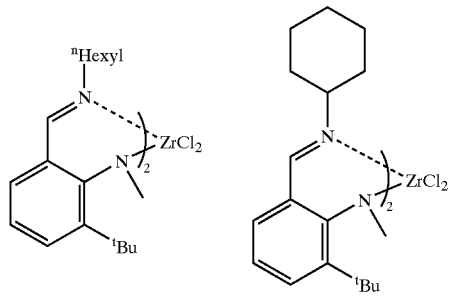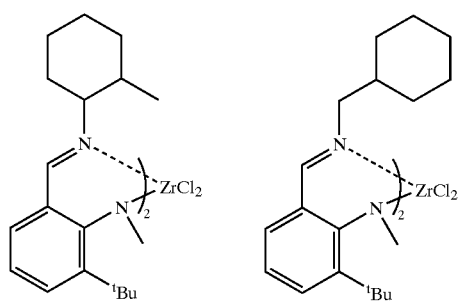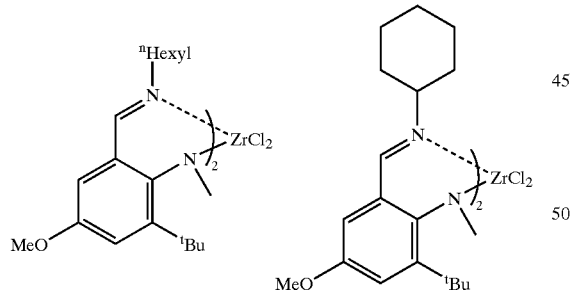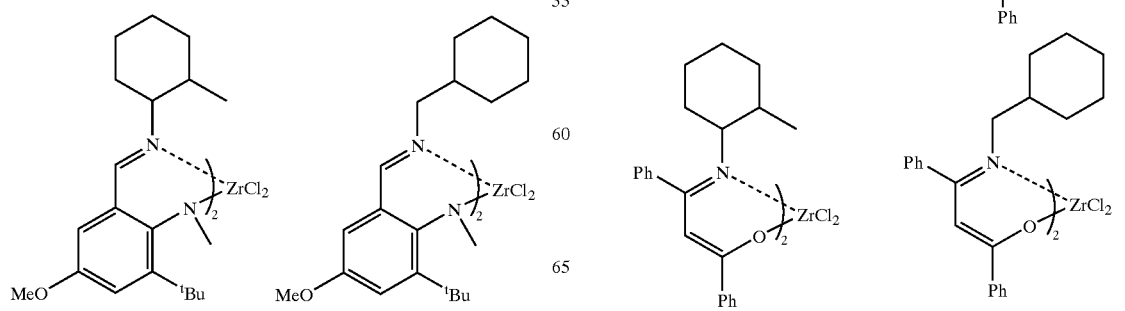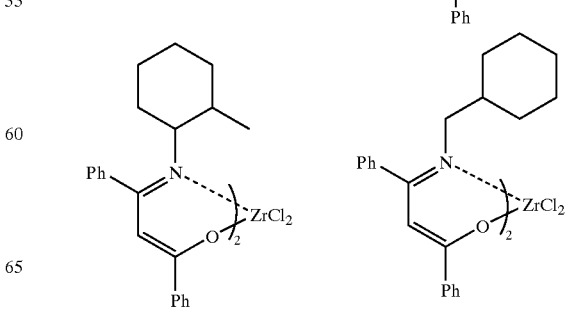

-continued
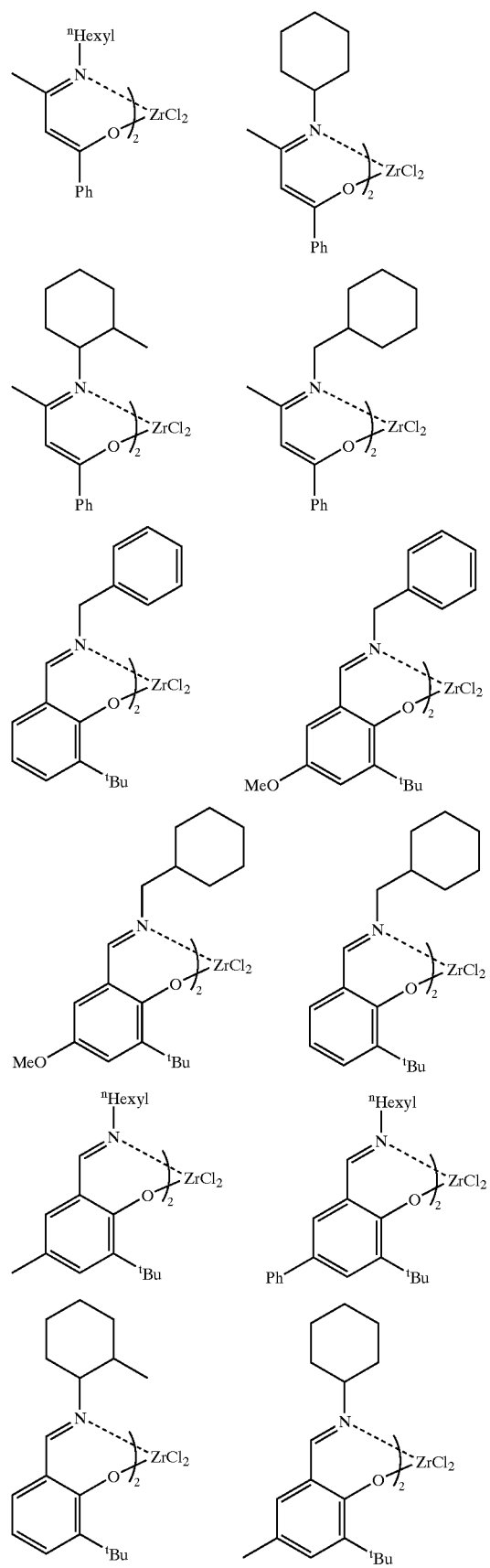
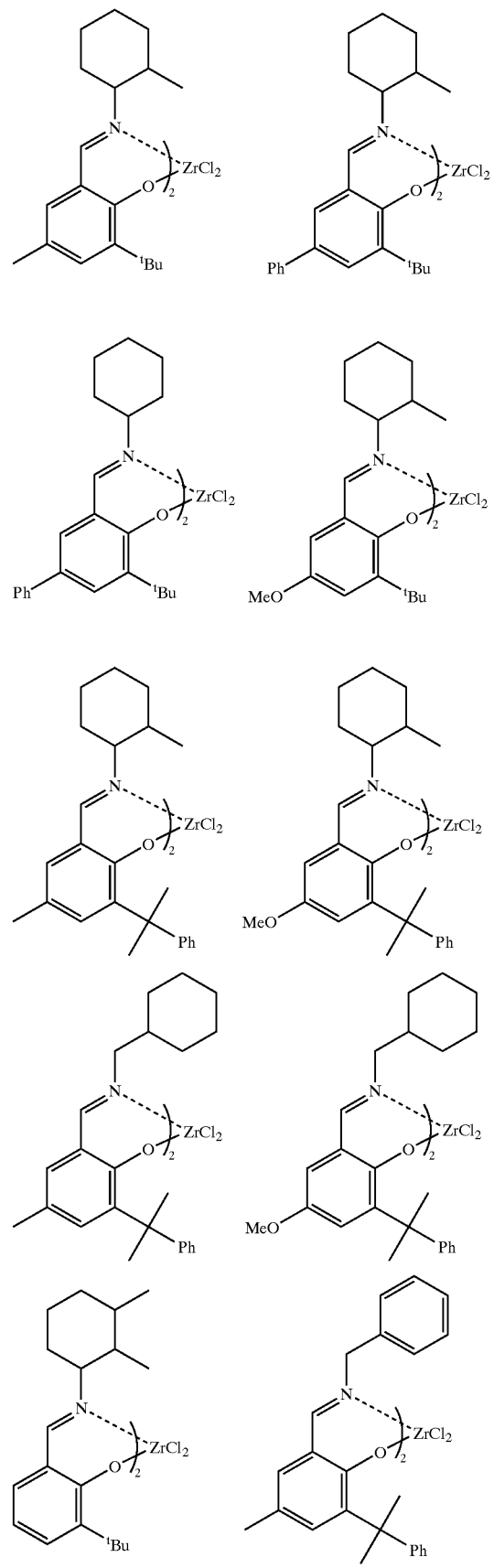

-continued

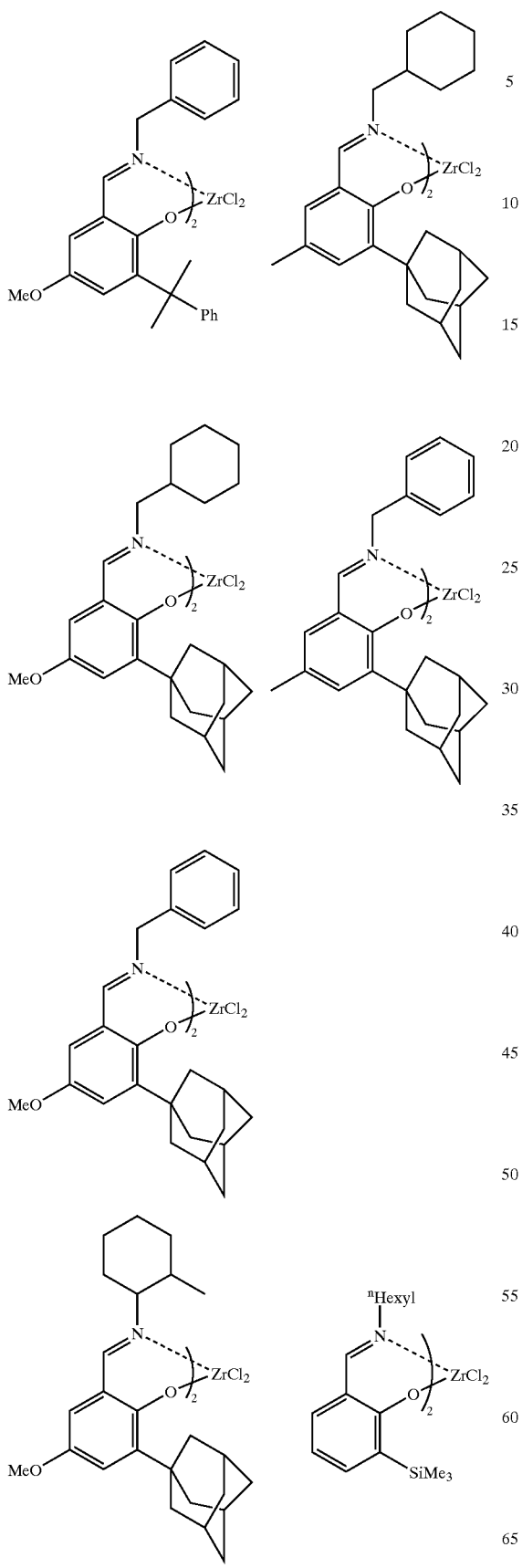

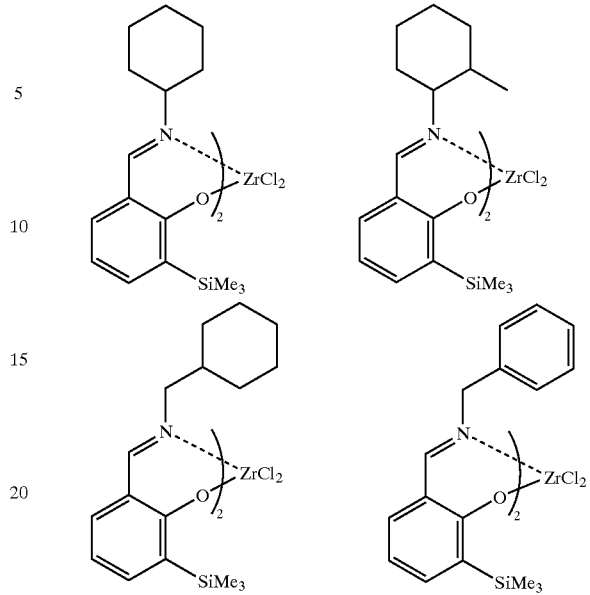

In the above examples, Me denotes a methyl group, Et denotes an ethyl group, "Pr denotes a n-propyl group, $^i$Pr denotes an isopropyl group, "Bu denotes a n-butyl group, $t$Bu denotes a t-butyl group, "Pentyl denotes a n-pentyl group, "Hexyl denotes a n-hexyl group, "Heptyl denotes a n-heptyl group, "Octyl denotes a n-octyl group, "Nonyl denotes a n-nonyl group, "Decyl denotes a n-decyl group, "Undecyl denotes a n-undecyl group, "Dodecyl denotes a n-dodecyl group, "Octadecyl denotes a n-octadecyl group, and Ph denotes a phenyl group.

In the present invention, transition metal compounds wherein the zirconium metal is replaced with a metal other than zirconium, such as titanium or hafnium, in the above-mentioned compounds are also employable.

Another embodiment of the olefin polymerization catalyst of the invention may comprise a transition metal compound represented by the following formula (II).

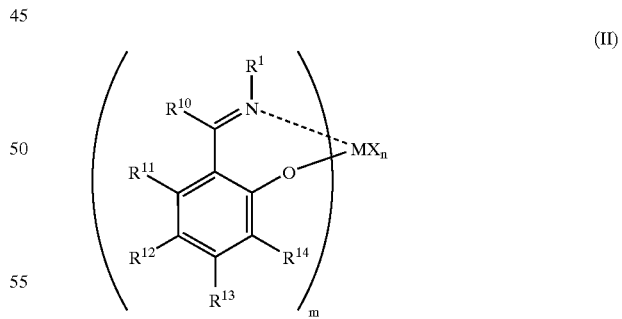

(II)

In the above formula, M, $R^1$, n and X have the same meanings as those of M, $R^1$, n and X in the formula (I).

$R^1$ is the same aliphatic hydrocarbon group which may be substituted with an aromatic hydrocarbon group or an alicyclic hydrocarbon group as $R^1$ in the above formula (I), or the same alicyclic hydrocarbon group which may be substituted with an aromatic hydrocarbon group or an aliphatic hydrocarbon group as $R^1$ in the above formula (I), and $R^1$ is desirably an aliphatic hydrocarbon group which may be substituted with an aromatic hydrocarbon group or an alicyclic hydrocarbon group and has preferably not less than total 5 carbon atoms, more preferably total 5 to 30 carbon atoms, or desirably an alicyclic hydrocarbon group which may be substituted with an aromatic hydrocarbon group or an aliphatic hydrocarbon group and has not less than total 7 carbon atoms, more preferably total 7 to 30 carbon atoms.

The aliphatic hydrocarbon group is, for example, a group of 1 to 30 carbon atoms, preferably 4 to 30 carbon atoms, more preferably 5 to 30 carbon atoms.

Examples of the aliphatic hydrocarbon groups include methyl, ethyl, n-propyl, isopropyl, n-butyl, isobutyl, sec-butyl, tert-butyl, n-pentyl, tert-amyl, 1,2-dimethylpropyl, 1-ethylpropyl, isoamyl, 1-methylbutyl, 2-methylbutyl, neopentyl, n-hexyl, 1,3-dimethylbutyl, 3,3-dimethylbutyl, n-heptyl, 1-ethylpentyl, 1-methylhexyl, n-octyl, 1,5-dimethylhexyl, 2-ethylhexyl, 1-methylheptyl, tert-octyl, n-nonyl, n-decyl, n-undecyl, n-dodecyl, n-tridecyl, n-tetradecyl, n-pentadecyl, n-hexadecyl, n-heptadecyl and n-octadecyl.

Of the above groups, preferable are n-pentyl, tert-amyl, 1,2-dimethylpropyl, 1-ethylpropyl, isoamyl, 1-methylbutyl, 2-methylbutyl, neopentyl, n-hexyl, 1,3-dimethylbutyl, 3,3-dimethylbutyl, n-heptyl, 1-ethylpentyl, 1-methylhexyl, n-octyl, 1,5-dimethylhexyl, 2-ethylhexyl, 1-methylheptyl, tert-octyl, n-nonyl, n-decyl, n-undecyl, n-dodecyl, n-tridecyl, n-tetradecyl, n-pentadecyl, n-hexadecyl, n-heptadecyl and n-octadecyl.

The aliphatic hydrocarbon group may be substituted with an aromatic hydrocarbon group or an alicyclic hydrocarbon group. Examples of the aliphatic hydrocarbon group substituted with an aromatic hydrocarbon group or an alicyclic hydrocarbon group include groups of 4 to 30 carbon atoms, such as benzyl, methylene naphthyl, methylene fluorenyl, methylene anthranyl, methylene cyclopropyl, methylene cyclobutyl, methylene cyclopentyl, methylene cyclohexyl, methylene-2-methylcyclohexyl, methylene-2,3-dimethylcyclohexyl, methylene-2,2-dimethylcyclohexyl, methylene-2,6-dimethylcyclohexyl, methylene-2,2,6,6-tetramethylcyclohexyl, methylene adamantyl, methylene cyclopropylmethyl, methylene cyclobutylmethyl, methylene cyclopenthylmethyl, or the like.

Of those groups, preferable are the groups of 5 to 30 carbon atoms, such as benzyl, methylene naphthyl, methylene fluorenyl, methylene anthranyl, methylene cyclobutyl, methylene cyclopentyl, methylene cyclohexyl, methylene-2-methylcyclohexyl, methylene-2,3-dimethylcyclohexyl, methylene-2,2-dimethylcyclohexyl, methylene-2,6-dimethylcyclohexyl, methylene-2,2,6,6-tetramethylcyclohexyl, methylene adamantyl, methylene cyclopropylmethyl, methylene cyclobutylmethyl, methylene cyclopenthylmethyl, or the like.

Examples of the alicyclic hydrocarbon groups include groups of 3 to 30 carbon atoms, preferably 7 to 30 carbon atoms, such as cyclopropyl, cyclobuthyl, cyclopentyl, cyclohexyl, adamantyl, norbornyl, or the like.

The alicyclic hydrocarbon group may be substituted with an aromatic hydrocarbon group or an aliphatic hydrocarbon group.

Examples of the alicyclic hydrocarbon groups which may be substituted with an aromatic hydrocarbon group or an aliphatic hydrocarbon group include groups of 7 to 30 carbon atoms, such as 2-methylcyclohexyl, 2,3-dimethylcyclohexyl, 2,2-dimethylcyclohexyl, 2,6-dimethylcyclohexyl, 2,2,6,6-tetramethylcyclohexyl, cyclopropylmethyl, cyclobuthylmethyl, cyclopentylmethyl, cyclopropylphenyl, cyclobutylphenyl, cyclopentylphenyl, cyclohexylphenyl, or the like.

m is 1 or 2, preferably 2.

$R^{10}$ and $R^{11}$ to $R^{13}$ may be the same or different and are each a hydrogen atom, a hydrocarbon group, a hydrocarbon-substituted silyl group, an oxygen-containing group, a nitrogen-containing group or a sulfur-containing group. Examples of such groups include the same hydrocarbon groups, the same hydrocarbon-substituted silyl groups, the same oxygen-containing groups, the same nitrogen-containing groups and the same sulfur-containing groups as previously described with respect to $R^2$ to $R^5$ in the formula (I).

$R^{12}$ is preferably a hydrocarbon group, an oxygen-containing group, a nitrogen-containing group or a sulfur-containing group, specifically preferably an oxygen-containing group, a nitrogen-containing group or a sulfur-containing group.

Examples of such groups include the same hydrocarbon groups, the same oxygen-containing groups, the same nitrogen-containing groups and the same sulfur-containing groups as previously described, and of these groups, preferable are an alkoxy group, an alkylthio group, an aryloxy group, an arylthio group, an amino group, an imino group, an amido group, an imido group, a nitro group or a hydroxyl group, specifically preferable is an alkoxy group.

$R^{14}$ is a hydrocarbon group or a hydrocarbon-substituted silyl group, and examples of such groups include the same hydrocarbon groups and the same hydrocarbon-substituted silyl groups as previously described with respect to $R^2$ to $R^5$ in the formula (I).

The above substituent groups are described below in more detail.

$R^{12}$ is preferably an oxygen-containing group, such as an alkoxy group, an aryloxy group, a hydroxyl group or the like, a nitrogen-containing group, such as an amino group, an imino group, an amido group, an imido group, a nitro group or the like, or a sulfur-containing group, such as an alkylthio group, an arylthio group or the like, more preferably an alkoxy group, an aryloxy group or an amino group, most preferably an alkoxy group.

$R^{14}$ is a hydrocarbon group or a hydrocarbon-substituted silyl group. Examples of the hydrocarbon groups preferable as $R^{14}$ include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; aryl groups of 6 to 30 carbon atoms, preferably 6 to 20 carbon atoms, such as phenyl, benzyl, naphthyl, biphenylyl and triphenylyl; and groups wherein these groups are further substituted with substituent groups such as alkyl groups of 1 to 30 carbon atoms, preferably 1 to 20 carbon atoms, or aryl groups of 6 to 30 carbon atoms, preferably 6 to 20 carbon atoms.

Examples of the hydrocarbon-substituted silyl groups preferable as $R^{14}$ include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl(pentafluorophenyl)silyl. Particularly preferable are trimethylsilyl, triethylphenylsilyl, diphenylmethylsilyl, isophenylsilyl, dimethylphenylsilyl, dimethyl-t-butylsilyl and dimethyl(pentafluorophenyl)silyl.

In the present invention, $R^{14}$ is particularly preferably a group selected from branched alkyl groups of 3 to 30 carbon atoms, preferably 3 to 20 carbon atoms, e.g., isopropyl, isobutyl, sec-butyl, tert-butyl and neopentyl, groups wherein aryl groups of 6 to 30 carbon atoms, preferably 6 to 20 carbon atoms, are substituted for the hydrogen atoms of these groups, e.g., cumyl, and cyclic saturated hydrocarbon groups of 3 to 30 carbon atoms, preferably 3 to 20 carbon atoms, e.g., adamantyl, cyclopropyl, cyclobutyl, cyclopentyl and cyclohexyl. An aryl group of 6 to 30 carbon atoms, preferably 6 to 20 carbon atoms, such as phenyl, naphthyl, fluorenyl, anthranyl or phenanthryl, or a hydrocarbon-substituted silyl group is also preferable.

Examples of the transition metal compounds represented by the formula (II) are given below, but the compounds of the formula (II) are not limited to those examples. In the following examples, the compounds represented by the formula (I) are included.

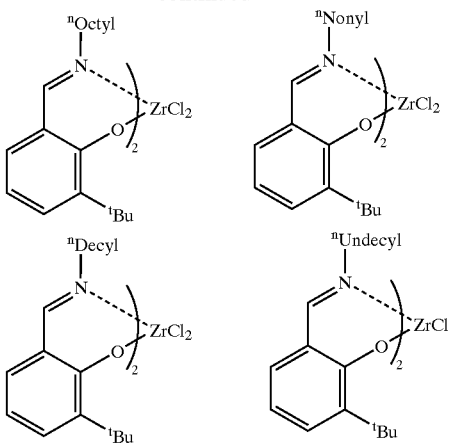

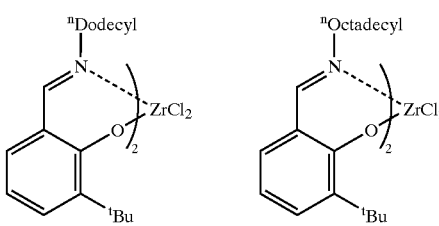

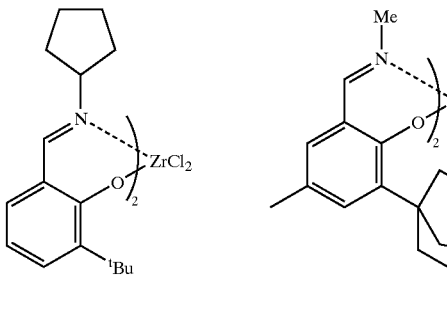

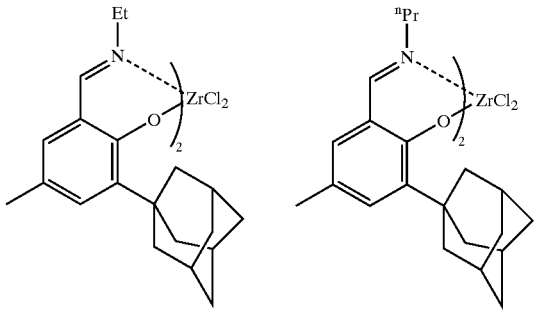

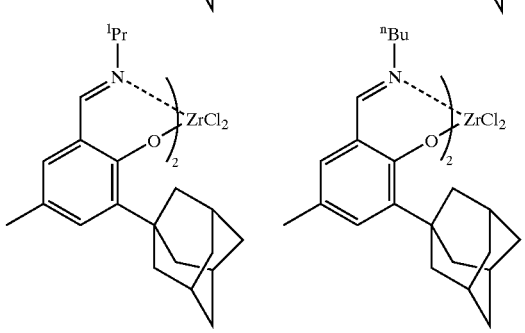

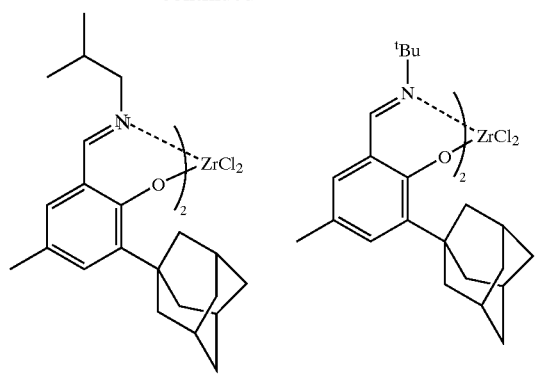
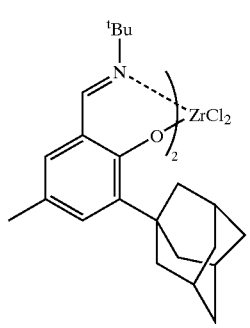
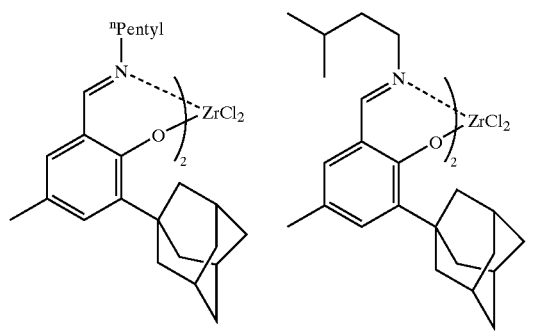
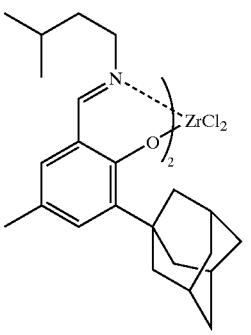
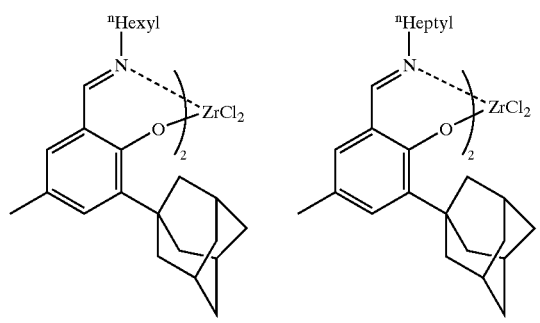
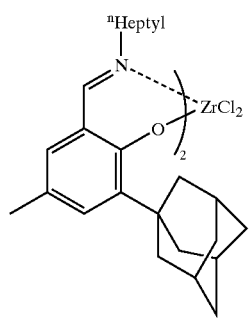
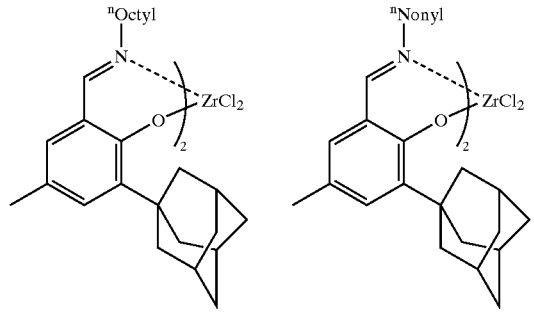
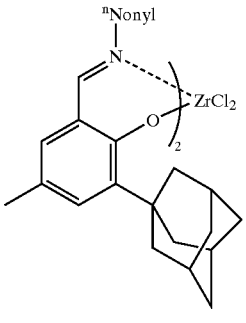
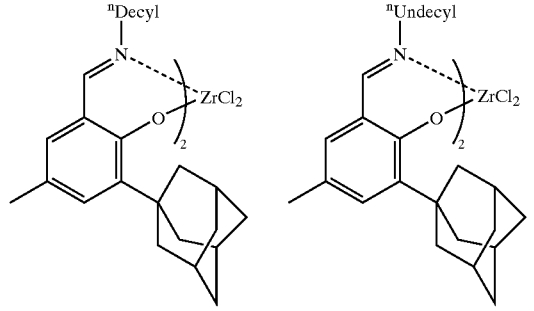
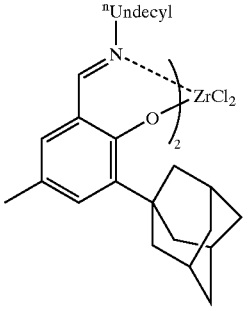
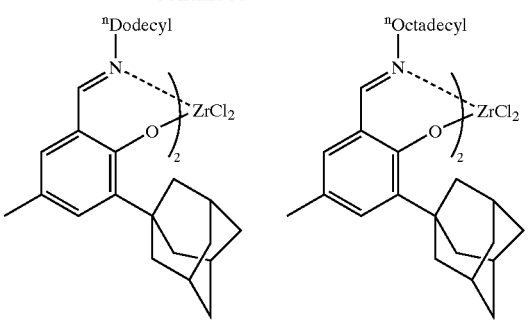
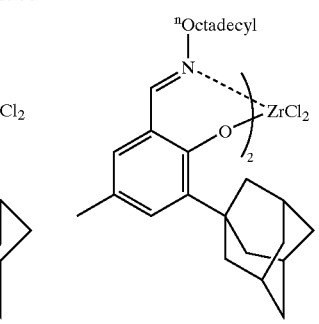
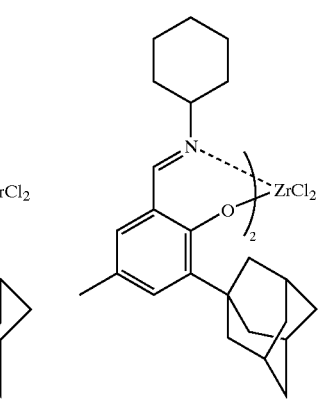
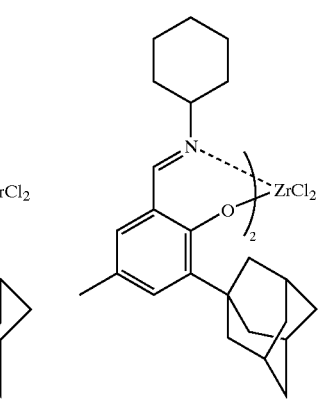
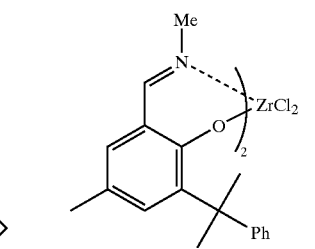
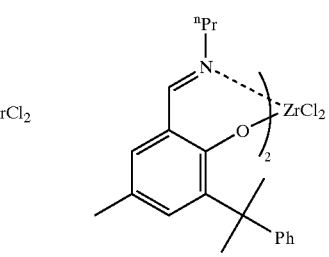
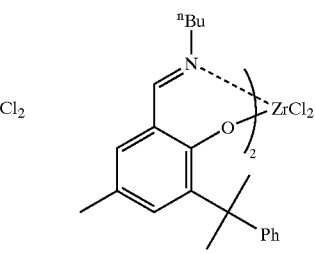

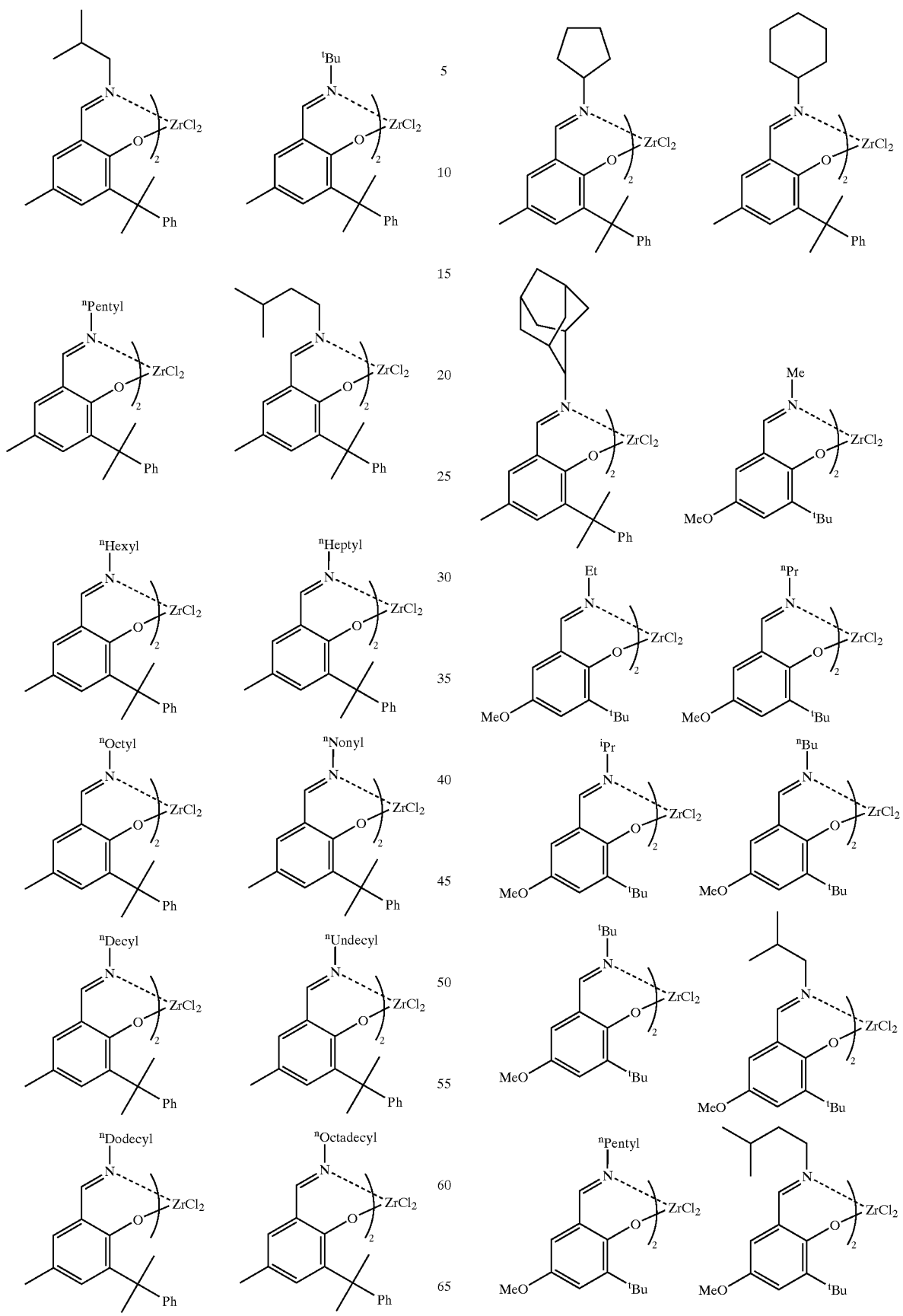

-continued
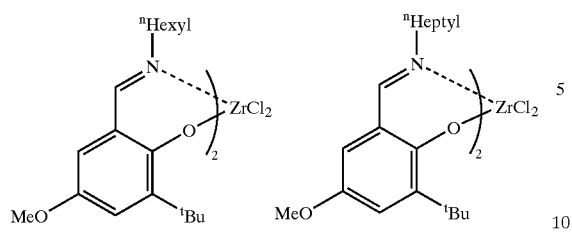
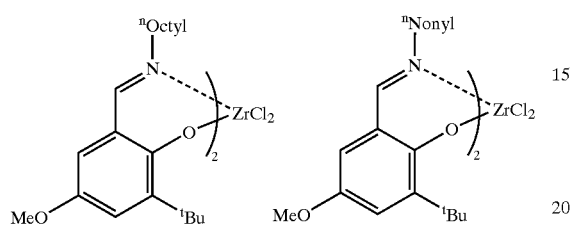
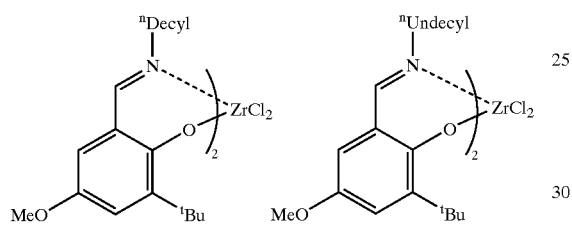
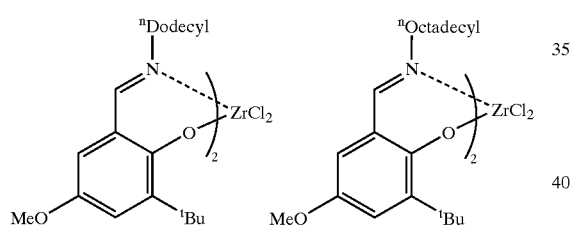
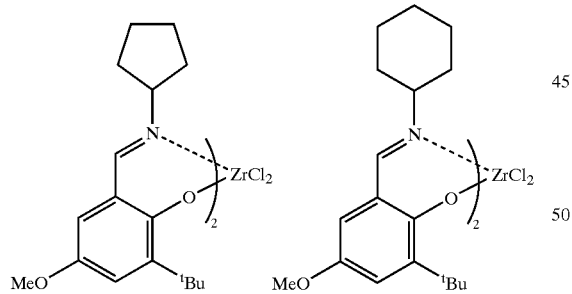
-continued
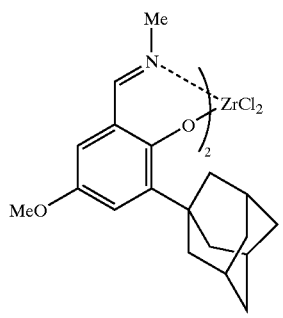
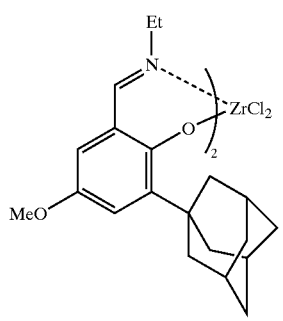
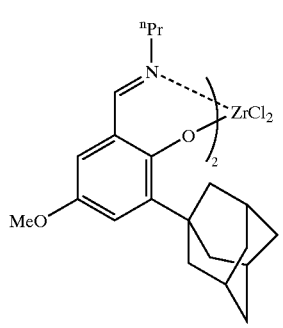
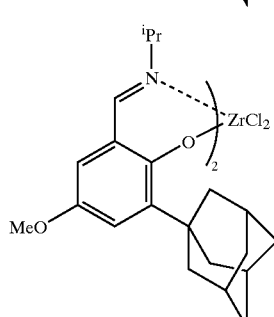
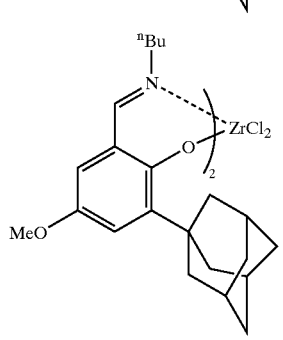

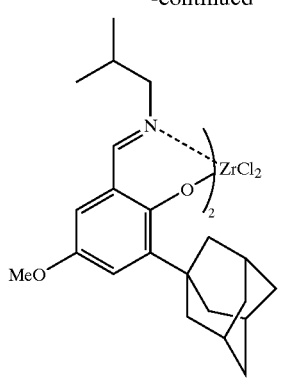
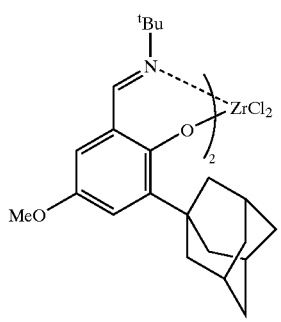
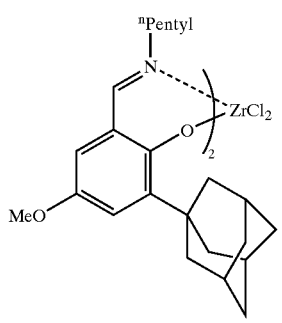
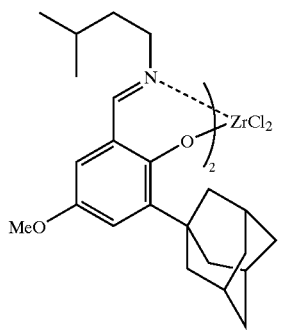
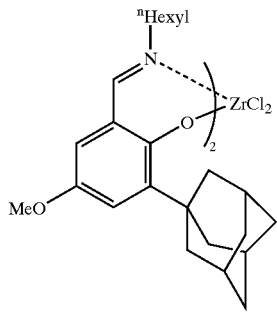
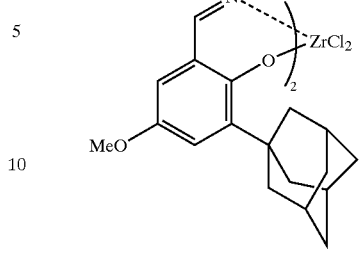
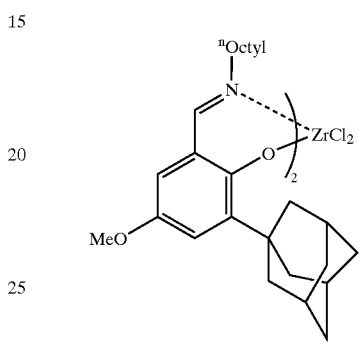
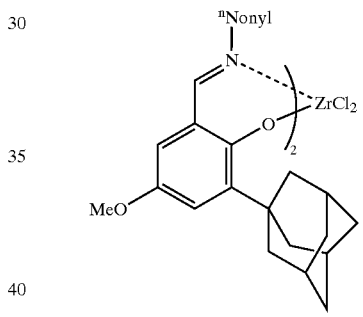
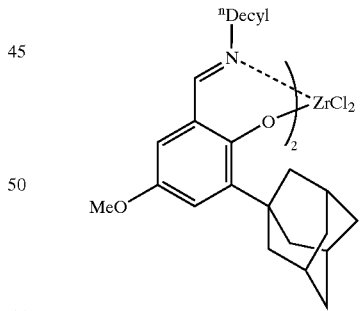
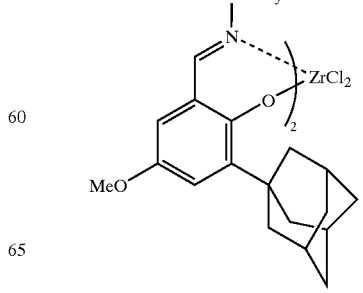

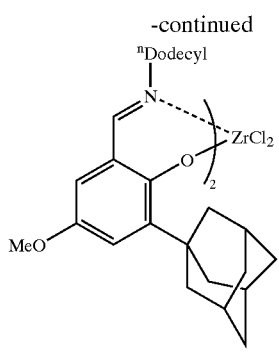
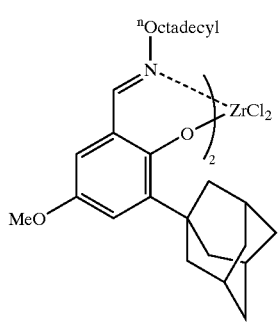
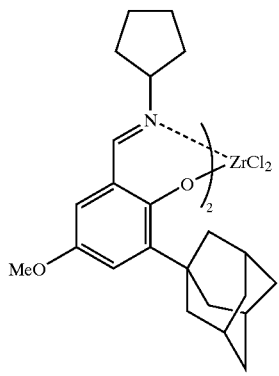
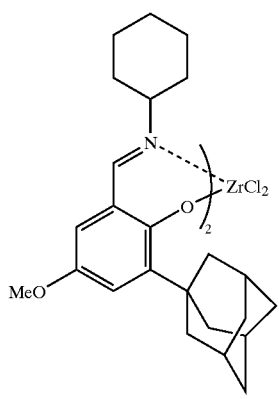
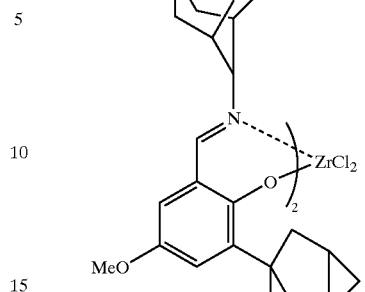
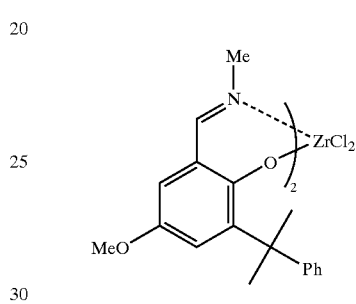
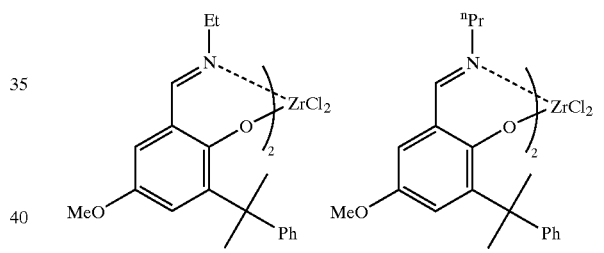
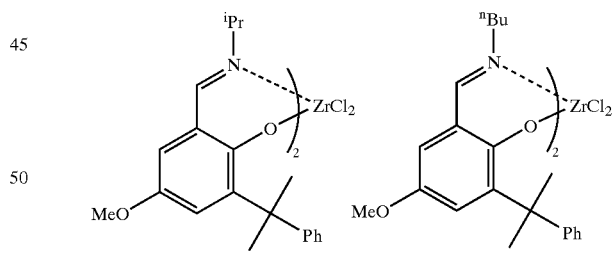
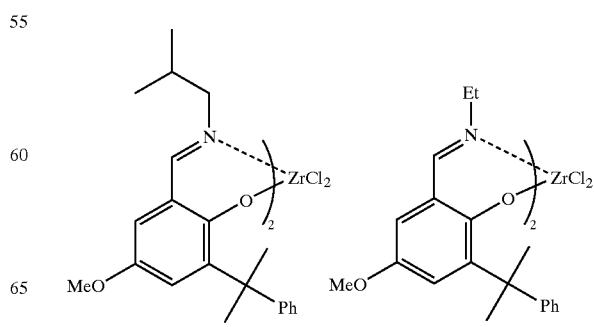

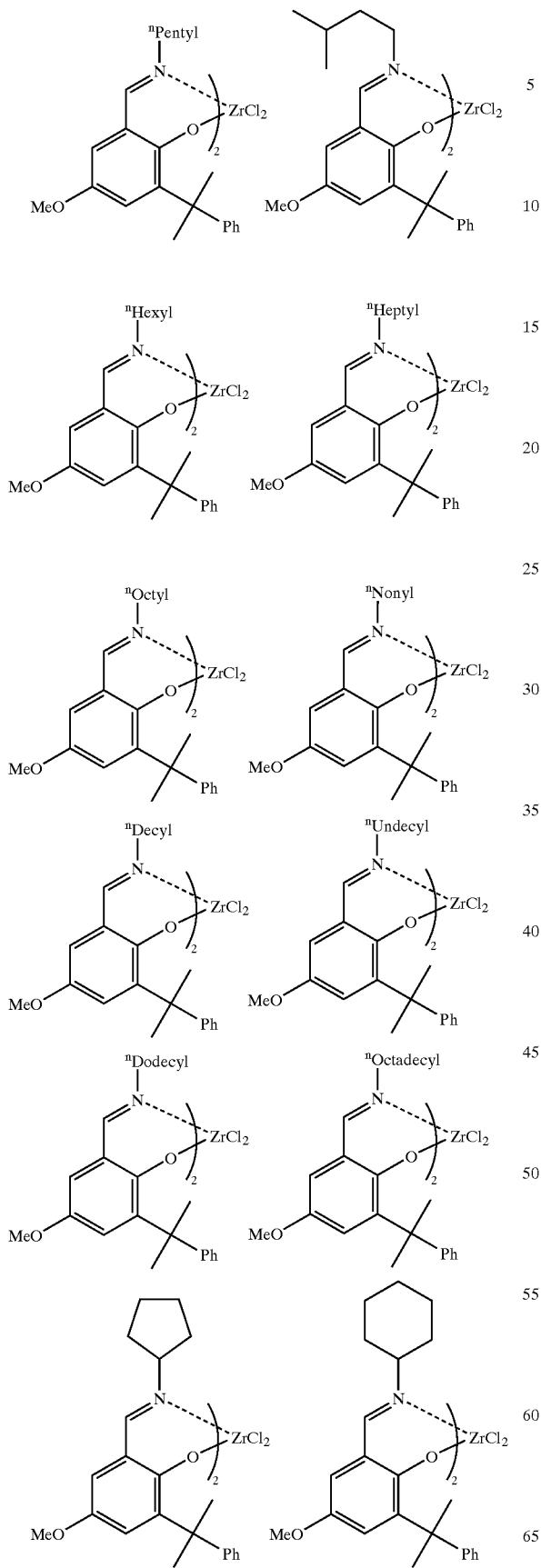
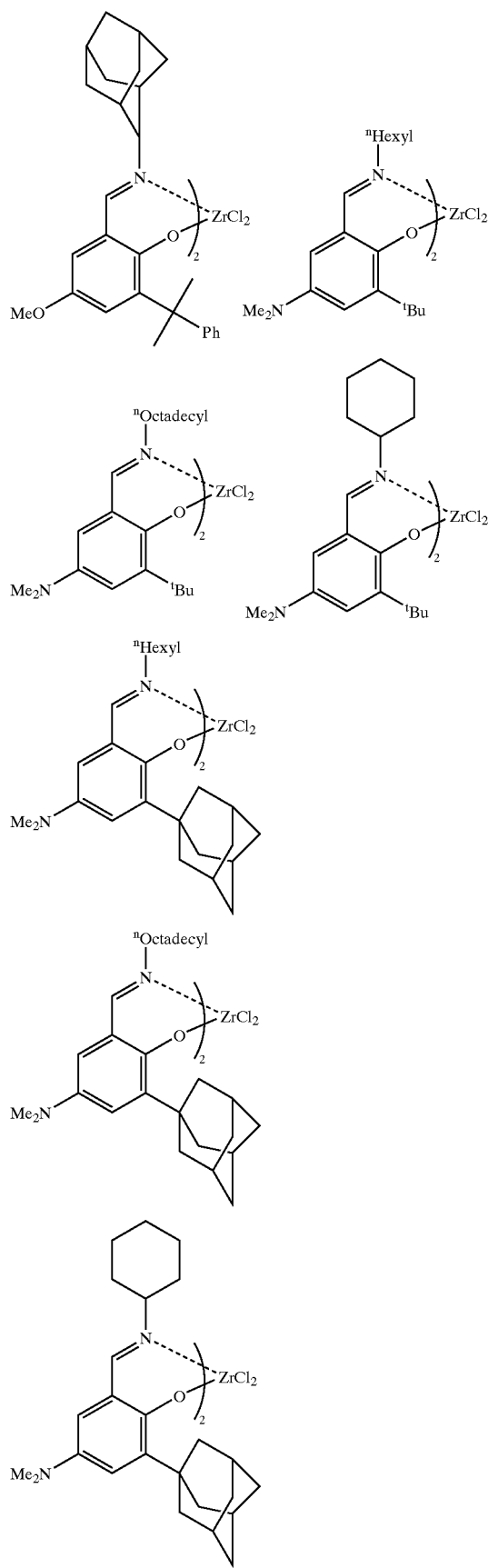

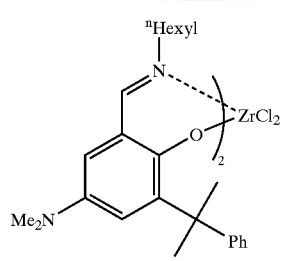
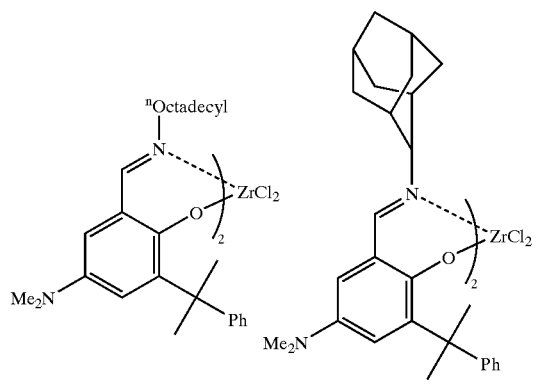
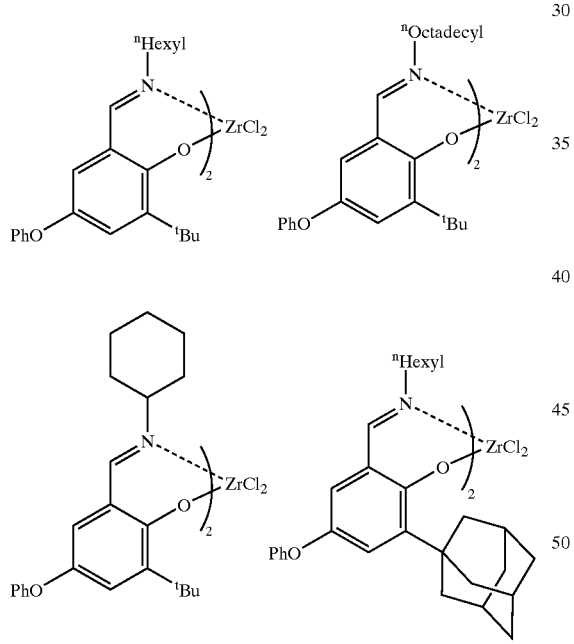
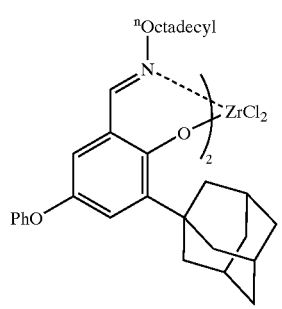
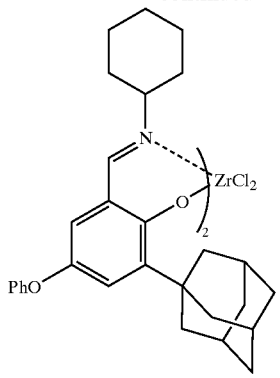
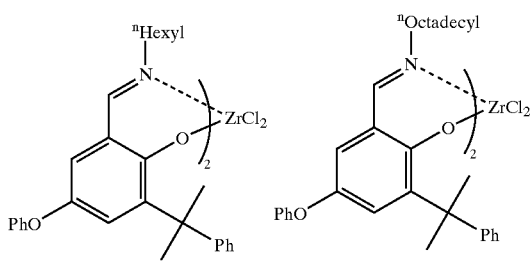
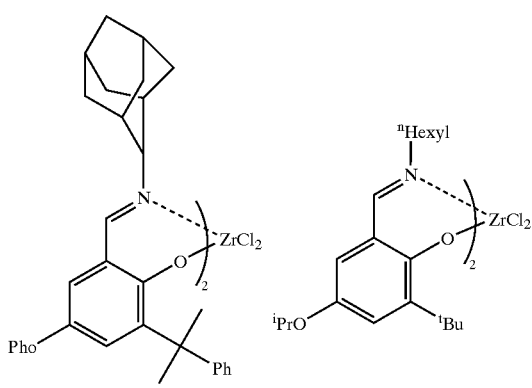
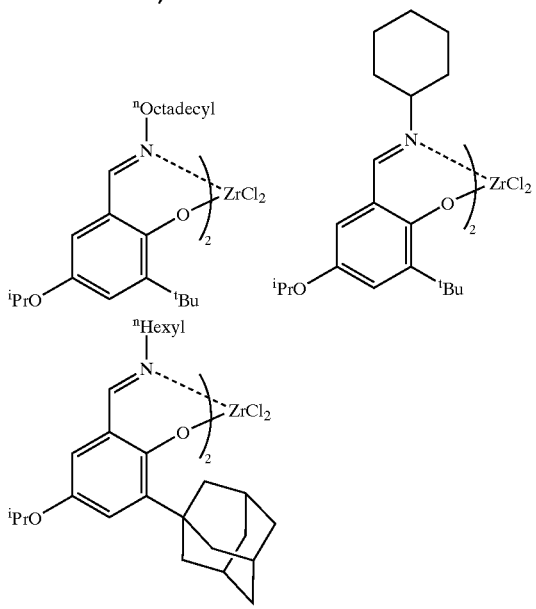

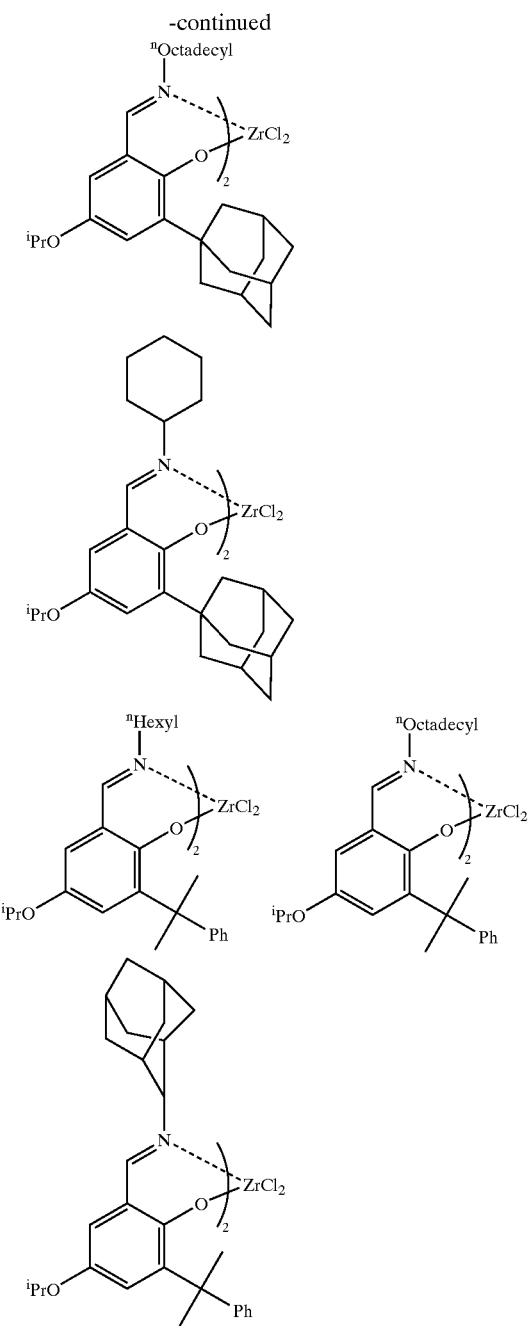

In the above examples, Me denotes a methyl group, Et denotes an ethyl group, $^n$Pr denotes a n-propyl group, $^i$Pr denotes an isopropyl group, $^n$Bu denotes a n-butyl group, $^t$Bu denotes a t-butyl group, $^n$Pentyl denotes a n-pentyl group, $^n$Hexyl denotes a n-hexyl group, $^n$Heptyl denotes a n-heptyl group $^n$Octyl denotes a n-octyl group, $^n$Nonyl denotes a n-nonyl group, $^n$Decyl denotes a n-decyl group, $^n$Undecyl denotes a n-undecyl group, $^n$Dodecyl denotes a n-dodecyl group, $^n$Octadecyl denotes a n-octadecyl group, and Ph denotes a phenyl group.

In the present invention, transition metal compounds wherein the zirconium metal is replaced with a metal other than zirconium, such as titanium or hafnium, in the above-mentioned compounds are also employable.

The process for preparing the transition metal compound represented by the formula (I) or (II) is not specifically limited, and for example, the following process is available.

The transition metal compound represented by the formula (I) can be synthesized by allowing a compound (ligand precursor) which will become a ligand in the synthesized transition metal compound to react with a transition metal M-containing compound represented by $MX_k$ (M and X have the same meanings as those of M and X in the formula (I) and k is a number satisfying a valence of M).

The ligand precursor is obtained by allowing a β-diketone, a β-ketoester compound (including thioketone and thioketoester), an acetylacetone compound or the like to react with a primary amine compound represented by the formula $R^1$—$NH_2$ ($R^1$ has the same meaning as that of $R^1$ in the formula (I)) such as an aniline compound or an alkylamine compound. β-Diketones, β-ketoester compounds (including thioketones and thioketoesters), acetylacetone compounds, etc. are commercially available or obtainable by the processes known in literatures.

For synthesizing the ligand precursor, both of the starting compounds are first dissolved in a solvent. Then, the resulting solution is stirred at a temperature of room temperature to reflux temperature for about 1 to 48 hours, whereby the corresponding ligand precursor is obtained in a high yield.

A solvent usually used for such reaction is employable as the solvent. Above all, an alcohol solvent such as methanol or ethanol or a hydrocarbon solvent such as toluene is preferable.

In the synthesis of the ligand precursor, an acid catalyst such as formic acid, acetic acid or toluenesulfonic acid may be used as the catalyst. It is effective for the progress of the reaction to use a dehydrating agent such as molecular sieves, magnesium sulfate or sodium sulfate or to perform dehydration by the Dean and Stark method.

Preferred examples of the transition metal M-containing compounds include $TiCl_3$, $TiCl_4$, $TiBr_3$, $TiBr_4$, $Ti(benzyl)_4$, $Ti(NiMe_2)_4$, ZrCl4, $Zr(NiMe_2)_4$, $Zr(benzyl)_4$, $ZrBr_4$, $HfCl_4$, $HfBr_4$, $VCl_4$, $VCl_5$, $VBr_4$, $VBr_5$, $Ti(acac)_3$, and complexes of these compounds and tetrahydrofuran (THF), acetonitrile or diethyl ether.

Then, the ligand precursor obtained above is allowed to react with the transition metal M-containing compound, whereby the corresponding transition metal compound can be synthesized.

More specifically, the synthesized ligand precursor is dissolved in a solvent. If necessary, the resulting solution may be contacted with a base to prepare a salt. Then, the solution or the solution with the salt is mixed with a metallic compound such as a metallic halide or a metallic alkylate at a low temperature and stirred at a temperature of −78° C. to room temperature or under reflux for about 1 to 48 hours. A solvent usually used for such reaction is employable as the solvent. Above all, a polar solvent such as ether or tetrahydrofuran or a hydrocarbon solvent such as toluene is preferably used. Preferred examples of the bases used for preparing a phenoxide salt include metallic salts such as lithium salts (e.g., n-butyllithium) and sodium salts (e.g., sodium hydride) and organic bases such as triethylamine and pyridine.

Depending upon properties of the transition metal compound, the ligand precursor is directly reacted with the metallic compound without producing a salt, whereby the corresponding transition metal compound can be synthesized.

Further, it is possible to exchange the metal M in the synthesized transition metal compound with another transition metal by a conventional method. Furthermore, when any of $R^1$ to $R^5$ is H, a substituent group other than H can be introduced in any stage of the synthesis process.

The transition metal compound represented by the formula (I-a) or (I-b) can be synthesized by allowing a compound (ligand precursor) for forming a ligand such as a thiosalicylidene ligand or an anilino ligand to react with a transition metal M-containing compound.

The ligand precursor for forming the thiosalicylidene ligand is obtained by, for example, allowing a thiosalicylaldehyde compound to react with an aniline compound or an amine compound.

To obtain the ligand precursor, o-acylbenzenethiol may be allowed to react with an aniline compound or an amine compound.

More specifically, a thiosalicylaldehyde compound or o-acylbenzenethiol and an aniline compound wherein the nitrogen part has no substituent group or a primary amine compound are dissolved in a solvent, and the solution is stirred at a temperature of room temperature to reflux temperature for about 1 to 48 hours, whereby the ligand precursor is obtained. As the solvent, an alcohol solvent such as methanol or ethanol or a hydrocarbon solvent such as toluene is preferably employed. As the catalyst, an acid catalyst such as formic acid, acetic acid or toluenesulfonic acid can be employed. It is effective for the progress of the reaction to remove water from the reaction system by the Dean and Stark method during the reaction. Molecular sieves, magnesium sulfate, sodium sulfate or the like is employable as a dehydrating agent.

The o-acylbenzenethiol used herein can be obtained by, for example, allowing the OH group of o-acylphenol to react with dimethyl thiocarbamate to obtain thiocarbamate and then performing conversion reaction of oxygen atom and sulfur atom by means of heat or the like.

The anilino ligand precursor can be obtained by allowing an o-formaniline compound to react with an aniline compound or an amine compound. To obtain the ligand precursor, o-acylaniline may be allowed to react with aniline acid or an amine compound.

More specifically, the ligand precursor can be synthesized in the same manner as described above using, for example, an o-formaniline compound wherein the nitrogen part has no substituent group or o-acylaniline wherein the nitrogen part has no substituent group and an aniline compound wherein the nitrogen part has no substituent group or a primary amine compound.

The o-acylaniline used herein can be obtained by, for example, reducing the carboxylic acid group of an o-aminobenzoic acid compound. A N-alkylation reaction of an anthranil compound may be performed to obtain the corresponding N-alkyl-o-acylaniline compound.

The ligand precursor obtained as above is allowed to react with a transition metal M-containing compound, whereby the corresponding transition metal compound can be synthesized. More specifically, the ligand precursor is dissolved in a solvent. If necessary, the resulting solution may be contacted with a base to prepare a thiophenoxide salt or an anilino salt. Then, the solution or the solution with the salt is mixed with a transition metal M-containing compound such as a metallic halide or a metallic alkylate at a low temperature and stirred at a temperature of −78° C. to room temperature or under reflux for about 1 to 24 hours to obtain a transition metal compound.

Examples of the solvents preferably used herein include polar solvents such as ether and tetrahydrofuran and hydrocarbon solvents such as toluene, without limiting thereto. Examples of the bases preferably used herein include lithium salts such as n-butyllithium, sodium salts such as sodium hydride, and nitrogen-containing compounds such as pyridine and triethylamine, without limiting thereto.

Depending upon the type of the transition metal compound, the ligand compound is directly reacted with the metallic compound, without preparing a thiophenoxide salt or an anilino salt, whereby the corresponding compound can be synthesized.

The transition metal compound represented by the formula (II) can be synthesized in a manner similar to that described above.

The structure of the resulting transition metal compound is determined by 270 MHz $^1$H-NMR (Japan Electron Optics Laboratory GSH-270), FT-IR (SHIMADZU FT-IR8200D), FD-mass spectrometry (Japan Electron Optics Laboratory SX-102A), metal content analysis (analysis by ICP method after dry ashing and dissolution in dilute nitric acid, device: SHIMADZU ICPS-8000), and carbon, hydrogen and nitrogen content analysis (Halaus CHNO Model).

The transition metal compound obtained by the process described above is generally isolated by a conventional method and then used for polymerization. However, the reaction solution of the ligand precursor and the metallic compound can be used, as it is, for polymerization, without isolating the transition metal compound.

The transition metal compounds represented by the formula (I) are used singly or in combination of two or more kinds as an olefin polymerization catalyst.

It is a preferred embodiment of the present invention to use the transition metal compound (A-1) or (A-2) together with at least one compound (B) selected from (B-1) an organometallic compound, (B-2) an organoaluminum oxy-compound and (B-3) a compound which reacts with the transition metal compound to form an ion pair.

(B-1) Organometallic Compound

Examples of the organometallic compounds (B-1) for use in the invention may include the below-described compounds which contain a metal selected from Group 1, Group 2, Group 12 and Group 13 of the periodic table.

(B-1a) Organoaluminum compound represented by the following formula:

$$R^a{}_m Al(OR^b)_n H_p X_q$$

wherein $R^a$ and $R^b$ may be the same or different and are each a hydrocarbon group of 1 to 15 carbon atoms, preferably 1 to 4 carbon atoms; X is a halogen atom; and m, n, p and q are numbers satisfying the conditions of $0 < m \leq 3$, $0 \leq n < 3$, $0 \leq p < 3$, $0 \leq q < 3$ and $m+n+p+q=3$.

(B-1b) Alkyl complex compound comprising a metal of Group 1 of the periodic table and aluminum, said compound being represented by the following formula:

$$M^2 Al R^a{}_4$$

wherein $M^2$ is Li, Na or K; and $R^a$ is a hydrocarbon group of 1 to 15 carbon atoms, preferably 1 to 4 carbon atoms.

(B-1c) Dialkyl compound containing a metal of Group 2 or Group 12 of the periodic table, said compound being represented by the following formula:

$$R^a R^b M^3$$

wherein $R^a$ and $R^b$ may be the same or different and are each a hydrocarbon group of 1 to 15 carbon atoms, preferably 1 to 4 carbon atoms; and $M^3$ is Mg, Zn or Cd.

Examples of the organoaluminum compounds (B-1a) include:

an organoaluminum compound represented by the following formula:

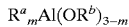
$$R^a_m Al(OR^b)_{3-m}$$

wherein $R^a$ and $R^b$ may be the same or different and are each a hydrocarbon group of 1 to 15 carbon atoms, preferably 1 to 4 carbon atoms, and m is preferably a number satisfying the condition of $1.5 \leq m \leq 3$;

an organoaluminum compound represented by the following formula:

$$R^a_m AlX_{3-m}$$

wherein $R^a$ is a hydrocarbon group of 1 to 15 carbon atoms, preferably 1 to 4 carbon atoms, X is a halogen atom, and m is preferably a number satisfying the condition of $0<m<3$;

an organoaluminum compound represented by the following formula:

$$R^a_m AlH_{3-m}$$

wherein $R^a$ is a hydrocarbon group of 1 to 15 carbon atoms, preferably 1 to 4 carbon atoms, and m is preferably a number satisfying the condition of $2 \leq m<3$;
and
an organoaluminum compound represented by the following formula:

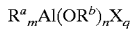
$$R^a_m Al(OR^b)_n X_q$$

wherein $R^a$ and $R^b$ may be the same or different and are each a hydrocarbon group of 1 to 15 carbon atoms, preferably 1 to 4 carbon atoms, X is a halogen atom, and m, n and q are numbers satisfying the conditions of $0<m \leq 3$, $0 \leq n<3$, $0 \leq q<3$ and $m+n+q=3$.

Particular examples of the organoaluminum compounds (B-1a) include:

tri-n-alkylaluminums, such as trimethylaluminum, triethylaluminum, tri-n-butylaluminum, tripropylaluminum, tripentylaluminum, trihexylaluminum, trioctylaluminum and tridecylaluminum;

branched-chain trialkylaluminums, such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum;

tricycloalkylaluminums, such as tricyclohexylaluminum and tricyclooctylaluminum;

triarylaluminums, such as triphenylaluminum and tritolylaluminum;

dialkylaluminum hydrides, such as diisobutylaluminum hydride;

trialkenylaluminums represented by $(i-C_4H_9)_x Al_y (C_5H_{10})_z$ (wherein x, y and z are each a positive number, and $z \geq 2x$), such as triisoprenylaluminum;

alkylaluminum alkoxides, such as isobutylaluminum methoxide, isobutylaluminum ethoxide and isobutylaluminum isopropoxide;

dialkylaluminum alkoxides, such as dimethylaluminum methoxide, diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums having an average composition represented by $R^a_{2.5} Al(OR^b)_{0.5}$;

dialkylaluminum aryloxides, such as diethylaluminum phenoxide, diethylaluminum (2,6-di-t-butyl-4-methylphenoxide), ethylaluminumbis(2,6-di-t-butyl-4-methylphenoxide), diisobutylalumium(2,6-di-t-butyl-4-methylphenoxide) and isobutylaluminumbis(2,6-di-t-butyl-4-methylphenoxide);

dialkylaluminum halides, such as dimethylaluminum chloride, diethylaluminum chloride, dibutylaluminum chloride, diethylaluminum bromide and diisobutylaluminum chloride;

alkylaluminum sesquihalides, such as ethylaluminum sesquichloride, butylaluminum sesquichloride and ethylaluminum sesquibromide, partially halogenated alkylaluminums, such as ethylaluminum dichloride, propylaluminum dichloride and butylaluminum dibromide;

dialkylaluminum hydrides, such as diethylaluminum hydride and dibutylaluminum hydride;

partially hydrogenated other alkylaluminums, specifically, alkylaluminum dihydrides, such as ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

Compounds analogous to the organoaluminum compound (B-1a) are also employable. For example, there can be mentioned organoaluminum compounds wherein two or more aluminum compounds are combined through a nitrogen atom, such as $(C_2H_5)_2 AlN(C_2H_5) Al(C_2H_5)_2$.

Examples of the compounds (B-1b) include $LiAl(C_2H_5)_4$ and $LiAl(C_7H_{15})_4$.

Other compounds, such as methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium and butylethylmagnesium, are also employable as the organometallic compounds (B-1).

Combinations of compounds capable of producing the above-mentioned organoaluminum compounds in the polymerization system, e.g., a combination of halogenated aluminum and alkyllithium and a combination of halogenated aluminum and alkylmagnesium, are also employable.

Of the organometallic compounds (B-1), the organoaluminum compounds are preferable.

The organometallic compounds (B-1) mentioned above are used singly or in combination of two or more kinds.

(B-2) Organoaluminum Oxy-Compound

Examples of the organoaluminum oxy-compound (B-2) for use in the invention may be conventional aluminoxane or such a benzene-insoluble organoaluminum oxy-compound as exemplified in Japanese Patent Laid-open Publication No. 78687/1990.

The conventional aluminoxane can be prepared by, for example, the following processes, and is generally obtained as a hydrocarbon solvent solution.

(1) An organoaluminum compound such as trialkylaluminum is added to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, to allow the organoaluminum compound to react with the adsorption water or the water of crystallization.

(2) Water, ice or water vapor is allowed to directly act on an organoaluminum compound such as trialkylaluminum in a medium such as benzene, toluene, ethyl ether or tetrahydrofuran.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the recovered solution of aluminoxane and the remainder is redissolved in a solvent or suspended in a poor solvent for aluminoxane.

Examples of the organoaluminum compounds used for preparing the aluminoxane include the same organoaluminum compounds as previously described with respect to the organoaluminum compound (B-1a). Of these, preferable are trialkylaluminums and tricycloalkylaluminums. Particularly preferable is trimethylaluminum.

The organoaluminum compounds are used singly or in combination of two or more kinds.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halogenated products of these aromatic, aliphatic and alicyclic hydrocarbons, particularly chlorinated or brominated products thereof. Ethers such as ethyl ether and tetrahydrofuran are also employable. Of the solvents, particularly preferable are aromatic hydrocarbons and aliphatic hydrocarbons.

The benzene-insoluble organoaluminum oxy-compound for use in the invention is preferably an organoaluminum oxy-compound containing an Al component that is soluble in benzene at 60° C. in an amount of usually not more than 10%, preferably not more than 5%, particularly preferably not more than 2% in terms of Al atom. That is, the benzene-insoluble organoaluminum oxy-compound is preferably insoluble or sparingly soluble in benzene.

The organoaluminum oxy-compound for use in the invention is, for example, an organoaluminum oxy-compound containing boron and represented by the following formula (III):

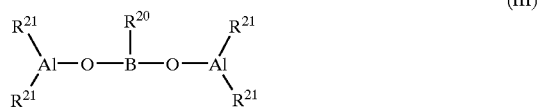

(III)

wherein $R^{20}$ is a hydrocarbon group of 1 to 10 carbon atoms; and each $R^{21}$ may be the same or different and is a hydrogen atom, a halogen atom or a hydrocarbon group of 1 to 10 carbon atoms.

The organoaluminum oxy-compound containing boron and represented by the formula (III) can be prepared by allowing an alkylboronic acid represented by the following formula (IV) to react with an organoaluminum compound in an inert solvent at a temperature of −80° C. to room temperature for a period of 1 minute to 24 hours under an inert gas atmosphere, $$R^{20}-B-(OH)_2 \quad (IV)$$

wherein $R^{20}$ is the same group as described above.

Examples of the alkylboronic acids represented by the formula (IV) include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluoroboronic acid, pentafluorophenylboronic acid and 3,5-bis(trifluoromethyl) phenylboronic acid. Of these, preferable are methylboronic acid, n-butylboronic acid, isobutylboronic acid, 3,5-difluorophenylboronic acid and pentafluorophenylboronic acid. These alkylboronic acids are used singly or in combination of two or more kinds.

Examples of the organoaluminum compounds to be reacted with the alkylboronic acid include the same organoaluminum compounds as previously described with respect to the organoaluminum compound (B-1a). Of these, preferable are trialkylaluminums and tricycloalkylaluminums. Particularly preferable are trimethylaluminum, triethylaluminum and triisobutylaluminum. These organoaluminum compounds are used singly or in combination of two or more kinds.

The organoaluminum oxy-compounds (B-2) mentioned above are used singly or in combination of two or more kinds.

(B-3) Compound Which Reacts with the Transition Metal Compound to Form Ion Pair

Examples of the compound (B-3) which reacts with the transition metal compound (A) to form an ion pair (referred to as "ionizing ionic compound" hereinafter) may include a compound which reacts with the transition metal compound represented by the above formula (I) or (II) to form an ion pair, such as Lewis acid, an ionic compound, a borane compound and a carborane compound described in Japanese Patent Laid-Open Publications No. 501950/1989, No. 502036/1989, No. 179005/1991, No. 179006/1991, No. 207703/1991 and No. 207704/1991, and U.S. Pat. No. 5,321,106. A heteropoly compound and an isopoly compound are also available.

The Lewis acid is, for example, a compound represented by $BR_3$ (R is fluorine or a phenyl group which may have a substituent group such as fluorine, methyl or trifluoromethyl). Examples of such compounds include trifluoroboron, triphenylboron, tris(4-fluorophenyl)boron, tris(3,5-difluorophenyl)boron, tris(4-fluoromethylphenyl) boron, tris(pentafluorophenyl)boron, tris(p-tolyl)boron, tris (o-tolyl)boron and tris(3,5-dimethylphenyl)boron.

The ionic compound is, for example, a compound represented by the following formula (V):

(V)

In the above formula, $R^{22}$ is $H^+$, carbonium cation, oxonium cation, ammonium cation, phosphonium cation, cycloheptyltrienyl cation, ferrocenium cation having a transition metal, or the like.

$R^{23}$ to $R^{26}$ may be the same or different and are each an organic group, preferably an aryl group or a substituted aryl group.

Examples of the carbonium cations include tri-substituted carbonium cations, such as triphenylcarbonium cation, tri (methylphenyl)carbonium cation and tri(dimethylphenyl) carbonium cation.

Examples of the ammonium cations include trialkylammonium cations, such as trimethylammonium cation, triethylammonium cation, tripropylammonium cation, tributylammonium cation and tri(n-butyl)ammonium cation; N,N-dialkylanilinium cations, such as N,N-dimethylanilinium cation, N,N-diethylanilinium cation and N,N-2,4,6-pentamethylanilinium cation; and dialkylammonium cations, such as di(isopropyl)ammonium cation and dicyclohexylammonium cation.

Examples of the phosphonium cations include triarylphosphonium cations, such as triphenylphosphonium cation, tri(methylphenyl)phosphonium cation and tri(dimethylphenyl)phosphonium cation.

$R^{22}$ is preferably carbonium cation, ammonium cation or the like, particularly preferably triphenylcarbonium cation, N,N-dimethylanilinium cation or N,N-diethylanilinium cation.

Also employable as the ionic compound is a trialkyl-substituted ammonium salt, a N,N-dialkylanilinium salt, a dialkylamonium salt or a triarylphosphonium salt.

Examples of the trialkyl-substituted ammonium salts include triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tri(n-butyl)ammoniumtetra(pentafluorophenyl)boron, tripropylammoniumtetra(o,p-dimethylphenyl)boron, tri(n-butyl)ammoniumtetra(m,m-dimethylphenyl)boron, tri(n-butyl)ammoniumtetra(p-trifluoromethylphenyl)boron, tri(n-butyl)ammoniumtetra(3,5-ditrifluoromethylphenyl)boron and tri(n-butyl)ammoniumtetra(o-tolyl)boron.

Examples of the N,N-dialkylanilinium salts include N,N-dimethylaniliniumtetra(phenyl)boron, N,N-diethylaniliniumtetra(phenyl)boron and N,N-2,4,6-pentamethylaniliniumtetra(phenyl)boron.

Examples of the dialkylammonium salts include di(1-propyl)ammoniumtetra(pentafluorophenyl)boron and dicyclohexylammoniumtetra(phenyl)boron.

Further employable as the ionic compound is triphenylcarbeniumtetrakis(pentafluorophenyl)borate, N,N-dimethylaniliniumtetrakis(pentafluorophenyl)borate, ferroceniumtetra(pentafluorophenyl)borate, triphenylcarbeniumpentaphenylcyclopentadienyl complex, N,N-diethylaniliniumpentaphenylcyclopentadienyl complex or a boron compound represented by the following formula (VI) or (VII):

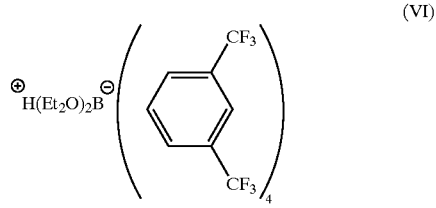

(VI)

wherein Et is an ethyl group.

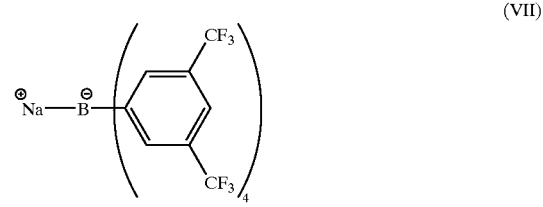

(VII)

Examples of the borane compounds include:
decaborane(14);
salts of anions, such as bis(tri(n-butyl)ammonium) nonaborate, bis(tri(n-butyl)ammonium)decaborate, bis(tri(n-butyl)ammonium)undecaborate, bis(tri(n-butyl)ammonium)dodecaborate, bis(tri(n-butyl)ammonium)decachlorodecaborate and bis(tri(n-butyl)ammonium)dodecachlorododecaborate; and
salts of metallic borane anions, such as tri(n-butyl)ammoniumbis(dodecahydridododecaborate)cobaltate(III) and bis(tri(n-butyl)ammonium)bis-(dodecahydridododecaborate)nickelate(III).

Examples of the carborane compounds include:
salts of anions, such as 4-carbanonaborane(14), 1,3-dicarbanonaborane(13), 6,9-dicarbadecaborane(14), dodecahydrido-1-phenyl-1,3-dicarbanonaborane, dodecahydrido-1-methyl-1,3-dicarbanonaborane, undecahydrido-1,3-dimethyl-1,3-dicarbanonaborane, 7,8-dicarbaundecaborane(13), 2,7-dicarbaundecaborane(13), undecahydrido-7,8-dimethyl-7,8-dicarbaundecaborane, dodecahydrido-11-methyl-2,7-dicarbaundecaborane, tri(n-butyl)ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate, tri(n-butyl)ammoniumbromo-1-carbadodecaborate, tri(n-butyl)ammonium-6-carbadecaborate(14), tri(n-butyl)ammonium-6-carbadecaborate(12), tri(n-butyl)ammonium-7-carbaundecaborate(13), tri(n-butyl)ammonium-7,8-dicarbaundecaborate(12), tri(n-butyl)ammonium-2,9-dicarbaundecaborate(12), tri(n-butyl)ammoniumdodecahydrido-8-methyl-7,9-dicarbaundecaborate, tri(n-butyl)ammoniumundecahydrido-8-ethyl-7,9-dicarbaundecaborate, tri (n-butyl)ammoniumundecahydrido-8-butyl-7,9-dicarbaundecaborate, tri(n-butyl)ammoniumundecahydrido-8-allyl-7,9-dicarbaundecaborate, tri(n-butyl)ammoniumundecahydrido-9-trimethylsilyl-7,8-dicarbaundecaborate and tri(n-butyl)ammoniumundecahydrido-4,6-dibromo-7-carbaundecaborate; and
salts of metallic carborane anions, such as tri(n-butyl)ammoniumbis(nonahydrido-1,3-dicarbanonaborate)cobaltate(III), tri(n-butyl)ammoniumbis(undecahydrido-7,8-dicarbaundecaborate)ferrate(III), tri(n-butyl)ammoniumbis(undecahydrido-7,8-dicarbaundecaborate)cobaltate(III), tri(n-butyl)ammoniumbis(undecahydrido-7,8-dicarbaundecaborate)nickelate(III), tri(n-butyl)ammoniumbis(undecahydrido-7,8-dicarbaundecaborate)cuprate(III), tri(n-butyl)ammoniumbis(undecahydrido-7,8-dicarbaundecaborate)aurate(III), tri(n-butyl)ammoniumbis(nonahydrido-7,8-dimethyl-7,8-dicarbaundecaborate)ferrate (III), tri(n-butyl)ammoniumbis(nonahydrido-7,8-dimethyl-7,8-dicarbaundecaborate)chromate(III), tri(n-butyl)ammoniumbis(tribromooctahydrido-7,8- dicarbaundecaborate)cobaltate(III), tris(tri(n-butyl) ammonium)bis(undecahydrido-7-carbaundecaborate) chromate(III), bis(tri(n-butyl)ammonium)bis (undecahydrido-7-carbaundecaborate)manganate(IV), bis (tri(n-butyl)ammonium)bis(undecahydrido-7-carbaundecaborate)cobaltate(III) and bis(tri(n-butyl) ammonium)bis(undecahydrido-7-carbaundecaborate) nickelate(IV).

The heteropoly compound comprises an atom selected from silicon, phosphorus, titanium, germanium, arsenic and tin and one or more atoms selected from vanadium, niobium, molybdenum and tungsten. Examples of such compounds include phosphovanadic acid, germanovanadic acid, arsenovanadic acid, phosphoniobic acid, germanoniobic acid, silicomolybdic acid, phosphomolybdic acid, titanomolybdic acid, germanomolybdic acid, arsenomolybdic acid, stannomolybdic acid, phosphotungstic acid, germanotungstic acid, stannotungstic acid, phosphomolybdovanadic acid, phosphotungstovanadic acid, germanotungstovanadic acid, phosphomolybdotungstovanadic acid, germanomolybdotungstovanadic acid, phosphomolybdotungstic acid, phosphomolybdoniobic acid and salts of these acids, for example, the salt of these acids and metals of Group 1 or Group 2 of the periodic table (e.g., lithium, sodium, potassium, rubidium, cesium, beryllium, magnesium, calcium, strontium, barium), and organic salts such as salts of these acids and triphenylethyl salt, but the compounds are not limited to these examples.

The ionizing ionic compounds (B-3) mentioned above are used singly or in combination of two or more kinds.

In the process for olefin polymerization according to the invention, the transition metal compound (A-1) or (A-2) may be used alone, or the transition metal compound (A-1) or (A-2) may be used together with at least one compound (B) selected from:

(B-1) an organometallic compound, (B-2) an organoaluminum oxy-compound, and (B-3) a compound which reacts with the transition metal compound to form an ion pair.

When the compound represented by the formula (II) is used as a transition metal compound and the component (B) is used in combination, the transition metal compound (A) forms a compound represented by the following formula (II-a) in the polymerization system:

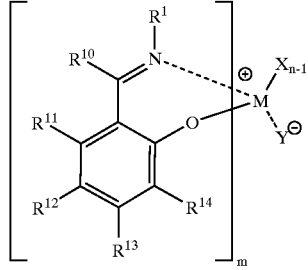

(II-a)

wherein $R^1$, $R^{10}$ to $R^{14}$, M, m, n and X have the same meanings as those of $R^1$, $R^{10}$ to $R^{14}$, M, m, n and X in the formula (II), and Y is a "weak coordination anions".

In the formula (II-a), the bond between the metal M and Y may be a covalent bond or an ionic bond.

Examples of Y include weak coordination anions described in *Chemical Review*, Vol. 88, p. 1405 (1988), *Chemical Review*, Vol. 93, p. 927(1993), and WO 98/30612, p. 6.

More specifically, there can be mentioned:

$AlR^{4-}$ wherein each R may be the same or different and is an atom or a group selected from an oxygen atom, a nitrogen atom, a phosphorus atom, a hydrogen atom, a halogen atom, a substituent group containing any of these atoms, an aliphatic hydrocarbon group, an aromatic hydrocarbon group, an alicyclic hydrocarbon group, an aliphatic, aromatic or alicyclic hydrocarbon group substituted with an oxygen atom, a nitrogen atom, a phosphorus atom or a halogen atom, and an aliphatic, aromatic or alicyclic hydrocarbon group substituted with a substituent group having an oxygen atom, a nitrogen atom, a phosphorus atom or a halogen atom;

$BR^{4-}$ wherein each R may be the same or different and is an atom or a group selected from an oxygen atom, a nitrogen atom, a phosphorus atom, a hydrogen atom, a halogen atom, a substituent group containing any of these atoms, an aliphatic hydrocarbon group, an aromatic hydrocarbon group, an alicyclic hydrocarbon group, an aliphatic, aromatic or alicyclic hydrocarbon group substituted with an oxygen atom, a nitrogen atom, a phosphorus atom or a halogen atom, and an aliphatic, aromatic or alicyclic hydrocarbon group substituted with a substituent group having an oxygen atom, a nitrogen atom, a phosphorus atom or a halogen atom;

$PF^{5-}$;

$SbF^{5-}$;

trifluoromethanesulfonato; and p-toluenesulfonato.

In addition to the transition metal compound (A-1) or (A-2) (sometimes referred to as a "component (A)" hereinafter) and at least one compound (B) (sometimes referred to as a "component (B)" hereinafter) selected from the organometallic compound (B-1), the organoaluminum oxy-compound (B-2) and the compound (B-3) which reacts with the transition metal compound to form an ion pair, said component (B) being optionally used, the olefin polymerization catalyst of the invention can further contain the below-described carrier (C) and/or the later-described organic compound (D), if necessary.

(C) Carrier

The carrier (C) for optional use in the invention is an inorganic or organic compound in the form of granular or particulate solid.

As the inorganic compound, porous oxide, inorganic halogenide, clay, clay mineral or an ion-exchange layered compound is preferable.

Examples of the porous oxides include $SiO_2$, $Al_2O_3$, MgO, ZrO, TiO2, $B_2O_3$, CaO, ZnO, BaO, $ThO_2$, and complex compounds or mixtures containing these oxides, such as natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these, preferable are compounds containing $SiO_2$ and/or $Al_2O_3$ as their major component.

The inorganic oxides may contain small amounts of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Although the porous oxides differ in their properties depending upon the type and the preparation process thereof, the carrier preferably used in the invention has a particle diameter of 10 to 300 μm, preferably 20 to 200 μm, a specific surface area of 50 to 1000 m²/g, preferably 100 to 700 m²/g, and a pore volume of 0.3 to 3.0 cm³/g. If necessary, the carrier is calcined at 100 to 1000° C., preferably 150 to 700° C., prior to use.

Examples of the inorganic halogenides employable in the invention include $MgCl_2$, $MgBr_2$, $MnCl_2$ and $MnBr_2$. The inorganic halogenide may be used as it is, or may be used after pulverized by a ball mill or an oscillating mill. The inorganic halogenide may be used as fine particles of a precipitate obtained by dissolving the inorganic halogenide in a solvent such as alcohol and then conducting precipitation using a precipitant.

The clay employable in the invention is generally mainly composed of clay mineral. The ion-exchange layered compound employable is a compound having a crystal structure wherein layers structured by ionic bonding or the like are laminated in parallel to one another with a weak bond strength, and the ions contained in the compound are exchangeable. Most of clay minerals are ion-exchange layered compounds. The clay, the clay minerals and the ion-exchange layered compounds employable in the invention are not limited to natural ones but include synthetic ones.

Examples of such clay, clay minerals and ion-exchange layered compounds include clay, clay minerals and ion crystalline compounds having layered crystal structures such as hexagonal closest packing type, antimony type, $CdCl_2$ type and $CdI_2$ type.

Particular examples of the clay and the clay minerals include kaolin, bentonite, kibushi clay, gairome clay, allophane, hisingerite, pyrophyllite, mica, montmorillonite, vermiculite, chlorite, palygorskite, kaolinite, nacrite, dickite and halloysite. Particular examples of the ion-exchange layered compounds include crystalline acid salts of polyvalent metals, such as α-$Zr(HAsO_4)_2 \cdot H_2O$, α-$Zr(HPO_4)_2$, α-$Zr(KPO_4)_2 \cdot 3H_2O$, α-$Ti(HPO_4)_2$, α-$Ti(HAsO_4)_2 \cdot H_2O$, α-$Sn(HPO_4)_2 \cdot H_2O$, γ-$Zr(HPO_4)_2$, γ-$Ti(HPO_4)_2$, and γ-$Ti(NH_4PO_4)_2 \cdot H_2O$.

The clay, the clay minerals and the ion-exchange layered compounds are preferably those having a pore volume, as measured on pores having a radius of not less than 20 Å by a mercury penetration method, of not less than 0.1 cc/g, and are particularly preferably those having a pore volume of 0.3 to 5 cc/g. The pore volume is measured on the pores having a radius of 20 to $3 \times 10^4$ Å by a mercury penetration method using a mercury porosimeter.

If a compound having a pore volume, as measured on pores having a radius of not less than 20 Å, of less than 0.1 cc/g is used as the carrier, it tends to be difficult to obtain high polymerization activity.

It is preferable that the clay and the clay minerals for use in the invention are subjected to chemical treatments. Any of surface treatments to remove impurities attached to the surface and treatments having an influence on the crystal structure of the clay are employable. Examples of such chemical treatments include acid treatment, alkali treatment, salt treatment and organic substance treatment. The acid treatment contributes to not only removing impurities from the surface but also eluting cations such as Al, Fe and Mg present in the crystal structure to increase the surface area. The alkali treatment destroys crystal structure of clay to bring about change in the structure of the clay. The salt treatment and the organic substance treatment can produce ionic complex, molecular complex, organic derivative or the like to change the surface area or the distance between layers.

The ion-exchange layered compound for use in the invention may be a layered compound in which the exchangeable ions between layers have been exchanged with other large and bulky ions utilizing ion exchange properties to enlarge the distance between the layers. The bulky ion plays a pillar-like roll to support the layer structure and is generally called a "pillar". Introduction of other substances between layers of a layered compound is called "intercalation". Examples of the guest compounds to be intercalated include cationic inorganic compounds, such as $TiCl_4$ and $ZrCl_4$; metallic alkoxides, such as $Ti(OR)_4$, $Zr(OR)_4$, $PO(OR)_3$ and $B(OR)_3$ (R is a hydrocarbon group or the like); and metallic hydroxide ions, such as $(Al_{13}O_4(OH)_{24})^{7+}$, $(Zr_4(OH)_{14})^{2+}$ and $(Fe_3O(OCOCH_3)_6)^+$. These compounds are used singly or in combination of two or more kinds. The intercalation of the compounds may be carried out in the presence of polymers obtained by hydrolysis of metallic alkoxides such as $Si(OR)_4$, $Al(OR)_3$ and $Ge(OR)_4$ (R is a hydrocarbon group or the like) or in the presence of colloidal inorganic compounds such as $SiO_2$. Examples of the pillars include oxides produced by intercalation of the above-mentioned metallic hydroxide ions between layers, followed by dehydration under heating.

The clay, clay minerals and ion-exchange layered compounds mentioned above may be used as they are, or may be used after they are subjected to a treatment of ball milling, sieving or the like. Moreover, they may be used after they are subjected to water adsorption or dehydration under heating. The clay, clay minerals and ion-exchange layered compounds may be used singly or in combination of two or more kinds.

Of the above-mentioned materials, preferable are clay and clay minerals, and particularly preferable are montmorillonite, vermiculite, pectolite, taeniolite and synthetic mica.

The organic compound is, for example, a granular or particulate solid compound having a particle diameter of 10 to 300 μm. Examples of such compounds include (copolymers produced using an α-olefin of 2 to 14 carbon atoms such as ethylene, propylene, 1-butene or 4-methyl-1-pentene as a chief ingredient, (co)polymers produced using vinylcyclohexane or styrene as a chief ingredient, and modified products thereof.

(D) Organic Compound Component

In the present invention, the organic compound component (D) is optionally used for the purpose of improving polymerizability and properties of the resulting polymer. Examples of the organic compounds include alcohols, phenolic compounds, carboxylic acids, phosphorus compounds and sulfonates, but the organic compounds are not limited to these examples.

As the alcohols and the phenolic compounds, those represented by $R^{20}$—OH ($R^{20}$ is a hydrocarbon group of 1 to 50 carbon atoms or a halogenated hydrocarbon group of 1 to 50 carbon atoms) are generally employed.

The alcohols are preferably those of the above formula wherein $R^{20}$ is a halogenated hydrocarbon group. The phenolic compounds are preferably those wherein the α, α'-positions of the hydroxyl group are substituted with hydrocarbon groups of 1 to 20 carbon atoms.

As the carboxylic acids, those represented by $R^{21}$—COOH ($R^{21}$ is a hydrocarbon group of 1 to 50 carbon atoms or a halogenated hydrocarbon group of 1 to 50 carbon atoms, preferably a halogenated hydrocarbon group of 1 to 50 carbon atoms) are generally employed.

As the phosphorus compounds, phosphoric acids having P—O—H bond, phosphates having P—OR bond or P=O bond and phosphine oxide compounds are preferably employed.

The sulfonates employable herein are those represented by the following formula (VIII):

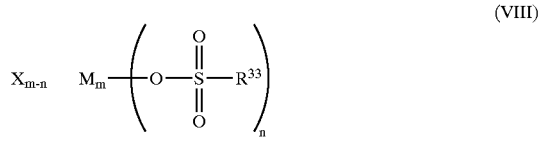

wherein M is an atom selected from Group 1 to Group 14 of the periodic table; $R^{33}$ is hydrogen, a hydrocarbon group of 1 to 20 carbon atoms or a halogenated hydrocarbon group of 1 to 20 carbon atoms; X is a hydrogen atom, a halogen atom, a hydrocarbon group of 1 to 20 carbon atoms or a halogenated hydrocarbon group of 1 to 20 carbon atoms; m is an integer of 1 to 7; and $1 \leq n \leq 7$.

In FIG. 1, steps for preparing the olefin polymerization catalyst of the invention are shown.

In the polymerization, the components can be used in any way and in any order. Some examples of the processes are given below.

(1) The component (A) and the compound (B) are fed to the polymerization reactor in an arbitrary order.

(2) A catalyst component wherein the component (A) is supported on the carrier (C), and the component (B) are fed to the polymerization reactor in an arbitrary order.

(3) A catalyst component wherein the component (B) is supported on the carrier (C), and the component (A) are fed to the polymerization reactor in an arbitrary order.

(4) A catalyst component wherein the component (A) and the component (B) are supported on the carrier (C) is fed to the polymerization reactor.

In the above processes (1) to (4), at least two of the catalyst components may be previously contacted.

In the processes (3) and (4) using a component (B) which is a supported type, a component (B) which is not a supported type may be added in an arbitrary order. In this case, the components (B) may be the same or different.

Onto the solid catalyst component wherein the component (A) and the component (B) are supported on the carrier (C), an olefin may be prepolymerized. On the prepolymerized solid catalyst component, a catalyst component may be further supported.

In the process for olefin polymerization according to the invention, an olefin is polymerized or copolymerized in the presence of the above-mentioned olefin polymerization catalyst to obtain an olefin polymer.

In the present invention, the polymerization can be carried out as any of liquid phase polymerization, such as solution polymerization or suspension polymerization, and gas phase polymerization.

Examples of inert hydrocarbon media for use in the liquid phase polymerization include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons. The olefin itself can be used as the solvent.

In the polymerization of an olefin using the olefin polymerization catalyst, the component (A) is used in an amount of usually $10^{-12}$ to $10^{-2}$ mol, preferably $10^{-10}$ to $10^{-3}$ mol per 1 liter of reaction vlume.

The component (B-1) is used in such an amount that the molar ratio ((B-1)/(M)) of the component (B-1) to the transition metal atom (M) in the component (A) becomes usually 0.01 to 100000, preferably 0.05 to 50000. The component (B-2) is used in such an amount that the molar ratio ((B-2)/(M)) of the aluminum atom in the component (B-2) to the transition metal atom (M) in the component (A) becomes usually 10 to 500000, preferably 20 to 100000. The component (B-3) is used in such an amount that the molar ratio ((B-3)/(M)) of the component (B-3) to the transition metal atom (M) in the component (A) becomes usually 1 to 10, preferably 1 to 5.

When the component (B-1) is used as the component (B), the component (D) is optionally used in such an amount that the (D)/(B-1) ratio by mol becomes usually 0.01 to 10, preferably 0.1 to 5. When the component (B-2) is used as the component (B), the component (D) is optionally used in such an amount that the (D)/(B-2) ratio by mol becomes usually 0.001 to 2, preferably 0.005 to 1. When the component (B-3) is used as the component (B), the component (D) is optionally used in such an amount that the (D)/(B-3) ratio by mol becomes usually 0.01 to 10, preferably 0.1 to 5.

In the olefin polymerization using the olefin polymerization catalyst, the polymerization temperature is in the range of usually −50 to +250° C., preferably 0 to 200° C., more preferably 60 to 170° C. The polymerization pressure is in the range of usually atmospheric pressure to 100 kg/cm², preferably atmospheric pressure to 50 kg/cm². The polymerization reaction can be carried out by any of batchwise, semicontinuous and continuous processes. The polymerization can be conducted in two or more stages under different reaction conditions.

The molecular weight of the resulting olefin polymer can be controlled by allowing hydrogen to be present in the polymerization system or by changing the polymerization temperature. The molecular weight can be controlled also by changing the type of the component (B).

In the present invention, the olefin polymer with high molecular weight can be produced with excellent polymerization activity, especially at high temperatures by the use of the above olefin polymerization catalyst.

Examples of the olefins which can be polymerized by the use of the olefin polymerization catalyst include:

straight-chain or branched α-olefins of 2 to 30 carbon atoms, preferably 2 to 20 carbon atoms, such as ethylene, propylene, 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; and cycloolefins of 3 to 30 carbon atoms, preferably 3 to 20 carbon atoms, such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene.

Polar monomers are also employable. Examples of the polar monomers include α,β-unsaturated carboxylic acids, such as acrylic acid, methacrylic acid, fumaric acid, maleic anhydride, itaconic acid, itaconic anhydride and bicyclo[2,2,1]-5-heptene-2,3-dicarboxylic anhydride; metallic salts, such as sodium salts, potassium salts, lithium salts, zinc salts, magnesium salts and calcium salts of the above acids; α,β-unsaturated carboxylic esters, such as methyl acrylate, ethyl acrylate, n-propyl acrylate, isopropyl acrylate, n-butyl acrylate, isobutyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate; vinyl esters, such as vinyl acetate, vinyl propionate, vinyl caproate, vinyl caprate, vinyl laurate, vinyl stearate and vinyl trifluoroacetate; unsaturated glycidyl esters, such as glycidyl acrylate, glycidyl methacrylate and monoglycidyl itaconate; and halogen-containing olefins, such as vinyl fluoride, vinyl chloride, vinyl boromide and vinyl iodide.

Vinylcyclohexane, dienes and polyenes are also employable as olefins. The dienes and the polyenes employable herein are cyclic or chain compounds having 4 to 30 carbon atoms, preferably 4 to 20 carbon atoms, and having two or more double bonds. Examples of such compounds include butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene and 5,9-dimethyl-1,4,8-decatriene.

Aromatic vinyl compounds are also employable as olefins. Examples of such compounds include mono- or polyalkylstyrenes, such as styrene, o-methylstyrene, m-methylstyrene, p-methylstyrene, o,p-dimethylstyrene, o-ethylstyrene, m-ethylstyrene and p-ethylstyrene; functional group-containing styrene derivatives, such as methoxystyrene, ethoxystyrene, vinylbenzoic acid, methyl vinylbenzoate, vinylbenzyl acetate, hydroxystyrene, o-chlorostyrene, p-chlorostyrene and divinylbenzene; and other compounds, such as 3-phenylpropylene, 4-phenylpropylene and α-methylstyrene.

The olefins mentioned above can be used singly or in combination of two or more kinds.

Effect of the Invention

The olefin polymerization catalyst and the process for olefin polymerization according to the present invention can produce polyolefins with a high polymerization activity at high temperatures.

EXAMPLE

The present invention is further described with reference to the following examples, but it should be construed that the invention is in no way limited to those examples.

In the following examples, the intrinsic viscosity (η) was measured in decalin at 135° C. The structures of the compounds obtained in the synthesis examples were determined by 270 MHz $^1$H-NMR (Japan Electron Optics Laboratory GSH-270) and FD-mass spectrometry (Japan Electron Optics Laboratory SX-102A), etc.

Synthesis Example 1

Into a 500 ml reactor thoroughly dried and purged with argon, 7.51 g (50 mmol) of 2-tert-butylphenol and 54 ml of THF were introduced. To the reactor, 18.53 ml of an ether solution containing 55.6 mmol of ethylmagnesium bromide was dropwise added at 0° C., then the temperature of the system was slowly raised to room temperature, and the reaction solution was stirred at room temperature for 1 hour. Then, 180 ml of toluene was added, and the system was heated to 100° C. to distill off about 40 ml of a mixed solution of ether and THF, whereby an opaque white slurry was obtained. After the slurry was cooled to room temperature, 3.75 g (125 mmol) of paraformaldehyde and 10.45 ml (75 mmol) of triethylamine were added, followed by stirring at 88° C. for 1 hour. The reaction solution was allowed to cool to room temperature and then quenched with 10% hydrochloric acid. The organic layer was concentrated and purified by a silica gel column to obtain 6.22 g (yield: 70%) of 3-t-butylsalicylaldehyde.

$^1$H-NMR (CDCl$_3$): 1.42 (s, 9H), 6.94 (t, 1H), 7.25–7.54 (m, 2H), 9.86 (s, 1H), 11.79 (s, 1H).

Into a 200 ml reactor thoroughly purged with nitrogen, 80 ml of ethanol, 6.06 g (22.5 mmol) of n-octadecylamine and 2.84 g (15.0 mmol) of 3-t-butylsalicylaldehyde were introduced, then a small amount of acetic acid was added, and the mixture was stirred at room temperature for 24 hours. The reaction solution was vacuum concentrated to remove the solvent, whereby 4.56 g (yield: 70.7%) of a compound (A) represented by the following formula (A) was obtained as a yellow crystal.

$^1$H-NMR (CDCl$_3$): 0.89 (t, 3H), 1.26 (s, 30H), 1.44 (s, 9H), 1.53–1.75 (m, 2H), 3.57 (t, 2H), 6.79 (t, 1H), 7.08–7.11 (dd, 1H), 7.26–7.32 (dd, 1H), 8.32 (s, 1H), 14.22 (s, 1H).

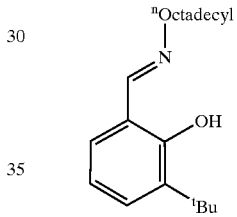

(A)

Into a 100 ml reactor thoroughly dried and purged with argon, 0.86 g (2.0 mmol) of the compound (A) and 20 ml of ether were introduced, and they were cooled to −78° C. and stirred. To the reactor, 1.43 ml of a n-hexane solution containing 2.2 mmol of n-butyllithium was dropwise added over a period of 10 minutes, then the temperature of the system was slowly raised to room temperature, and the reaction solution was stirred at room temperature for 4 hours to prepare a lithium salt solution. The solution was dropwise added to 20 ml of a THF solution containing 0.38 g (1.0 mmol) of a ZrCl$_4$(THF)$_2$ complex, said THF solution having been cooled to —78° C. After the dropwise addition was completed, stirring was continued with slowly raising the temperature to room temperature. Then, stirring was further performed at room temperature for 15 hours, and the solvent was distilled off from the reaction solution. The resulting solid was recrystallized from a mixed solution of ether and hexane to obtain 0.220 g (yield: 21.6%) of a compound (1) represented by the following formula (1) as a bright yellow crystal.

$^1$H-NMR (CDCl$_3$): 0.88 (t, 6H), 1.25 (s, 78H), 1.57 (s, 4H), 3.59 (t, 4H), 6.92 (t, 2H), 7.20–7.26 (dd, 2H), 7.55–7.62 (dd, 2H), 8.15 (s, 1H). FD-mass spectrometry: 1018

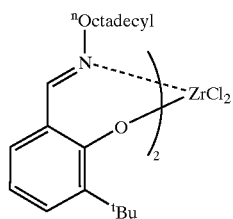

(1)

Synthesis Example 2

Into a 100 ml reactor thoroughly purged with nitrogen, 50 ml of ethanol, 2.28 g (20.14 mmol) of cyclohexanemethylamine and 2.98 g (16.73 mmol) of 3-t-butylsalicylaldehyde were introduced, and they were stirred at room temperature for 20 hours. The reaction solution was vacuum concentrated to remove the solvent, and the resulting liquid was purified by silica gel column chromatography to obtain 3.38 g (yield: 74%) of a compound (B) represented by the following formula (B) as a yellow liquid.

$^1$H-NMR (CDCl$_3$): 0.95–1.82 (m, 11H), 1.44 (s, 9H), 3.42 (d, 2H), 6.76–7.32 (m, 3H), 8.28 (s, 1H), 14.19 (s, 1H).

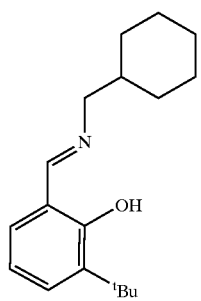

(B)

Into a 100 ml reactor thoroughly dried and purged with argon, 0.97 g (3.55 mmol) of the compound (B) and 20 ml of ether were introduced, and they were cooled to −78° C. and stirred. To the reactor, 2.40 ml of a n-hexane solution containing 3.84 mmol of n-butyllithium was dropwise added over a period of 10 minutes, then the temperature of the system was slowly raised to room temperature, and the reaction solution was stirred at room temperature for 4 hours to prepare a lithium salt solution. The solution was dropwise added to 30 ml of a THF solution containing 0.66 g (1.75 mmol) of a ZrCl$_4$(THF)$_2$ complex, said THF solution having been cooled to −78° C. After the dropwise addition was completed, stirring was continued with slowly raising the temperature to room temperature. Then, stirring was further performed at room temperature for 15 hours, and the solvent was distilled off from the reaction solution. The resulting solid was washed with 120 ml of methylene chloride. The filtrate was concentrated and washed again with ether to obtain 0.57 g (yield: 46%) of a compound (2) represented by the following formula (2) as a yellow powder.

$^1$H-NMR (CDCl$_3$): 0.50–1.74 (m, 22H), 1.58 (s, 18H), 3.32 (m, 4H), 6.90–7.60 (m, 6H), 8.01 (s, 2H). FD-mass spectrometry: 706

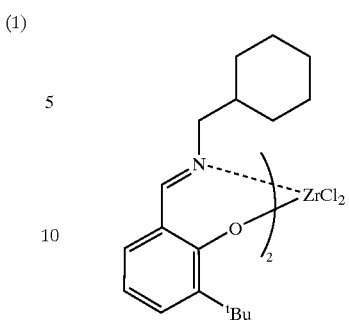

(2)

Synthesis Example 3

Into a 100 ml reactor thoroughly purged with nitrogen, 50 ml of ethanol, 2.27 g (20.05 mmol) of 2-methylcyclohexylamine and 2.89 g (16.23 mmol) of 3-t-butylsalicylaldehyde were introduced, then a small amount of acetic acid was added, and the mixture was stirred at room temperature for 24 hours. The reaction solution was vacuum concentrated to remove the solvent, and the resulting liquid was purified by silica gel column chromatography to obtain 3.65 g (yield: 82%) of a compound (C) represented by the following formula (C) as a yellow liquid.

$^1$H-NMR (CDCl$_3$): 0.81–1.85 (m, 3H), 1.03–1.83 (m, 9H), 1.44 (s, 9H), 2.65–2.74 (td, 1H), 6.78–7.32 (m, 3H), 8.30, 8.33 (s, s, 1H), 14.19, 14.24 (s, s, 1H).

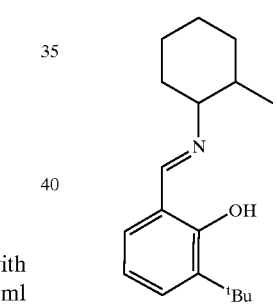

(C)

Into a 100 ml reactor thoroughly dried and purged with argon, 0.96 g (3.51 mmol) of the compound (C) and 20 ml of ether were introduced, and they were cooled to −78° C. and stirred. To the reactor, 2.41 ml of a n-hexane solution containing 3.86 mmol of n-butyllithium was dropwise added over a period of 10 minutes, then the temperature of the system was slowly raised to room temperature, and the reaction solution was stirred at room temperature for 2 hours to prepare a lithium salt solution. The solution was dropwise added to 20 ml of a THF solution containing 0.66 g (1.75 mmol) of a ZrCl$_4$(THF)$_2$ complex, said THF solution having been cooled to −78° C. After the dropwise addition was completed, stirring was continued with slowly raising the temperature to room temperature. Then, stirring was further performed at room temperature for 15 hours, and the solvent was distilled off from the reaction solution. The resulting solid was washed with 50 ml of ether. The filtrate was concentrated and recrystallized from a mixed solution of methylene chloride and hexane to obtain 0.47 g (yield: 38%) of a compound (3) represented by the following formula (3) as a yellow powder.

¹H-NMR (CDCl₃): 0.69–1.90 (m, 24H), 1.62 (s, 18H), 3.65–3.90 (m, 2H), 6.86–7.64 (m, 6H), 8.14–8.27 (m, 2H).
FD-mass spectrometry: 706

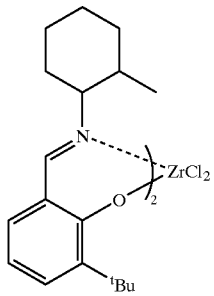

(3)

Synthesis Example 4

Into a 100 ml reactor thoroughly purged with nitrogen, 50 ml of ethanol, 2.31 g (18.16 mmol) of 2,3-dimethylcyclohexylamine and 3.11 g (17.45 mmol) of 3-t-butylsalicylaldehyde were introduced, and they were stirred at room temperature for 24 hours. The reaction solution was vacuum concentrated to remove the solvent, whereby 4.97 g (yield: 99.1%) of a compound (D) represented by the following formula (D) was obtained as a yellow liquid.

¹H-NMR (CDCl₃): 0.75–1.00 (m, 6H), 1.00–1.95 (m, 8H), 1.44 (s, 9H), 2.73–3.30 (m, 1H), 6.77–7.32 (m, 3H), 8.30–8.36 (m, 1H), 14.20–14.33 (m, 1H).

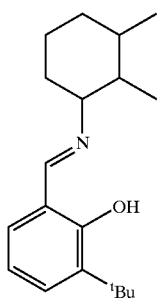

(D)

Into a 100 ml reactor thoroughly dried and purged with argon, 1.20 g (4.18 mmol) of the compound (D) and 20 ml of ether were introduced, and they were cooled to −78° C. and stirred. To the reactor, 2.70 ml of a n-hexane solution containing 4.24 mmol of n-butyllithium was dropwise added over a period of 10 minutes, then the temperature of the system was slowly raised to room temperature, and the reaction solution was stirred at room temperature for 4 hours to prepare a lithium salt solution. The solution was dropwise added to 30 ml of a THF solution containing 0.79 g (2.09 mmol) of a ZrCl₄(THF)₂ complex, said THF solution having been cooled to −78° C. After the dropwise addition was completed, stirring was continued with slowly raising the temperature to room temperature. Then, stirring was further performed at room temperature for 15 hours, and the solvent was distilled off from the reaction solution. The resulting solid was washed with 30 ml of ether and 70 ml of methylene chloride. The filtrate was concentrated and washed again with a mixed solution of ether and hexane to obtain 0.37 g (yield: 24%) of a compound (4) represented by the following formula (4) as a yellow powder.

¹H-NMR (CDCl₃): 0.10–1.90 (m, 28H), 1.61 (s, 18H), 2.55–2.75 (m, 2H), 6.70–7.70 (m, 6H), 8.10–8.40 (m, 2H).
FD-mass spectrometry: 734

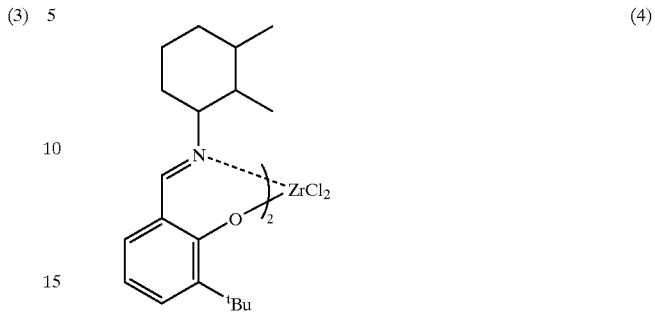

(4)

Synthesis Example 5

Into a 100 ml reactor thoroughly purged with nitrogen, 40 ml of ethanol, 0.90 g (0.84 mmol) of benzylamine and 1.50 g (8.42 mmol) of 3-t-butylsalicylaldehyde were introduced, then a small amount of molecular sieves was added with stirring at room temperature, and the mixture was stirred at 65° C. for 4 hours. The reaction solution was filtered, and the filtrate was vacuum concentrated. To the concentrate, 40 ml of cold MeOH was added, and the mixture was cooled at −78° C. with stirring to obtain 1.80 g (yield: 80%) of a compound (E) represented by the following formula (E) as a yellow solid.

¹H-NMR (CDCl₃): 1.45 (s, 9H), 4.82 (s, 2H), 6.78–7.45 (m, 8H), 8.47 (s, 1H), 13.89 (bs, 1H).

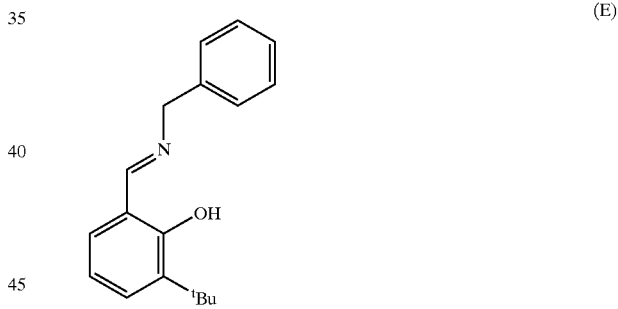

(E)

Into a 100 ml reactor thoroughly dried and purged with argon, 0.50 g (1.87 mmol) of the compound (E) and 40 ml of ether were introduced, and they were cooled to −78° C. and stirred. To the reactor, 1.20 ml of a n-hexane solution containing 1.93 mmol of n-butyllithium was dropwise added over a period of 10 minutes, then the temperature of the system was slowly raised to room temperature, and the reaction solution was stirred at room temperature for 15 hours to prepare a lithium salt solution. The solution was dropwise added to 50 ml of a THF solution containing 0.352 g (1.87 mmol) of a ZrCl₄(THF)₂ complex, said THF solution having been cooled to −78° C. After the dropwise addition was completed, the temperature of the system was naturally raised, and the solution was stirred all night at room temperature. After the solution was further stirred at 60° C. for 3 hours, the solvent was distilled off from the reaction solution. The resulting solid was reslurried in a mixed solvent of 100 ml of ether and 100 ml of hexane, and the slurry was filtered. The solid obtained by filtration was washed with 100 ml of hexane and vacuum concentrated to obtain 0.30 g (yield: 46%) of a compound (5) represented by the following formula (5) as a light yellowish white solid.

$^1$H-NMR (CDCl$_3$): 1.60 (s, 18H), 4.65 (d, 2H), 4.95 (d, 2H), 6.70–7.70 (m, 16H), 7.85 (s, 2H) FD-mass spectrometry: 694

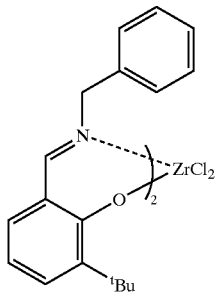

(5)

Synthesis Example 6

Into a 1 liter reactor thoroughly dried and purged with argon, 36.6 ml of an ether solution containing 110 mmol of ethylmagnesium bromide and 73.4 ml of ether were introduced. To the reactor, a solution containing 18.39 g (100 mmol) of 2-tert-butyl-4-methoxyphenol diluted with 90 ml of a THF was dropwise added at 0° C. over a period of 30 minutes, then the temperature of the system was slowly raised to room temperature, and the reaction solution was stirred at room temperature for 1 hour. Then, 350 ml of toluene was added, and the system was heated to 100° C. to distill off about 180 ml of a mixed solution of ether and THF, whereby an opaque white slurry was obtained. After the slurry was cooled to 50° C., 4.50 g (150 mmol) of paraformaldehyde and 21.0 ml (150 mmol) of triethylamine were added, followed by stirring at 80 to 90° C. for 1.5 hours. The reaction solution was allowed to cool to room temperature and then quenched with 10% hydrochloric acid. The organic layer was concentrated, and the solid precipitated was vacuum dried to obtain 11.66 g (yield: 56%) of 3-t-butyl-5-methoxysalicylaldehyde.

$^1$H-NMR (CDCl$_3$): 1.4 (s, 9H), 3.8 (s, 1H), 6.8 (s, 1H)-7.2 (d, 1H), 9.9 (s, 1H), 11.5 (s, 1H).

Into a 500 ml reactor thoroughly purged with nitrogen, 156 ml of ethanol, 2.53 g (25 mmol) of n-hexylamine and 5.20 g (25 mmol) of 3-t-butyl-5-methoxysalicylaldehyde were introduced, and they were stirred at room temperature for 24 hours. The reaction solution was vacuum concentrated to remove the solvent, whereby 6.96 g (yield: 97%) of a compound (F) represented by the following formula (F) was obtained as a yellow crystal.

$^1$H-NMR (CDCl$_3$): 0.9 (t, 3H), 1.3 (s, 6H), 1.4 (s, 9H), 1.7–1.8 (m, 2H), 3.6 (t, 2H), 3.8 (s, 3H), 6.6 (s, 1H), 7.0 (s, 1H), 8.3 (s, 1H), 13.8 (s, 1H).

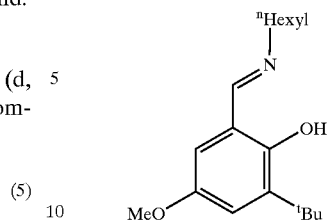

(F)

Into a 100 ml reactor thoroughly dried and purged with argon, 1.17 g (4.0 mmol) of the compound (F) and 40 ml of ether were introduced, and they were cooled to −78° C. and stirred. To the reactor, 2.61 ml of a n-hexane solution containing 4.2 mmol of n-butyllithium was slowly dropwise added, then the temperature of the system was slowly raised to room temperature, and the reaction solution was stirred at room temperature for 4 hours to prepare a lithium salt solution. The solution was dropwise added to 40 ml of a THF solution containing 0.755 g (2.0 mmol) of a ZrCl$_4$(THF)$_2$ complex, said THF solution having been cooled to −78° C. After the dropwise addition was completed, stirring was continued with slowly raising the temperature to room temperature. Then, stirring was further performed at room temperature for 15 hours, and the solvent was distilled off from the reaction solution. To the resulting solid, 20 ml of ether was added to give a slurry, and the slurry was filtered with washing with ether (10 ml×2). The filtrate was concentrated until 10 ml of a concentrate was obtained, and the concentrate was allowed to stand one night at 0° C. to obtain 0.85 g (yield: 58%) of a compound (6) represented by the following formula (6) as a yellowish orange crystal.

$^1$H-NMR (CDCl$_3$): 0.9 (t, 6H), 1.0–1.4 (s, 12H), 1.6 (s, 18H), 3.6 (t, 4H), 3.8 (s, 6H), 6.7 (s, 2H), 7.2 (s, 2H), 8.2 (s, 1H). FD-mass spectrometry: 742

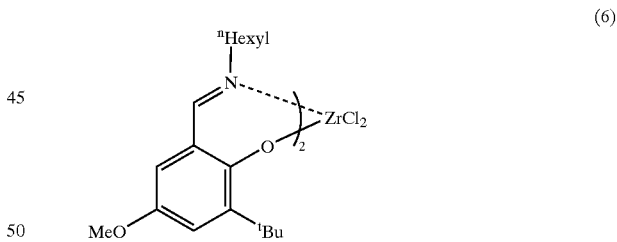

(6)

Synthesis Example 7

Into a 200 ml reactor thoroughly purged with nitrogen, 50 ml of ethanol, 1.23 g (12.4 mmol) of cyclohexylamine and 2.55 g (12.2 mmol) of 3-t-butyl-5-methoxysalicylaldehyde were introduced, and they were stirred at room temperature for 24 hours. The solid precipitated was filtered off, washed with ethanol and vacuum dried to obtain 2.34 g (yield: 66%) of a compound (G) represented by the following formula (G) as a yellowish orange crystal.

$^1$H-NMR (CDCl$_3$): 1.20–1.85 (m, 19H), 3.18–3.23 (m, 1H), 3.77 (s, 3H), 6.59–6.60 (d, 1H), 6.95–6.96 (d, 1H), 8.33 (s, 1H), 13.75 (s, 1H). FD-mass spectrometry: 289

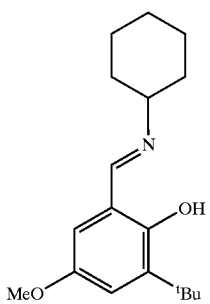

(G)

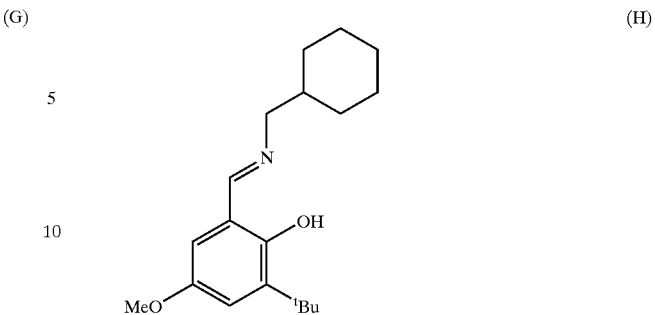

(H)

Into a 100 ml reactor thoroughly dried and purged with argon, 0.86 g (2.99 mmol) of the compound (G) and 20 ml of ether were introduced, and they were cooled to −78° C. and stirred. To the reactor, 2.15 ml of a n-hexane solution containing 3.31 mmol of n-butyllithium was slowly dropwise added, then the temperature of the system was slowly raised to room temperature, and the reaction solution was stirred at room temperature for 1 hour to prepare a lithium salt solution. The solution was dropwise added to 20 ml of a THF solution containing 0.566 g (1.50 mmol) of a $ZrCl_4$ $(THF)_2$ complex, said THF solution having been cooled to −78° C. After the dropwise addition was completed, stirring was continued with slowly raising the temperature to room temperature. Then, stirring was further performed at room temperature for 15 hours, and the solvent was distilled off from the reaction solution. The resulting solid was washed with 100 ml of ether and 90 ml of methylene chloride. The filtrate was concentrated to obtain 0.27 g (yield: 25%) of a compound (7) represented by the following formula (7) as a yellow powder.

$^1$H-NMR (CDCl$_3$): 0.98–2.12 (m, 38H), 3.46–3.87 (m, 8H), 6.63–6.64 (d, 2H), 7.19–7.20 (d, 2H), 8.20 (s, 2H). FD-mass spectrometry: 738

Into a 100 ml reactor thoroughly dried and purged with argon, 0.84 g (2.57 mmol) of the compound (H) and 20 ml of ether were introduced, and they were cooled to −78° C. and stirred. To the reactor, 1.90 ml of a n-hexane solution containing 3.04 mmol of n-butyllithium was slowly dropwise added, then the temperature of the system was slowly raised to room temperature, and the reaction solution was stirred at room temperature for 1.5 hours to prepare a lithium salt solution. The solution was dropwise added to 20 ml of a THF solution containing 0.52 g (1.34 mmol) of a $ZrCl_4$ $(THF)_2$ complex, said THF solution having been cooled to −78° C. After the dropwise addition was completed, stirring was continued with slowly raising the temperature to room temperature. Then, stirring was further performed at room temperature for 15 hours, and the solvent was distilled off from the reaction solution. The resulting solid was washed with 40 ml of ether and 100 ml of methylene chloride. The filtrate was concentrated and washed again with a mixture of ether and hexane to obtain 0.67 g (yield: 63%) of a compound (8) represented by the following formula (8) as a yellow powder.

$^1$H-NMR (CDCl$_3$): 0.53–1.85 (m, 22H), 1.55 (s, 18H), 3.22–3.40 (m, 4H), 3.80 (s, 6H), 6.64–6.67 (m, 2H), 7.10–7.26 (m, 2H), 7.96 (s, 2H). FD-maas spectrometry: 766

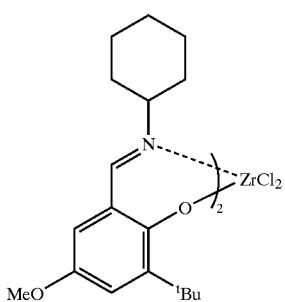

(7)

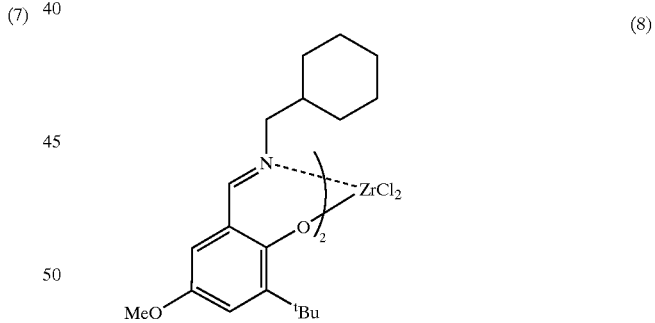

(8)

Synthesis Example 8

Into a 100 ml reactor thoroughly purged with nitrogen, 30 ml of ethanol, 1.05 g (9.27 mmol) of cyclohexanemethylamine and 1.92 g (9.23 mmol) of 3-t-butyl-5-methoxysalicylaldehyde were introduced, and they were stirred at room temperature for 73 hours. The solid precipitated was filtered off, washed with ethanol and vacuum dried to obtain 2.70 g (yield: 96%) of a compound (H) represented by the following formula (H) as an orange liquid.

$^1$H-NMR (CDCl$_3$): 0.93–1.86 (m, 11H), 1.43 (B, 9H), 3.42 (d, 2H), 3.77 (S, 3H), 6.60 (d, 1H), 6.96 (d, 1H), 8.25 (s, 1H), 13.71 (bs, 1H).

Synthesis Example 9

Into a 100 ml reactor thoroughly purged with nitrogen, 30 ml of ethanol, 1.72 g (15.19 mmol) of 2-methylcyclohexylamine and 2.64 g (12.68 mmol) of 3-t-butyl-5-methoxysalicylaldehyde were introduced, and they were stirred at room temperature for 24 hours. The solid precipitated was filtered off, washed with ethanol and vacuum dried to obtain 2.82 g (yield: 73%) of a compound (I) represented by the following formula (I) as a yellow powder.

$^1$H-NMR (CDCl$_3$): 0.83 (d, 3H), 1.00–1.89 (m, 9H), 1.43 (s, 9H), 2.64–2.73 (td, 1H), 3.78 (s, 3H), 6.60 (d, 1H), 6.96 (d, 1H), 8.27 (s, 1H), 13.7 (s, 1H).

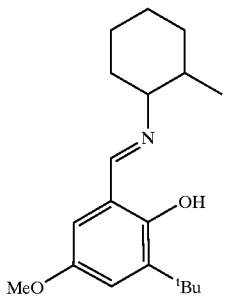

(J)

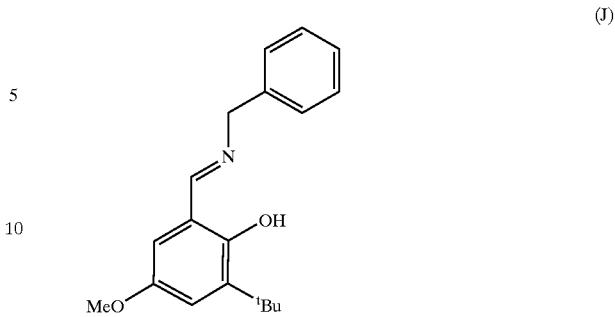

Into a 100 ml reactor thoroughly dried and purged with argon, 0.91 g (3.00 mmol) of the compound (I) and 20 ml of ether were introduced, and they were cooled to −78° C. and stirred. To the reactor, 2.10 ml of a n-hexane solution containing 3.36 mmol of n-butyllithium was slowly dropwise added, then the temperature of the system was slowly raised to room temperature, and the reaction solution was stirred at room temperature for 2 hours to prepare a lithium salt solution. The solution was dropwise added to 20 ml of a THF solution containing 0.57 g (1.51 mmol) of a $ZrCl_4$ $(THF)_2$ complex, said THF solution having been cooled to −78° C. After the dropwise addition was completed, stirring was continued with slowly raising the temperature to room temperature. Then, stirring was further performed at room temperature for 15 hours, and the solvent was distilled off from the reaction solution. The resulting solid was washed with 10 ml of ether and 60 ml of methylene chloride. The filtrate was concentrated and washed again with a mixture of ether and hexane to obtain 0.54 g (yield: 46%) of a compound (9) represented by the following formula (9) as a yellow powder.

$^1$-NMR ($CDCl_3$): 0.60–2.90 (m, 24H), 1.60 (s, 18H), 2.50–2.70 (m, 2H), 3.47 (m, 6H), 6.61–6.64 (m, 2H), 7.21, 7.22 (s, s, 2H), 8.15–8.23 (m, 2H). FD-mass spectrometry: 766

Into a 50 ml reactor thoroughly dried and purged with argon, 0.89 g (3.00 mmol) of the compound (J) and 30 ml of ether were introduced, and they were cooled to −78° C. and stirred. To the reactor, 2.01 ml of a n-hexane solution containing 3.15 mmol of n-butyllithium was slowly dropwise added, then the temperature of the system was slowly raised to room temperature, and the reaction solution was stirred at room temperature for 3 hours to prepare a lithium salt solution. The solution was dropwise added to 30 ml of a THF solution containing 0.57 g (1.50 mmol) of a $ZrCl_4$ $(THF)_2$ complex, said THF solution having been cooled to −78° C. After the dropwise addition was completed, stirring was continued with slowly raising the temperature to room temperature. Then, stirring was further performed at room temperature for 15 hours, and the solvent was distilled off from the reaction solution. The resulting solid was washed with 30 ml of ether and 20 ml of methylene chloride. The filtrate was concentrated and washed again with 20 ml of ether to obtain 0.58 g (yield: 51%) of a compound (10) represented by the following formula (10) as a yellow powder.

$^1$H-NMR ($CDCl_3$): 1.51 (s, 18H), 3.75 (s, 6H), 4.60–5.10 (m, 4H), 6.35–7.25 (m, 14H), 7.82 (s, 2H). FD-mass spectrometry: 754

(9)

(10)

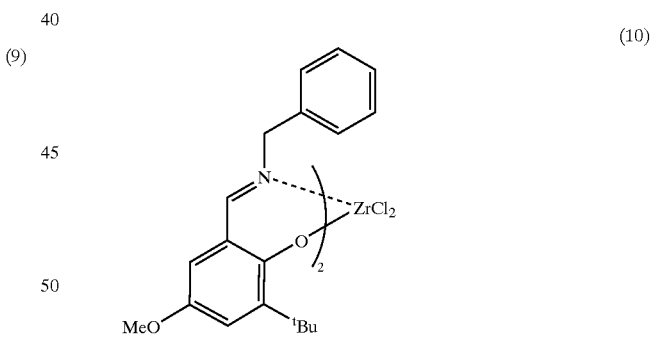

Synthesis Example 10

Into a 100 ml reactor thoroughly purged with nitrogen, 40 ml of ethanol, 1.61 g (15.G mmol) of benzylamine and 3.12 g (15.0 mmol) of 3-t-butyl-5-methoxysalicylaldehyde were introduced, and they were stirred at room temperature for 1.5 hours. The solid precipitated was filtered off, washed with methanol and vacuum dried to obtain 3.25 g (yield: 73%) of a compound (J) represented by the following formula (J) as a yellowish orange crystal.

$^1$H-NMR ($CDCl_3$): 1.42 (s, 9H), 3.78 (s, 3H), 4.80 (s, 2H), 6.62–7.43 (m, 7H), 8.41 (s, 1H), 13.52 (s, 1H).

Synthesis Example 11

Into a 1 liter reactor thoroughly dried and purged with nitrogen, 9.68 g (58.93 mmol) of 2-tert-butyl-4-methylphenol and 100 ml of THF were introduced. To the reactor, 23.00 ml of an ether solution containing 69.00 mmol of ethylmagnesium bromide was dropwise added at 0° C. over a period of 30 minutes, then the temperature of the system was slowly raised to room temperature, and the reaction solution was stirred at room temperature for 1 hour. Then, 100 ml of toluene was added, and the system was heated to 95° C. to distill off a mixed solution of ether and THF, whereby an opaque white slurry was obtained. After the slurry was cooled to room temperature, 100 ml of toluene, 4.50 g (149.90 mmol) of paraformaldehyde and 12.50 ml (89.93 mmol) of triethylamine were added, followed by stirring at 95° C. for 2 hours. The reaction solution was allowed to cool to room temperature and then quenched with 300 ml of 1N hydrochloric acid. The organic layer was concentrated and purified by a silica gel column to obtain 7.36 g (yield: 65%) of 3-t-butyl-5-methylsalicylaldehyde.

$^1$H-NMR (CDCl$_3$): 1.41 (s, 9H), 2.32 (s, 3H), 7.19 (d, 1H), 7.33 (d, 1H), 9.83 (s, 1H), 11.60 (s, 1H).

Into a 200 ml reactor thoroughly purged with nitrogen, 50 ml of ethanol, 1.52 g (15.02 mmol) of n-hexylamine and 2.86 g (14.90 mmol) of 3-t-butyl-5-methylsalicylaldehyde were introduced, and they were stirred at room temperature for 24 hours. The reaction solution was vacuum concentrated to remove the solvent, whereby 4.14 g (yield: 100%) of a compound (K) represented by the following formula (K) was obtained as a yellow liquid.

$^1$H-NMR (CDCl$_3$): 0.89 (t, 3H), 1.25–1.43 (m, 4H), 1.43 (s, 9H), 1.60–1.77 (m, 2H), 2.28 (s, 3H), 3.56 (t, 2H), 6.89 (s, 1H), 7.11 (d, 1H), 8.27 (s, 1H), 13.94 (s, 1H).

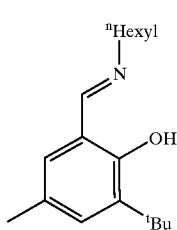

(K)

Into a 300 ml reactor thoroughly dried and purged with argon, 4.16 g (15.10 mmol) of the compound (K) and 70 ml of ether were introduced, and they were cooled to −78° C. and stirred. To the reactor, 9.40 ml of a n-hexane solution containing 15.04 mmol of n-butyllithium was dropwise added over a period of 30 minutes, then the temperature of the system was slowly raised to room temperature, and the reaction solution was stirred at room temperature for 4 hours to prepare a lithium salt solution. The solution was dropwise added to 80 ml of a THF solution containing 2.85 g (7.56 mmol) of a ZrCl$_4$(THF)$_2$ complex, said THF solution having been cooled to −78° C. After the dropwise addition was completed, stirring was continued with slowly raising the temperature to room temperature. Then, stirring was further performed at room temperature for 15 hours, and the solvent was distilled off from the reaction solution. The resulting solid was washed with 50 ml of ether and 200 ml of methylene chloride. The filtrate was concentrated and washed again with 20 ml of ether to obtain 4.30 g (yield: 80% of a compound (11) represented by the following formula (11) as a yellow powder.

$^1$H-NMR (CDCl$_3$): 0.74–1.54 (m, 18H), 1.55 (s, 18H), 2.31 (s, 6H), 3.37–3.68 (m, 4H), 6.99 (s, 2H), 7.36 (s, 2H), 8.09 (s, 2H). FD-mass spectrometry: 710

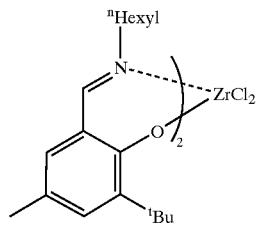

(11)

Synthesis Example 12

Into a 200 ml reactor thoroughly purged with nitrogen, 70 ml of ethanol, 1.83 g (16.17 mmol) of 2-methylcyclohexylamine and 3.06 g (15.92 mmol) of 3-t-butyl-5-methylsalicylaldehyde were introduced, and they were stirred at room temperature for 24 hours. The solid precipitated was filtered off and vacuum dried to obtain 3.00 g (yield: 66%) of a compound (L) represented by the following formula (L) as a yellow crystal.

1H-NMR (CDCl$_3$): 0.79–0.83 (m, 3H), 0.96–1.88 (m, 9H), 1.43 (s, 9H), 2.28 (s, 3H), 2.63–2.72 (td, 1H), 6.90 (d, 1H), 7.11 (d, 1H), 8.26 (s, 1H), 13.93 (s, 1H).

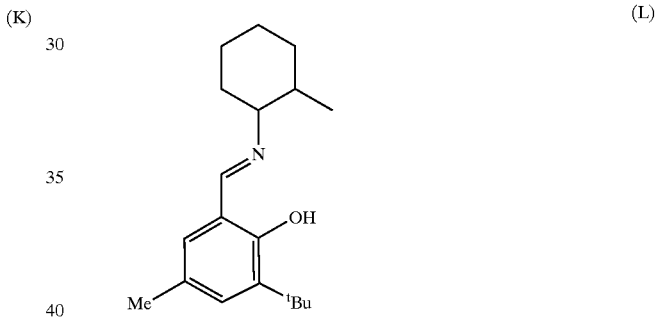

(L)

Into a 100 ml reactor thoroughly dried and purged with argon, 0.87 g (3.03 mmol) of the compound (L) and 20 ml of ether were introduced, and they were cooled to −78°C. and stirred. To the reactor, 1.90 ml of a n-hexane solution containing 2.98 mmol of n-butyllithium was dropwise added over a period of 10 minutes, then the temperature of the system was slowly raised to room temperature, and the reaction solution was stirred at room temperature for 2 hours to prepare a lithium salt solution. The solution was dropwise added to 20 ml of a THF solution containing 0.57 g (1.50 mmol) of a ZrCl$_4$(THF)$_2$ complex, said THF solution having been cooled to −78° C. After the dropwise addition was completed, stirring was continued with slowly raising the temperature to room temperature. Then, stirring was further performed at room temperature for 15 hours, and the solvent was distilled off from the reaction solution. The resulting solid was washed with 80 ml of ether. The filtrate was concentrated and recrystallized from a mixed solution of ether and hexane to obtain 0.44 g (yield: 40%) of a compound (12) represented by the following formula (12) as a yellow powder.

$^1$H-NMR (CDCl$_3$): 0.65–1.90 (m, 24H), 1.60 (s, 18H), 2.32 (s, 6H), 3.68–3.90 (m, 2H), 6.98 (s, 2H), 7.37 (s, 2H), 8.14–8.22 (m, 2H). FD-mass spectrometry: 734

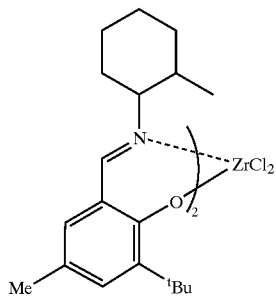

(12)

Synthesis Example 13

Into a 200 ml reactor thoroughly dried and purged with nitrogen, 34.15 g (316.0 mmol) of paracresol, 2.50 g of Umberist-15E (trade name, available from Organo Co.) and 20 ml of toluene were introduced. To the reactor, a solution containing 14.40 g (105.0 mmol) of 4-cumylphenol diluted with 30 ml of a toluene was dropwise added at 80° C., followed by stirring for 17 hours. After the system was cooled to room temperature, the reaction solution was filtered with washing with hexane. The resulting liquid was purified by silica gel column chromatography to obtain 10.52 g (yield: 44%) of 2-cumyl-4-methylphenol.

$^1$H-NMR (CDCl$_3$): 1.75 (s, 6H), 2.40 (s, 3H), 7.10–7.30 (m, 8H), 11.17 (s, 1H).

Into a 500 ml reactor thoroughly purged with nitrogen, 21.0 ml of an ether solution containing 63.1 mmol of ethylmagnesium bromide and 40 ml of THF were introduced. To the reactor, a solution containing 13.61 g (60.1 mmol) of 2-cumyl-4-methylphenol diluted with 20 ml of a THF was dropwise added at 0° C. over a period of 1 hour, then the temperature of the system was slowly raised to room temperature, and the reaction solution was stirred at room temperature for 30 minutes. Then, 220 ml of toluene was added, and the system was heated to 100° C. to distill off about 50 ml of a mixed solution of ether and THF, whereby an opaque white slurry was obtained. After the slurry was cooled to 24° C., 4.37 g (145.5 mmol) of paraformaldehyde and 12.0 ml (86.0 mmol) of triethylamine were added, followed by stirring at 90° C. for 1 hour. The reaction solution was allowed to cool to room temperature and then quenched with 42 ml of 18% hydrochloric acid. The organic layer was concentrated, and the resulting liquid was purified by silica gel column chromatography to obtain 14.13 g (yield: 92%) of 3-cumyl-5-methylsalicylaldehyde.

$^1$H-NMR (CDCl$_3$): 1.75 (s, 6H), 2.40 (s, 3H), 7.10–7.42 (m, 7H), 8.55 (s, 1H), 13.18 (s, 1H).

Into a 100 ml reactor thoroughly purged with nitrogen, 40 ml of ethanol, 1.82 g (18.0 mmol) of n-hexylamine and 3.81 g (15.0 mmol) of 3-cumyl-5-methylsalicylaldehyde were introduced, and they were stirred at room temperature for 3 hours. The reaction solution was vacuum concentrated to remove the solvent, and the resulting liquid was purified by silica gel column chromatography to obtain 3.97 g (yield: 78%) of a compound (M) represented by the following formula (M).

$^1$H-NMR (CDCl$_3$): 0.85 (t, 3H), 1.27 (s, 6H), 1.52–1.70 (m, 2H), 1.71 (s, 6H), 2.34 (s, 3H), 3.45 (t, 2H), 6.92–7.35 (m, 7H), 8.22 (s, 1H), 13.49 (s, 1H).

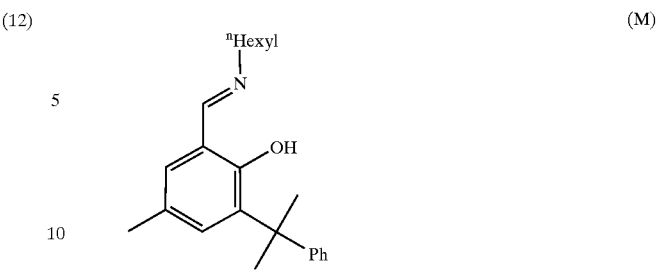

(M)

Into a 50 ml reactor thoroughly dried and purged with argon, 1.01 g (3.00 mmol) of the compound (M) and 30 ml of ether were introduced, and they were cooled to −78° C. and stirred. To the reactor, 2.20 ml of a n-hexane solution containing 3.45 mmol of n-butyllithium was slowly dropwise added, then the temperature of the system was slowly raised to room temperature, and the reaction solution was stirred at room temperature for 4 hours to prepare a lithium salt solution. The solution was dropwise added to 30 ml of a THF solution containing 0.622 g (1.65 mmol) of a ZrCl$_4$(THF)$_2$ complex, said THF solution having been cooled to −78° C. After the dropwise addition was completed, stirring was continued with slowly raising the temperature to room temperature. Then, stirring was further performed at room temperature for 15 hours, and the solvent was distilled off from the reaction solution. To the resulting solid, 20 ml of ether was added to give a slurry, and the slurry was filtered with washing with 10 ml of ether. The filtrate was concentrated and washed again with a mixed solution of hexane and ether to obtain 0.53 g (yield: 42%) of a compound (13) represented by the following formula (13) as a light yellow powder.

$^1$H-NMR (CDCl$_3$): 0.50–2.00 (m, 34H), 2.25–2.45 (m, 6H), 2.50–2.75 (m, 4H), 6.90–7.55 (m, 14H), 8.85 (s, 2H).
FD-mass spectrometry: 832

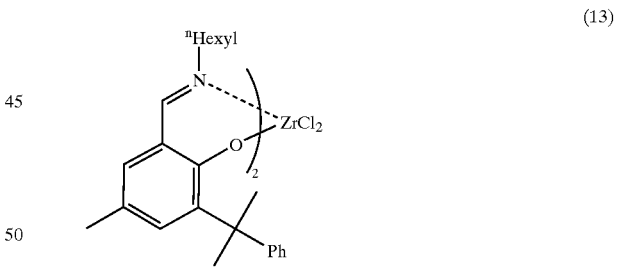

(13)

Synthesis Example 14

Into a 100 ml reactor thoroughly purged with nitrogen, 40 ml of ethanol, 0.99 g (10.0 mmol) of cyclohexylamine and 2.54 g (10.0 mmol) of 3-cumyl-5-methylsalicylaldehyde were introduced, and they were stirred at room temperature for 20 hours. The solid precipitated was filtered off, washed with cold methanol and vacuum dried to obtain 2.85 g (yield: 85%) of a compound (N) represented by the following formula (N) as a light yellow crystal.

$^1$H-NMR (CDCl$_3$): 1.10–1.65 (m, 6H), 1.65–1.82 (m, 4H), 1.75 (s, 6H), 2.35 (s, 3H), 3.12 (m, 1H), 6.95–7.33 (m, 7H), 8.28 (s, 1H), 13.42 (s, 1H).

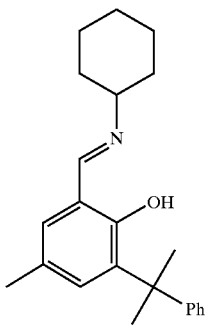

(N)

Into a 50 ml reactor thoroughly dried and purged with argon, 1.01 g (3.00 mmol) of the compound (N) and 30 ml of ether were introduced, and they were cooled to −78° C. and stirred. To the reactor, 2.01 ml of a n-hexane solution containing 3.15 mmol of n-butyllithium was slowly dropwise added, then the temperature of the system was slowly raised to room temperature, and the reaction solution was stirred at room temperature for 4 hours to prepare a lithium salt solution. The solution was dropwise added to 30 ml of a THF solution containing 0.566 g (1.50 mmol) of a $ZrCl_4$ $(THF)_2$ complex, said THF solution having been cooled to −78° C. After the dropwise addition was completed, stirring was continued with slowly raising the temperature to room temperature. Then, stirring was further performed at room temperature for 15 hours, and the solvent was distilled off from the reaction solution. To the resulting solid, 30 ml of ether was added to give a slurry, and the slurry was filtered with washing with ether (10 ml×2). The filtrate was concentrated and washed again with a mixed solution of hexane and ether to obtain 0.91 g (yield: 73%) of a compound (14) represented by the following formula (14) as a light yellow powder.

$^1$H-NMR ($CDCl_3$): 0.85–2.10 (m, 32H), 2.28, 2.38 (s, s, 6H), 3.62 (m, 2H), 6.95–7.50 (m, 14H), 8.10 (s, 2H). FD-mass spectrometry: 830

(14)

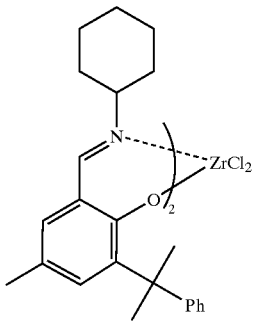

Synthesis Example 15

Into a 100 ml reactor thoroughly purged with nitrogen, 30 ml of ethanol, 0.91 g (8.04 mmol) of 2-methylcyclohexylamine and 1.96 g (7.71 mmol) of 3-cumyl-5-methylsalicylaldehyde were introduced, and they were stirred at room temperature for 15 hours. The solid precipitated was filtered off and vacuum dried to obtain 2.65 g (yield: 98%) of a compound (O) represented by the following formula (O) as a yellow crystal.

$^1$-NMR ($CDCl_3$): 0.70–0.80 (m, 3H), 0.85–1.90 (m, 15H), 2.33, 2.34 (s, s, 3H), 2.60, 3.23 (m, 1H), 6.95–7.30 (m, 7H), 8.20–8.30 (m, 1H), 13.35 (s, 1H).

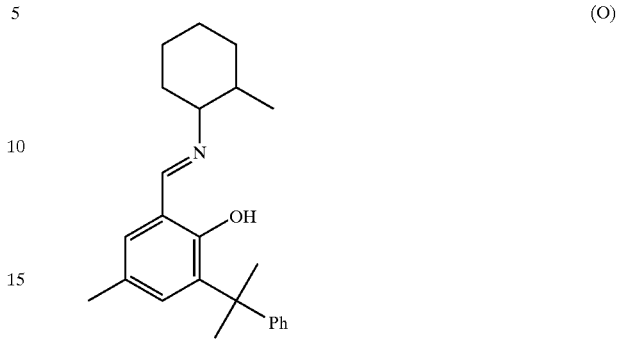

(O)

Into a 100 ml reactor thoroughly dried and purged with argon, 1.08 g (3.08 mmol) of the compound (O) and 20 ml of ether were introduced, and they were cooled to −78° C. and stirred. To the reactor, 2.00 ml of a n-hexane solution containing 3.14 mmol of n-butyllithium was slowly dropwise added, then the temperature of the system was slowly raised to room temperature, and the reaction solution was stirred at room temperature for 1 hour to prepare a lithium salt solution. The solution was dropwise added to 20 ml of a THF solution containing 0.58 g (1.54 mmol) of a $ZrCl_4$ $(THF)_2$ complex, said THF solution having been cooled to −78° C. After the dropwise addition was completed, stirring was continued with slowly raising the temperature to room temperature. Then, stirring was further performed at room temperature for 20 hours, and the solvent was distilled off from the reaction solution. To the resulting solid, 30 ml of ether and 50 ml of methylene chloride were added, and the mixture was filtered. The filtrate was concentrated and recrystallized from ether to obtain 0.39 g (yield: 30%) of a compound (15) represented by the following formula (15) as a yellow powder.

$^1$H-NMR ($CDCl_3$): 0.20–2.50 (m, 42H), 3.38–3.65 (m, 2H), 6.90–7.70 (m, 14H), 8.05–8.25 (m, 2H). FD-mass spectrometry: 858

(15)

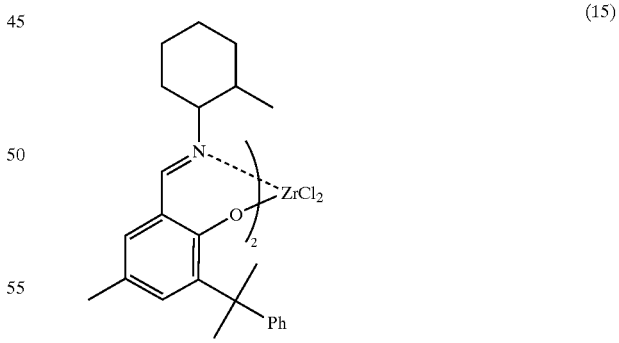

Synthesis Example 16

Into a 100 ml reactor thoroughly dried and purged with nitrogen, 11.22 g (46.30 mmol) of 2-(1-adamantyl)-4-methylphenol and 100 ml of THF were introduced. To the reactor, 16.20 ml of an ether solution containing 48.60 mmol of ethylmagnesium bromide was dropwise added at 0° C. over a period of 30 minutes, then the temperature of the system was slowly raised to room temperature, and the reaction solution was stirred at room temperature for 2.5 hours. Then, 300 ml of toluene was added, and the system was heated to 100° C. to give an opaque white slurry. After the slurry was cooled to room temperature, 3.80 g (126.54 mmol) of paraformaldehyde and 7.10 ml (70.17 mmol) of triethylamine were added, followed by stirring at 85° C. for 30 minutes. The reaction solution was allowed to cool to room temperature and then quenched with 10% hydrochloric acid. The organic layer was concentrated, and the solid precipitated was vacuum dried to obtain 10.51 g (yield: 84%) of 3-(1-adamantyl)-5-methylsalicylaldehyde.

$^1$H-NMR (CDCl$_3$): 2.2–1.8 (s, 16H), 2.3 (s, 3H), 7.5–7.0 (m, 2H), 9.8 (s, 1H), 11.6 (s, 1H).

Into a 100 ml reactor thoroughly purged with nitrogen, 30 ml of ethanol, 0.55 g (5.55 mmol) of cyclohexylamine and 1.51 g (5.57 mmol) of 3-(1-adamantyl)-5-methylsalicylaldehyde were introduced, and they were stirred at room temperature for 18 hours. The solid precipitated was filtered off and vacuum dried to obtain 1.73 g (yield: 89%) of a compound (P) represented by the following formula (P) as a yellow crystal.

$^1$H-NMR (CDCl$_3$): 1.18–1.70 (m, 1OH), 1.79 (t, 6H), 2.11 (s, 3H), 2.30 (s, 6H), 2.31 (s, 3H), 3.12–3.28 (m, 1H), 6.97 (d, 1H), 7.02 (s, 1H), 8.17 (s, 1H), 13.98 (s, 1H).

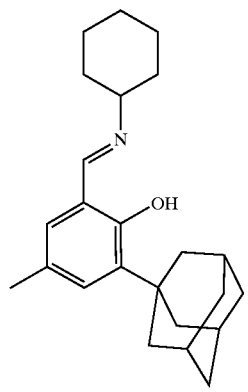

(P)

Into a 100 ml reactor thoroughly dried and purged with argon, 1.01 g (2.88 mmol) of the compound (P) and 20 ml of THF were introduced, and they were cooled to −78° C. and stirred. To the reactor, 1.83 ml of a n-hexane solution containing 2.87 mmol of n-butyllithium was dropwise added, then the temperature of the system was slowly raised to room temperature, and the reaction solution was stirred at room temperature for 1 hour to prepare a lithium salt solution. The solution was dropwise added to 20 ml of a THF solution containing 0.54 g (1.44 mmol) of a ZrCl$_4$ (THF)$_2$ complex, said THF solution having been cooled to −78° C. After the dropwise addition was completed, stirring was continued with slowly raising the temperature to room temperature. Then, stirring was further performed at room temperature for 15 hours, and the solvent was distilled off from the reaction solution. To the resulting solid, 30 ml of ether and 70 ml of methylene chloride were added to give a slurry, and the slurry was filtered. The filtrate was concentrated and recrystallized from a mixed solution of hexane and ether to obtain 0.99 g (yield: 79%) of a compound (16) represented by the following formula (16) as a yellow powder.

$^1$H-NMR (CDCl$_3$): 0.70–2.20 (m, 50H), 2.27 (s, 6H), 3.80–3.95 (m, 2H), 6.87 (d, 2H), 7.04 (d, 2H), 8.31 (s, 2H). FD-mass spectrometry: 862

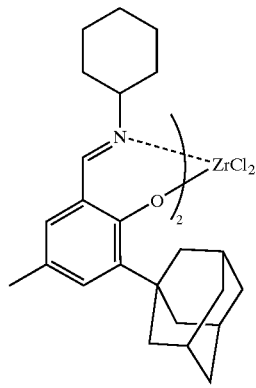

(16)

Synthesis Example 17

Into a 100 ml reactor thoroughly purged with nitrogen, 30 ml of ethanol, 0.67 g (5.92 mmol) of 2-methylcyclohexylamine and 1.50 g (5.55 mmol) of 3-(1-adamantyl)-5-methylsalicylaldehyde were introduced, and they were stirred at room temperature for 18 hours. The solid precipitated was filtered off and vacuum dried to obtain 1.67 g (yield: 82%) of a compound (Q) represented by the following formula (Q) as a yellow powder.

$_1$H-NMR (CDCl$_3$): 0.81 (d, 3H), 0.95–1.75 (m, 9H), 1.79 (d, 6H), 2.08 (s, 3H), 2.18 (d, 6H), 2.28 (s, 3H), 2.60–2.75 (td, 1H), 6.89 (s, 1H), 7.05 (d, 1H), 8.25, 8.28 (s, s, 1H), 13.88, 13.90 (s, s, 1H).

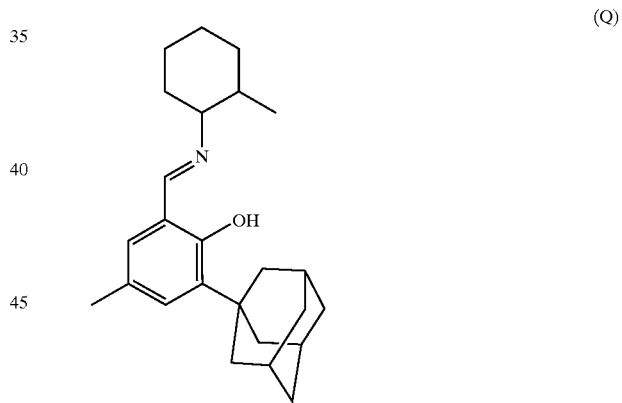

(Q)

Into a 100 ml reactor thoroughly dried and purged with argon, 1.00 g (2.74 mmol) of the compound (Q) and 20 ml of THF were introduced, and they were cooled to −78° C. and stirred. To the reactor, 1.75 ml of a n-hexane solution containing 2.75 mmol of n-butyllithium was slowly dropwise added, then the temperature of the system was slowly raised to room temperature, and the reaction solution was stirred at room temperature for 1.5 hours to prepare a lithium salt solution. The solution was dropwise added to 20 ml of a THF solution containing 0.52 g (1.37 mmol) of a ZrCl$_4$ (THF)$_2$ complex, said THF solution having been cooled to −78° C. After the dropwise addition was completed, stirring was continued with slowly raising the temperature to room temperature. Then, stirring was further performed at room temperature for 20 hours, and the solvent was distilled off from the reaction solution. To the resulting solid, 30 ml of ether and 70 ml of methylene chloride were added to give a slurry, and the slurry was filtered. The filtrate was concentrated and recrystallized from a mixed solution of hexane and ether to obtain 0.50 g (yield: 41%) of a compound (17) represented by the following formula (17) as a yellow powder.

$^1$H-NMR (CDCl$_3$): 0.60–2.20 (m, 54H), 2.32 (s, 6H), 3.70–3.92 (m, 2H), 6.90–7.00 (m, 2H), 7.26, 7.31 (s, s, 2H), 8.00–8.30 (m, 2H). FD-mass spectrometry: 890

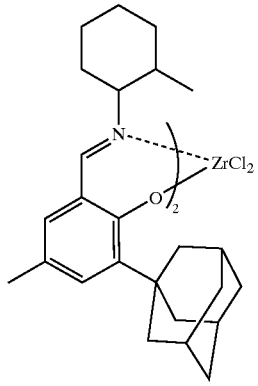

(17)

Synthesis Example 18

Into a 200 ml reactor thoroughly dried and purged with nitrogen, 25.31 g (203.90 mmol) of anisole, 2.00 g of Umberist-15 (trade name, available from Organo Co.) and 30 ml of toluene were introduced. To the reactor, a solution containing 15.52 g (101.9 mmol) of 1-adamantyl alcohol diluted with 20 ml of a toluene was dropwise added at 95° C., followed by stirring for 5.5 hours. After the system was cooled to room temperature, the crystal precipitated was washed with hexane and vacuum dried to obtain 12.20 g (yield: 46%) of 2-(1-adamantyl)-4-methoxyphenol.

$^1$H-NMR (CDCl$_3$): 1.78 (s, 6H), 2.09 (s, 3H), 2.12 (s, 6H), 3.76 (s, 3H), 4.30 (bs, 1H), 6.58 (s, 2H), 6.83 (s, 1H).

Into a 500 ml reactor thoroughly purged with nitrogen, 16.50 ml of an ether solution containing 49.60 mmol of ethylmagnesium bromide and 10 ml of THF were introduced. To the reactor, a solution containing 12.31 g (47.20 mmol) of 2-(1-adamantyl)-4-methoxyphenol diluted with 50 ml of a THF was dropwise added at 0° C. over a period of 15 minutes. Then, 150 ml of toluene was added, and the system was heated to 95° C. to distill off about 40 ml of a mixed solution of ether and THF, whereby an opaque white slurry was obtained. After the slurry was cooled to 20° C., 3.43 g (114.30 mmol) of paraformaldehyde and 9.40 ml (67.50 mmol) of triethylamine were added, followed by stirring at 90° C. for 30 minutes. The reaction solution was allowed to cool to room temperature and then quenched with 32 ml of 18% hydrochloric acid. The organic layer was washed with 100 ml of water, 50 ml of a sodium hydrogencarbonate aqueous solution and 100 ml of a sodium chloride aqueous solution, and then concentrated. The resulting solid was purified by silica gel column chromatography to obtain 4.95 g (yield: 37%) of 3-(1-adamantyl)-5-methoxysalicylaldehyde.

$^1$H-NMR (CDCl$_3$): 1.78 (s, 6H), 2.09 (s, 3H), 2.12 (s, 6H), 3.82 (s, 3H), 6.80 (s, 1H), 7.13 (s, 1H), 9.87 (s, 1H), 11.57 (s, 1H).

Into a 100 ml reactor thoroughly purged with nitrogen, 30 ml of ethanol, 0.37 g (3.73 mmol) of cyclohexylamine and 1.03 g (3.59 mmol) of 3-(1-adamantyl)-5-methoxysalicylaldehyde were introduced, and they were stirred at room temperature for 5.5 hours. The solid precipitated was filtered off and vacuum dried to obtain 1.24 g (yield: 94%) of a compound (R) represented by the following formula (R).

$^1$H-NMR (CDCl$_3$): 1.20–1.80 (m, 1OH), 1.80 (s, 6H), 2.08 (s, 3H), 2.15 (s, 6H), 3.15–3.30 (m, 1H), 3.77 (s, 3H), 6.58 (d, 1H), 6.89 (d, 1H), 8.32 (s, 1H), 13.76 (s, 1H).

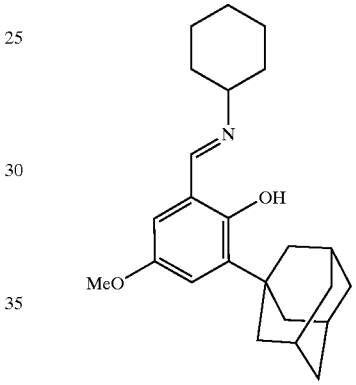

(R)

Into a 50 ml reactor thoroughly dried and purged with argon, 1.00 g (2.72 mmol) of the compound (R) and 10 ml of THF were introduced, and they were cooled to −78° C. and stirred. To the reactor, 1.80 ml of a n-hexane solution containing 2.83 mmol of n-butyllithium was slowly dropwise added, then the temperature of the system was slowly raised to room temperature, and the reaction solution was stirred at room temperature for 1.5 hours to prepare a lithium salt solution. The solution was dropwise added to 20 ml of a THF solution containing 0.51 g (1.36 mmol) of a ZrCl$_4$(THF)$_2$ complex, said THF solution having been cooled to −78° C. After the dropwise addition was completed, stirring was continued with slowly raising the temperature to room temperature. Then, stirring was further performed at room temperature for 20 hours, and the solvent was distilled off from the reaction solution. To the resulting solid, 30 ml of ether and 70 ml of methylene chloride were added, and the mixture was filtered. The filtrate was concentrated and washed again with a mixed solution of ether and hexane to obtain 0.16 g (yield: 13%) of a compound (18) represented by the following formula (18) as a yellow powder.

$^1$H-NMR (CDCl$_3$): 0.50–2.40 (m, 50H), 3.80 (s, 6H), 3.80–4.00 (m, 2H), 6.62 (d, 2H), 7.14 (d, 2H), 8.18 (s, 2H). FD-mass spectrometry: 894

(18)

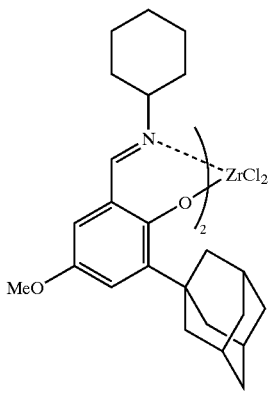

Synthesis Example 19

Into a 100 ml reactor thoroughly purged with nitrogen, 30 ml of ethanol, 0.44 g (3.89 mmol) of 2-methylcyclohexylamine and 1.06 g (3.70 mmol) of 3-(1-adamantyl)-5-methoxysalicylaldehyde were introduced, and they were stirred at room temperature for 5 hours. The solid precipitated was filtered off and vacuum dried to obtain 1.27 g (yield: 90%) of a compound (S) represented by the following formula (S).

$^1$H-NMR (CDCl$_3$): 0.82 (d, 3H), 1.00–1.80 (m, 9H), 1.79 (d, 6H), 2.07 (s, 3H), 2.17 (d, H), 2.65–2.75 (m, 1H), 3.77 (s, 3H), 6.59 (d, 1H), 6.90 (d, 1H), 8.27, 8.30 (s, s, 1H), 13.66, 13.88 (s, s, 1H).

(S)

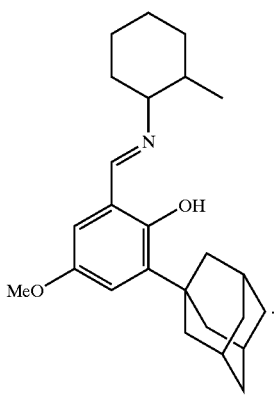

Into a 50 ml reactor thoroughly dried and purged with argon, 1.00 g (2.63 mmol) of the compound (S) and 20 ml of THF were introduced, and they were cooled to −78° C. and stirred. To the reactor, 1.70 ml of a n-hexane solution containing 2.67 mmol of n-butyllithium was slowly dropwise added, then the temperature of the system was slowly raised to room temperature, and the reaction solution was stirred at room temperature for 1.5 hours to prepare a lithium salt solution. The solution was dropwise added to 20 ml of a THF solution containing 0.50 g (1.32 mmol) of a ZrCl$_4$ (THF)$_2$ complex, said THF solution having been cooled to −78° C. After the dropwise addition was completed, stirring was continued with slowly raising the temperature to room temperature. Then, stirring was further performed at room temperature for 20 hours, and the solvent was distilled off from the reaction solution. To the resulting solid, 30 ml of ether and 70 ml of methylene chloride were added, and the mixture was filtered. The filtrate was concentrated and washed again with ether to obtain 0.65 g (yield: 54%) of a compound (19) represented by the following formula (19) as a yellow powder.

$^1$H-NMR (CDCl$_3$): 0.20–2.40 (m, 54H), 3.65–3.95 (m, 2H), 3.80 (s, 6H), 6.59–6.65 (m, 2H), 7.13–7.16 (m, 2H), 8.14–8.23 (m, 2H). FD-mass spectrometry: 923

(19)

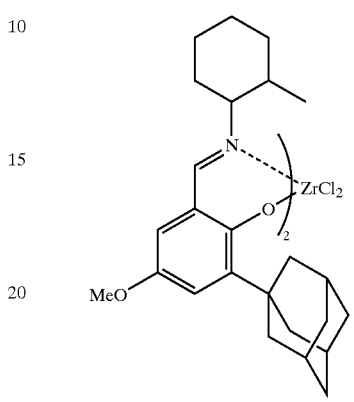

Synthesis Example 20

Into a 200 ml reactor thoroughly dried and purged with nitrogen, 43.00 g (346.4 mmol) of anisole, 4.30 g of Umberist-15 (trade name, available from Organo Co.) and 50 ml of toluene were introduced. To the reactor, a solution containing 81.88 g (692.8 mmol) of α-methylstyrene diluted with 50 ml of a toluene was dropwise added at 105° C., followed by stirring for 7.5 hours. After the system was cooled to room temperature, the reaction solution was filtered with washing with toluene, and the resulting liquid was purified by silica gel column chromatography to obtain 24.28 g (yield: 28%) of 2-cumyl-4-methoxyphenol.

$^1$H-NMR (CDCl$_3$): 1.67 (s, 6H), 3.82 (s, 3H), 3.96 (s, 1H), 6.72–7.38 (m, 8H).

Into a 1 liter reactor thoroughly purged with nitrogen, 43.5 ml of an ether solution containing 130.7 mmol of ethylmagnesium bromide and 70 ml of THF were introduced. To the reactor, a solution containing 30.16 g (124.5 mmol) of 2-cumyl-4-methoxyphenol diluted with 80 ml of a THF was dropwise added at 0° C. over a period of 30 minutes. Then, 500 ml of toluene was added, and the system was heated to 100° C. to distill off about 40 ml of a mixed solution of ether and THF, whereby an opaque white slurry was obtained. After the slurry was cooled to 15° C., 9.04 g (301.3 mmol) of paraformaldehyde and 24.8 ml (178.0 mmol) of triethylamine were added, followed by stirring at 90° C. for 15 minutes. The reaction solution was allowed to cool to room temperature and then quenched with 84 ml of 18% hydrochloric acid. The organic layer was washed with 400 ml of water, 200 ml of a sodium hydrogencarbonate aqueous solution and a sodium chloride aqueous solution (200 ml×2), and then concentrated. The resulting liquid was purified by silica gel column chromatography to obtain 27.27 g (yield: 81%) of 3-cumyl-5-methoxysalicylaldehyde.

$^1$H-NMR (CDCl$_3$): 1.82 (s, 6H), 3.85 (s, 3H), 7.15–7.38 (m, 7H), 9.80 (s, 1H), 11.3 (s, 1H).

Into a 100 ml reactor thoroughly purged with nitrogen, 40 ml of ethanol, 1.09 g (11.0 mmol) of cyclohexylamine and 2.85 g (10.0 mmol) of 3-cumyl-5-methoxysalicylaldehyde were introduced, and they were stirred at room temperature for 2 hours. The solid precipitated was filtered off and vacuum dried to obtain 2.54 g (yield: 72%) of a compound (T) represented by the following formula (T).

¹H-NMR (CDCl₃): 1.11–1.55 (m, 6H), 1.55–1.85 (m, 4H), 1.75 (s, 6H), 3.11 (m, 1H), 3.82 (s, 3H), 6.63–7.29 (m, 7H), 8.28 (s, 1H), 13.20 (s, 1H).

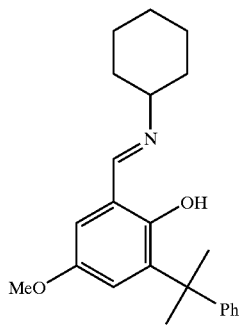

(T)

Into a 50 ml reactor thoroughly dried and purged with argon, 1.05 g (3.00 mmol) of the compound (T) and 30 ml of ether were introduced, and they were cooled to −78° C. and stirred. To the reactor, 2.01 ml of a n-hexane solution containing 3.15 mmol of n-butyllithium was slowly dropwise added, then the temperature of the system was slowly raised to room temperature, and the reaction solution was stirred at room temperature for 3 hours to prepare a lithium salt solution. The solution was dropwise added to 30 ml of a THF solution containing 0.57 g (1.50 mmol) of a ZrCl₄(THF)₂ complex, said THF solution having been cooled to −78° C. After the dropwise addition was completed, stirring was continued with slowly raising the temperature to room temperature. Then, stirring was further performed at room temperature for 20 hours, and the solvent was distilled off from the reaction solution. To the resulting solid, 30 ml of ether was added to give a slurry, and the slurry was filtered with washing with 50 ml of methylene chloride. The filtrate was concentrated and washed again with a mixed solution of methylene chloride and ether to obtain 0.67 g (yield: 52%) of a compound (20) represented by the following formula (20) as a yellow powder.

¹H-NMR (CDCl₃): 0.90–2.10 (m, 32H), 3.67 (m, 2H), 3.77, 3.85 (s, s, 6H), 6.60–7.41 (m, 14H), 8.11 (s, 2H). FD-mass spectrometry: 863

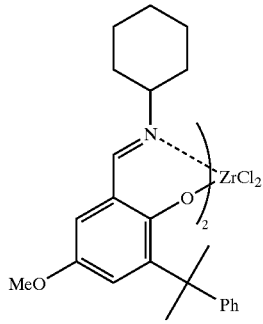

(20)

Synthesis Example 21

Into a 100 ml reactor thoroughly purged with nitrogen, 40 ml of ethanol, 1.25 g (11.0 mmol) of 2-methylcyclohexylamine and 2.85 g (10.0 mmol) of 3-cumyl-5-methoxysalicylaldehyde were introduced, and they were stirred at room temperature for 3 hours. The solid precipitated was filtered off and vacuum dried to obtain 2.73 g (yield: 75%) of a compound (U) represented by the following formula (U).

¹H-NMR (CDCl₃): 0.70–0.80 (d, 3H), 0.9–1.83 (m, 9H), 1.75 (s, 6H), 2.62 (m, 1H), 3.82 (s, 3H), 6.68–7.31 (m, 7H), 8.23 (s, 1H), 13.13 (s, 1H).

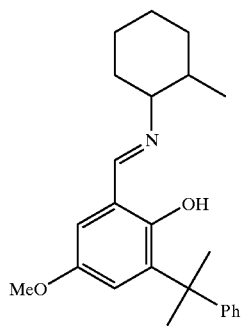

(U)

Into a 50 ml reactor thoroughly dried and purged with argon, 1.10 g (3.00 mmol) of the compound (U) and 30 ml of ether were introduced, and they were cooled to −78° C. and stirred. To the reactor, 2.01 ml of a n-hexane solution containing 3.15 mmol of n-butyllithium was slowly dropwise added, then the temperature of the system was slowly raised to room temperature, and the reaction solution was stirred at room temperature for 2 hours to prepare a lithium salt solution. The solution was dropwise added to 30 ml of a THF solution containing 0.57 g (1.50 mmol) of a ZrCl₄(THF)₂ complex, said THF solution having been cooled to −78° C. After the dropwise addition was completed, stirring was continued with slowly raising the temperature to room temperature. Then, stirring was further performed at room temperature for 20 hours, and the solvent was distilled off from the reaction solution. To the resulting solid, 10 ml of ether and 30 ml of methylene chloride were added to give a slurry, and the slurry was filtered with washing with 20 ml of methylene chloride. The filtrate was concentrated and washed again with a mixed solution of methylene chloride and ether to obtain 0.78 g (yield: 58%) of a compound (21) represented by the following formula (21) as a yellow powder.

¹H-NMR (CDCl₃): 0.60–0.80 (m, 36H), 3.52 (m, 2H), 3.77 (s, 6H), 6.50–7.60 (m, 14H), 8.12 (s, 2H). FD-mass spectrometry: 891

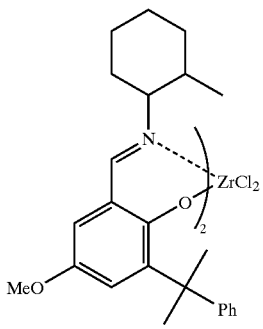

(21)

Synthesis Example 22

Into a 300 ml reactor thoroughly dried and purged with nitrogen, 34.04 g (200.0 mmol) of 4-phenylphenol, 3.40 g of Umberist-15E (trade name, available from Organo Co.) and 150 ml of toluene were introduced. To the reactor, a solution containing 48.20 g (200.0 mmol) of t-butyl alcohol diluted with 10 ml of a toluene was dropwise added at 105° C., followed by stirring for 16 hours. After the system was cooled to room temperature, the solution was introduced into 500 ml of hexane and filtered with washing with hexane. After concentration, the resulting liquid was purified by silica gel column chromatography to obtain 31.15 g (yield: 69%) of 2-t-butyl-4-phenylphenol.

$^1$H-NMR (CDCl$_3$): 1.48 (s, 9H), 4.78 (s, 1H), 6.70–6.58 (m, 8H).

Into a 1 liter reactor thoroughly purged with nitrogen, 66.80 ml of an ether solution containing 200.4 mmol of ethylmagnesium bromide and 100 ml of THF were introduced. To the reactor, a solution containing 43.16 g (190.7 mmol) of 2-t-butyl-4-phenylphenol diluted with 90 ml of a THF was dropwise added at 0° C. over a period of 40 minutes, then the temperature of the system was slowly raised to room temperature, and the reaction solution was stirred at room temperature for 30 minutes. Then, 700 ml of toluene was added, and the system was heated to 100° C. to distill off 52 ml of a mixed solution of ether and THF, whereby an opaque white slurry was obtained. After the slurry was cooled to –20° C., 13.84 g (460.9 mmol) of paraformaldehyde and 38.1 ml (273.4 mmol) of triethylamine were added, followed by stirring at 90° C. for 30 minutes. After ice cooling, the reaction solution was quenched with 133 ml of 18% hydrochloric acid. The organic layer was washed with 300 ml of water, 300 ml of a sodium hydrogencarbonate aqueous solution and 300 ml of a sodium chloride aqueous solution, and then concentrated. The resulting liquid was purified by silica gel column chromatography to obtain 37.73 g (yield: 78%) of 3-t-butyl-5-phenylsalicylaldehyde.

$^1$H-NMR (CDCl$_3$): 1.47 (s, 9H), 7.29–7.79 (m, 7H), 9.70 (s, 1H), 11.78 (s, 1H).

Into a 100 ml reactor thoroughly purged with nitrogen, 50 ml of ethanol, 1.21 g (12.0 mmol) of n-hexylamine and 2.54 g (10.0 mmol) of 3-t-butyl-5-phenylsalicylaldehyde were introduced, and they were stirred at room temperature for 1 hour. The reaction solution was vacuum concentrated to remove the solvent, and the resulting liquid was purified by silica gel column chromatography to obtain 3.38 g (yield: 94%) of a compound (V) represented by the following formula (V).

$^1$H-NMR (CDCl$_3$): 0.90 (t, 3H), 1.20–1.50 (m, 6H), 1.48 (s, 9H), 1.72 (m, 2H), 3.61 (t, 2H), 7.27–7.56 (m, 7H), 8.40 (s, 1H), 14.29 (s, 1H).

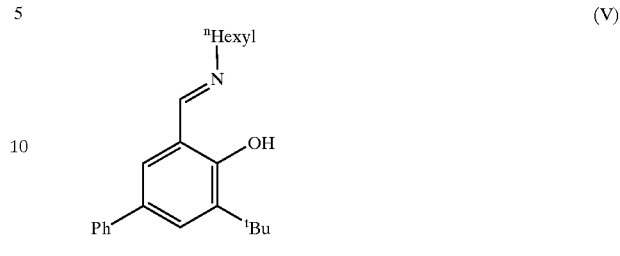

(V)

Into a 50 ml reactor thoroughly dried and purged with argon, 1.01 g (3.00 mmol) of the compound (V) and 30 ml of ether were introduced, and they were cooled to –78° C. and stirred. To the reactor, 1.97 ml of a n-hexane solution containing 3.15 mmol of n-butyllithium was slowly dropwise added, then the temperature of the system was slowly raised to room temperature, and the reaction solution was stirred at room temperature for 4 hours to prepare a lithium salt solution. The solution was dropwise added to 30 ml of a THF solution containing 0.57 g (1.50 mmol) of a ZrCl$_4$ (THF)$_2$ complex, said THF solution having been cooled to –78° C. After the dropwise addition was completed, stirring was continued with slowly raising the temperature to room temperature. Then, stirring was further performed at room temperature for 20 hours, and the solvent was distilled off from the reaction solution. To the resulting solid, 20 ml of ether was added to give a slurry, and the slurry was filtered with washing with 10 ml of methylene chloride. The filtrate was concentrated and washed again with 30 ml of ether to obtain 0.49 g (yield: 39%) of a compound (22) represented by the following formula (22) as a yellow powder.

$^1$H-NMR (CDCl$_3$): 0.7–0.90 (m, 6H), 1.1–2.0 (s, 34H), 3.8–4.1 (m, 4H), 7.2–8.1 (m, 14H), 8.3, 8.8 (brs, s, 2H). FD-mass spectrometry: 834

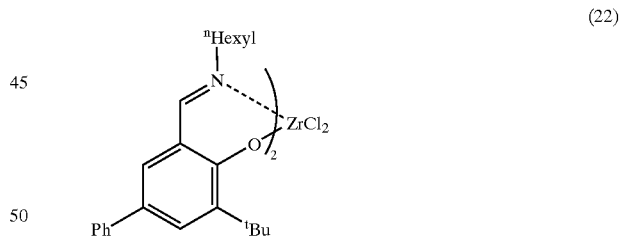

(22)

The NC values of the compounds obtained are set forth in Table 1.

TABLE 1

| Compound No. | NC | Compound No. | NC |
| --- | --- | --- | --- |
| 1 | 1.915 | 12 | 1.801 |
| 2 | 1.908 | 13 | 1.905 |
| 3 | 1.856 | 14 | 1.799 |
| 4 | 1.803 | 15 | 1.790 |
| 5 | 1.913 | 16 | 1.799 |
| 6 | 1.909 | 17 | 1.792 |
| 7 | 1.852 | 18 | 1.780 |
| 8 | 1.870 | 19 | 1.768 |
| 9 | 1.900 | 20 | 1.799 |

TABLE 1-continued

| Compound No. | NC | Compound No. | NC |
|---|---|---|---|
| 10 | 1.905 | 21 | 1.791 |
| 11 | 1.910 | 22 | 1.910 |

Examples 1–17

Into a 1 liter stainless steel autoclave thoroughly purged with nitrogen, 500 ml of heptane was introduced. The temperature of the autoclave was set at 75° C., and the liquid phase and the gas phase were saturated with ethylene. To the autoclave, 1.25 mmol (in terms of aluminum atom) of methylaluminoxane and the compound shown in Table 2 in the amount shown in Table 2 were added, and the polymerization was conducted for 15 minutes under the ethylene pressure of 8 kg/cm$^2$-G.

The resulting polymer suspension was introduced into a large amount of a mixture of acetone and methanol (acetone:methanol=1:1) containing a small amount of hydrochloric acid to precipitate a polymer. The polymer was filtered through a glass filter. After the solvent was removed, the polymer was washed with methanol. The polymer was vacuum dried at 80° C. for 10 hours to obtain polyethylene. The results are set forth in Table 2.

Comparative Example 1

Polymerization was carried out in the same manner as in Examples 1 to 22, except that the following zirconium compound (23) (NC=2.01) was used as the zirconium compound in an amount of 0.00005 mmol. As a result, polyethylene was obtained in an amount of 2.61 g. The polymerization activity was 209 kg/mmol-Zr·hr, and the intrinsic viscosity (η) of the polyethylene was 1.95 dl/g. The results are set forth in Table 2.

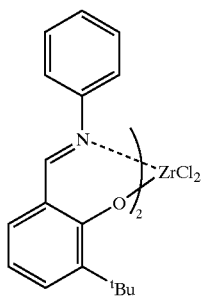

(23)

TABLE 2

| | Catalyst | | | Activity | Intrinsic viscosity |
|---|---|---|---|---|---|
| | Compound No. | Amount (mmol) | Yield (g) | (kg/mmol) -Zr · hr | (η) (dl/g) |
| Ex. 1 | 1 | 0.0002 | 15.06 | 301 | 0.55 |
| Ex. 2 | 2 | 0.00005 | 7.17 | 573 | 0.56 |
| Ex. 3 | 3 | 0.00005 | 17.54 | 1403 | 6.37 |
| Ex. 4 | 4 | 0.00005 | 4.29 | 343 | 4.72 |
| Ex. 5 | 5 | 0.0001 | 14.24 | 569 | 2.52 |
| Ex. 6 | 6 | 0.00005 | 8.58 | 686 | 1.11 |
| Ex. 7 | 7 | 0.00005 | 10.62 | 850 | 1.52 |
| Ex. 8 | 8 | 0.00005 | 9.91 | 793 | 13.8 |

TABLE 2-continued

| | Catalyst | | | Activity | Intrinsic viscosity |
|---|---|---|---|---|---|
| | Compound No. | Amount (mmol) | Yield (g) | (kg/mmol) -Zr · hr | (η) (dl/g) |
| Ex. 9 | 9 | 0.00005 | 9.68 | 774 | 1.99 |
| Ex. 10 | 10 | 0.00005 | 6.67 | 534 | 6.88 |
| Ex. 11 | 11 | 0.0001 | 10.83 | 433 | 0.49 |
| Ex. 12 | 12 | 0.00005 | 6.93 | 554 | 4.70 |
| Ex. 13 | 13 | 0.00002 | 14.40 | 2881 | 0.34 |
| Ex. 14 | 14 | 0.00002 | 8.89 | 1778 | 0.46 |
| Ex. 15 | 16 | 0.0001 | 17.24 | 690 | 0.82 |
| Ex. 16 | 17 | 0.00005 | 10.84 | 867 | 5.74 |
| Ex. 17 | 22 | 0.00005 | 6.01 | 481 | 0.32 |
| Comp. Ex. 1 | 23 | 0.00005 | 2.61 | 209 | 1.95 |

Examples 18–29

Polymerization was carried out in the same manner as in Examples 1 to 17, except that the polymerization temperature was set at 90° C. and the amount of the catalyst was varied to that shown in Table 3. The results are set forth in Table 3.

Comparative Example 2

Polymerization was carried out in the same manner as in Examples 18 to 29, except that the zirconium compound (23) was used as the zirconium compound in an amount of 0.00025 mmol. As a result, polyethylene was obtained in an amount of 3.87 g. The polymerization activity was 62 kg/mmol-Zr·hr, and the intrinsic viscosity (η) of the polyethylene was 4.19 dl/g. The results are set forth in Table 3.

TABLE 3

| | Catalyst | | | Activity | Intrinsic viscosity |
|---|---|---|---|---|---|
| | Compound No. | Amount (mmol) | Yield (g) | (kg/mmol -Zr · hr) | (η) (dl/g) |
| Ex. 18 | 1 | 0.0002 | 12.26 | 245 | 0.38 |
| Ex. 19 | 2 | 0.0001 | 6.69 | 267 | 0.55 |
| Ex. 20 | 3 | 0.00005 | 12.00 | 956 | 4.84 |
| Ex. 21 | 5 | 0.0001 | 5.03 | 201 | 1.69 |
| Ex. 22 | 6 | 0.00005 | 10.29 | 823 | 0.78 |
| Ex. 23 | 7 | 0.00005 | 14.98 | 1198 | 1.09 |
| Ex. 24 | 8 | 0.00005 | 11.71 | 937 | 8.63 |
| Ex. 25 | 9 | 0.00005 | 10.38 | 831 | 0.90 |
| Ex. 26 | 11 | 0.0001 | 6.52 | 261 | 0.47 |
| Ex. 27 | 12 | 0.00005 | 5.94 | 475 | 3.61 |
| Ex. 28 | 13 | 0.00005 | 10.12 | 810 | 0.36 |
| Ex. 29 | 22 | 0.0001 | 6.79 | 272 | 0.32 |
| Comp. Ex.2 | 23 | 0.00025 | 3.87 | 62 | 4.19 |

What is claimed is:

1. An olefin polymerization catalyst comprising a transition metal compound which is represented by the following formula (I-b) and in which the net charge parameter of the central metal M is in the range of 1.80 to 1.89:

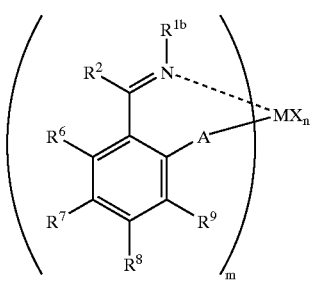

(I-b)

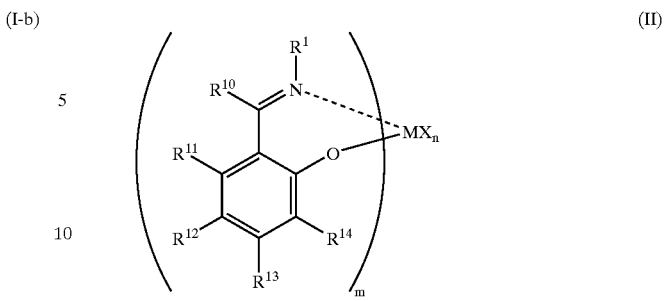

(II)

wherein M is a transition metal atom of Group 4 to Group 5 of the periodic table, m is an integer of 1 to 5, A is an oxygen atom, $R^{1b}$ is an alicyclic hydrocarbon group having at least 7 carbon atoms which may be substituted with an aromatic hydrocarbon group or an aliphatic hydrocarbon group, $R^2$ and $R^7$ are each a hydrogen atom, $R^6$, $R^8$ and $R^9$ may be the same or different, they are each a hydrogen atom, a hydrocarbon group, an oxygen-containing group, a nitrogen-containing group, a sulfur-containing group, a boron-containing group, an aluminum-containing group, a phosphorus-containing group, a halogen-containing group, a heterocyclic compound residual group, a silicon-containing group, a germanium-containing group or a tin-containing group, two or more of them may be bonded to each other to form a ring, and when m is 2 or greater, at least one of groups indicated by $R^6$, $R^8$ and $R^9$ contained in one ligand and at least one of groups indicated by $R^6$, $R^8$ and $R^9$ contained in another ligand may be bonded to each other, when m is 2 or greater, $R^{1b}$s, $R^6$s, $R^8$s, or $R^9$s may be the same or different, n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, plural groups indicated by X may be the same or different and plural groups indicated by X may be bonded to each other to form a ring.

2. An olefin polymerization catalyst comprising:

(A-1) the transition metal compound of claim 1, and (B) at least one compound selected from:
  (B-1) an organometallic compound,
  (B-2) an organoaluminum oxy-compound, and
  (B-3) a compound which reacts with the transition metal compound to form an ion pair.

3. An olefin polymerization catalyst comprising a transition metal compound represented by the following formula (II):

wherein M is a transition metal atom of Group 4 to Group 5 of the periodic table, m is 1 or 2, $R^1$ is an aliphatic hydrocarbon group having at least 5 carbon atoms which may be substituted with an aromatic hydrocarbon group or an alicyclic hydrocarbon group, $R^{10}$, $R^{11}$ and $R^{13}$ may be the same or different, they are each a hydrogen atom, a hydrocarbon group, a hydrocarbon-substituted silyl group, an oxygen-containing group, a nitrogen-containing group or a sulfur-containing group, and two or more of them may be bonded to each other to form a ring, $R^{12}$ is a hydrocarbon group, an oxygen-containing group, a nitrogen-containing group or a sulfur-containing group, $R^{14}$ is a hydrocarbon group or a hydrocarbon-substituted silyl group, when m is 2, at least one of groups indicated by $R^{10}$ to $R^{14}$ contained in one ligand and at least one of groups indicated by $R^{10}$ to $R^{14}$ contained in another ligand may be bonded to each other, when m is 2, $R^1$s, $R^{10}$s, $R^{11}$s, $R^{12}$s, $R^{13}$s, or $R^{14}$s may be the same or different, n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, plural groups indicated by X may be the same or different and plural groups indicated by X may be bonded to each other to form a ring.

4. The olefin polymerization catalyst of claim 3 wherein $R^{12}$ in the formula (II) is an oxygen-containing group, a nitrogen-containing group or a sulfur-containing group.

5. An olefin polymerization catalyst comprising:

(A-2) the transition metal compound of claim 3 and (B) at least one compound selected from:
  (B-1) an organometallic compound,
  (B-2) an organoaluminum oxy-compound, and
  (B-3) a compound which reacts with the transition metal compound to form an ion pair.

6. A process for olefin polymerization, comprising polymerizing an olefin in the presence of the olefin polymerization catalyst of claim 1.

7. A process for olefin polymerization, comprising polymerizing an olefin in the presence of the olefin polymerization catalyst of claim 2.

8. A process for olefin polymerization, comprising polymerizing an olefin in the presence of the olefin polymerization catalyst of claim 3.

9. A process for olefin polymerization, comprising polymerizing an olefin in the presence of the olefin polymerization catalyst of claim 5.

10. An olefin polymerization catalyst comprising a transition metal compound represented by the following formula (II):

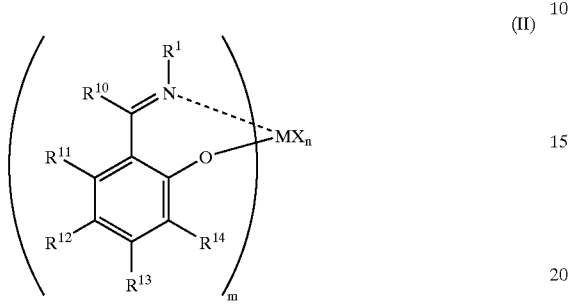

wherein M is a transition metal atom of Group 4 to Group 5 of the periodic table, m is 1 or 2, $R^1$ is an alicyclic hydrocarbon group which may be substituted with an aromatic hydrocarbon group or an aliphatic hydrocarbon group, $R^{10}$, $R^{11}$ and $R^{13}$ may be the same or different, they are each a hydrogen atom, a hydrocarbon group, a hydrocarbon-substituted silyl group, an oxygen-containing group, a nitrogen-containing group or a sulfur-containing group, and two or more of them may be bonded to each other to form a ring, $R^{12}$ is a hydrocarbon group, a hydrocarbon-substituted silyl group, an oxygen-containing group, a nitrogen-containing group or a sulfur-containing group, $R^{14}$ is a hydrocarbon group or a hydrocarbon-substituted silyl group, and has at least 5 carbon atoms, when m is 2, at least one of groups indicated by $R^{10}$ to $R^{14}$ contained in one ligand and at least one of groups indicated by $R^{10}$ to $R^{14}$ contained in another ligand may be bonded to each other, when m is 2, $R^1$s, $R^{10}$s, $R^{11}$s, $R^{12}$s, $R^{13}$s, or $R^{14}$s may be the same or different, n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, plural groups indicated by X may be the same or different and plural groups indicated by X may be bonded to each other to form a ring.

11. The olefin polymerization catalyst of claim 10 wherein $R^{12}$ in the formula (II) is an oxygen-containing group, a nitrogen-containing group or a sulfur-containing group.

12. The olefin polymerization catalyst of claim 10 wherein $R^{12}$ in the formula (II) is an oxygen-containing group.

13. An olefin polymerization catalyst comprising:

(A-2) the transition metal compound of any one of claims 10, 11 or 12, and (B) at least one compound selected from the group consisting of:

(B-1) an organometallic compound, (B-2) an organoaluminum oxy-compound, and (B-3) a compound which reacts with the transition metal compound to form an ion pair.

14. A process for olefin polymerization, comprising polymerizing an olefin in the presence of the olefin polymerization catalyst of any one of claims 10, 11 or 12.

* * * * *